(12) United States Patent
Genosar

(10) Patent No.: US 10,028,886 B2
(45) Date of Patent: Jul. 24, 2018

(54) FILING SYSTEM AND METHODS FOR ASEPTIC CARTRIDGE AND DISPENSER ARRANGEMENT

(75) Inventor: Amir Genosar, Boulder, CO (US)

(73) Assignee: AKTIVAX, INC., Boulder, CO (US)

( * ) Notice: Subject to any disclaimer, the term of this patent is extended or adjusted under 35 U.S.C. 154(b) by 1026 days.

(21) Appl. No.: 14/118,470

(22) PCT Filed: May 17, 2012

(86) PCT No.: PCT/US2012/038444
§ 371 (c)(1),
(2), (4) Date: Aug. 13, 2014

(87) PCT Pub. No.: WO2012/158973
PCT Pub. Date: Nov. 22, 2012

(65) Prior Publication Data
US 2014/0346071 A1 Nov. 27, 2014

Related U.S. Application Data

(60) Provisional application No. 61/487,121, filed on May 17, 2011, provisional application No. 61/578,907,
(Continued)

(51) Int. Cl.
*B65D 25/08* (2006.01)
*A61J 1/00* (2006.01)
(Continued)

(52) U.S. Cl.
CPC ............... *A61J 1/00* (2013.01); *A61J 1/067* (2013.01); *A61J 1/2093* (2013.01); *B65D 25/02* (2013.01);
(Continued)

(58) Field of Classification Search
CPC ...... A61J 1/2093; B65D 25/08; B65D 25/087; B65D 51/2807
(Continued)

(56) References Cited

U.S. PATENT DOCUMENTS 4,997,083 A 3/1991 Loretti et al.
5,112,303 A * 5/1992 Pudenz ............... A61M 25/10
604/183
(Continued)

FOREIGN PATENT DOCUMENTS

EP 1308149 A2 5/2003
JP 2006-504594 A 2/2006
(Continued)

OTHER PUBLICATIONS

Korean Intellectual Property Office, International Search Report dated Aug. 29, 2012 for PCT/US2012/021592.
(Continued)

*Primary Examiner* — King M Chu
(74) *Attorney, Agent, or Firm* — Perkins Coie LLP

(57) ABSTRACT

A package for use with a beneficial agent delivery device. The package includes at least one filling chamber having a sealed penetrable access region, at least one compartment configured to hold a content, wherein the content includes at least one of a beneficial agent or a constituent of a beneficial agent, and at least one channel connecting the at least one filling chamber in fluid communication with the at least one compartment. At least a portion of the package is resealable to contain the content.

20 Claims, 40 Drawing Sheets

Related U.S. Application Data filed on Dec. 22, 2011, provisional application No. 61/581,721, filed on Dec. 30, 2011, provisional application No. 61/604,635, filed on Feb. 29, 2012, provisional application No. 61/622,523, filed on Apr. 11, 2012.

(51) Int. Cl.

| | | |
|---|---|---|
| *A61J 1/06* | (2006.01) | |
| *A61J 1/20* | (2006.01) | |
| *B65D 25/02* | (2006.01) | |
| *A61J 1/10* | (2006.01) | |
| *A61J 1/12* | (2006.01) | |
| *A61J 1/14* | (2006.01) | |
| *B29C 65/08* | (2006.01) | |
| *B29C 65/14* | (2006.01) | |
| *B29C 65/38* | (2006.01) | |
| *B29C 65/00* | (2006.01) | |
| *B29C 65/02* | (2006.01) | |
| *B29C 65/04* | (2006.01) | |
| *B29C 65/06* | (2006.01) | |
| *B29L 31/00* | (2006.01) | |

(52) U.S. Cl.
CPC .. *A61J 1/10* (2013.01); *A61J 1/12* (2013.01); *A61J 1/1406* (2013.01); *A61J 1/1418* (2015.05); *A61J 1/2024* (2015.05); *A61J 1/2096* (2013.01); *B29C 65/02* (2013.01); *B29C 65/04* (2013.01); *B29C 65/06* (2013.01); *B29C 65/08* (2013.01); *B29C 65/14* (2013.01); *B29C 65/38* (2013.01); *B29C 66/112* (2013.01); *B29C 66/1122* (2013.01); *B29C 66/131* (2013.01); *B29C 66/3452* (2013.01); *B29C 66/53262* (2013.01); *B29C 66/53461* (2013.01); *B29L 2031/7148* (2013.01)

(58) Field of Classification Search
USPC .................................. 206/438, 219, 220, 221
See application file for complete search history.

(56) References Cited

U.S. PATENT DOCUMENTS

| | | |
|---|---|---|
| 5,176,634 A | 1/1993 | Smith et al. |
| 5,391,150 A | 2/1995 | Richmond |
| 7,213,702 B2 | 5/2007 | Takimoto et al. |
| 2002/0138039 A1 | 9/2002 | Hasegawa |
| 2009/0054865 A1 | 2/2009 | Brandenburger et al. |
| 2009/0171311 A1* | 7/2009 | Genosar ................. A61J 1/1406 604/411 |
| 2010/0094219 A1 | 4/2010 | Kriesel et al. |
| 2010/0179473 A1 | 7/2010 | Genosar |
| 2012/0226239 A1 | 6/2012 | Green |
| 2012/0241466 A1 | 9/2012 | Genosar et al. |
| 2014/0346071 A1* | 11/2014 | Genosar ................... A61J 1/067 206/438 |

FOREIGN PATENT DOCUMENTS

| | | |
|---|---|---|
| JP | 2006-230467 A | 9/2006 |
| WO | 2010/081174 A2 | 7/2010 |

OTHER PUBLICATIONS

Korean Intellectual Property Office, International Search Report dated Jun. 26, 2012 for PCT/US2011/063624.
Korean Intellectual Property Office, International Search Report dated Nov. 28, 2012 for PCT/US2012/038444.

* cited by examiner

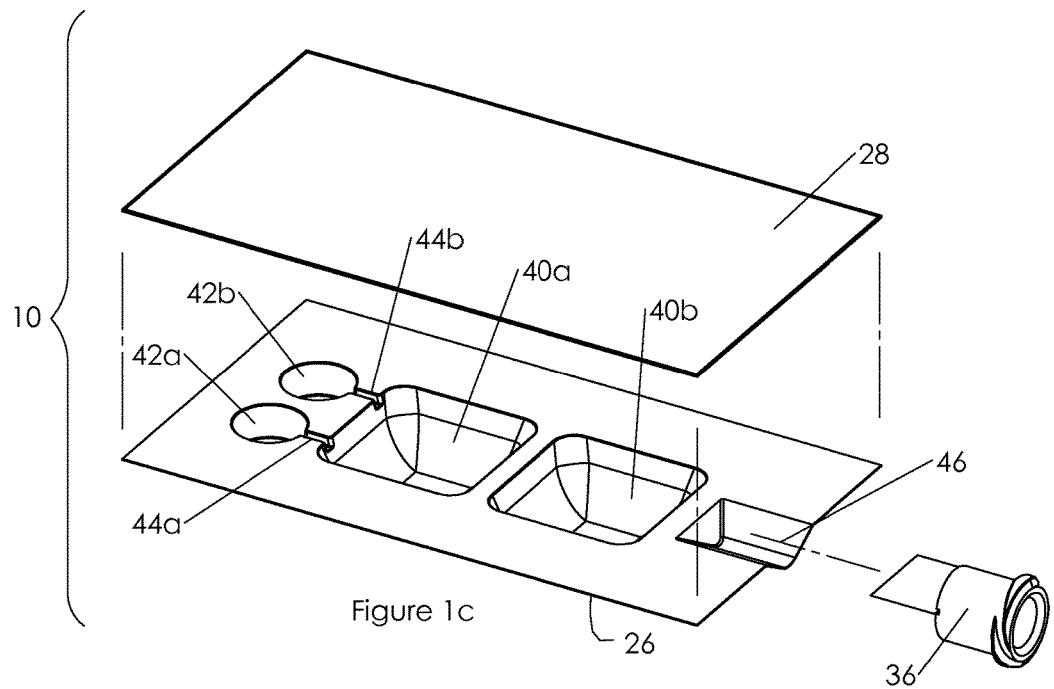
Figure 1c
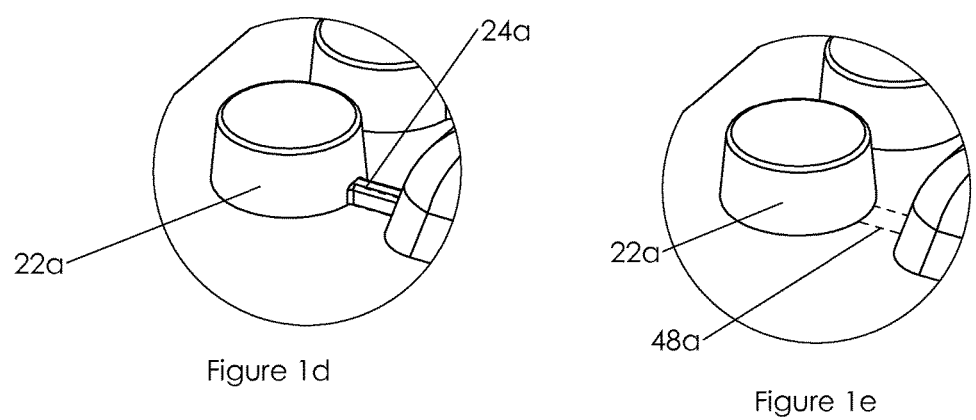
Figure 1d
Figure 1e

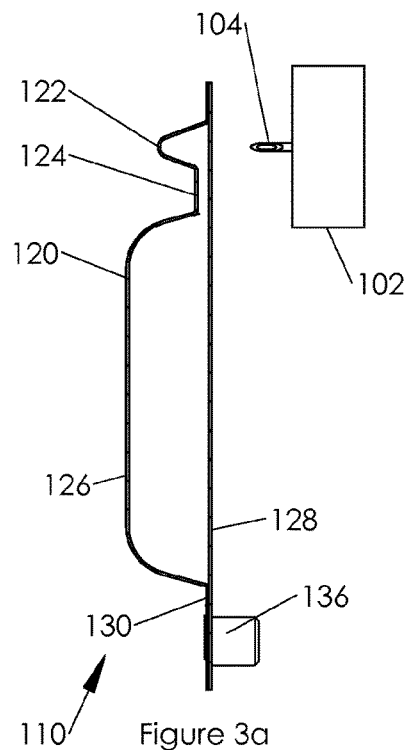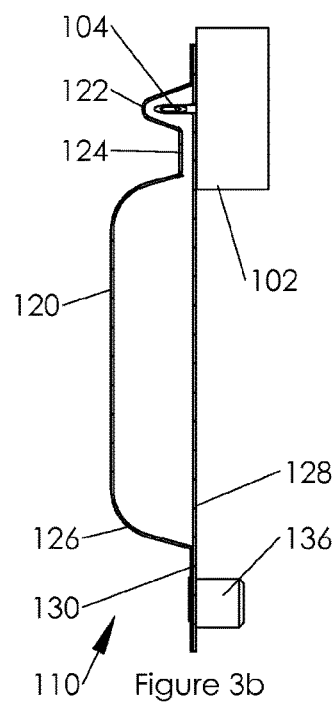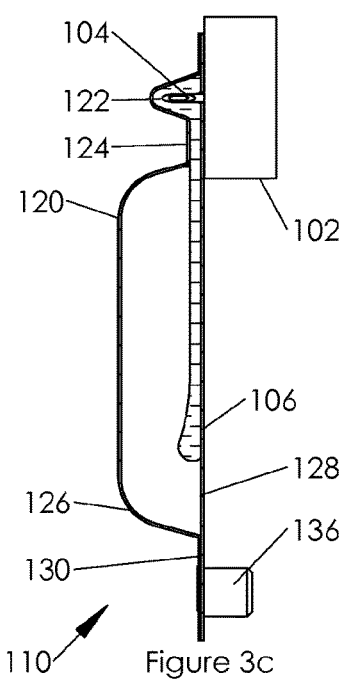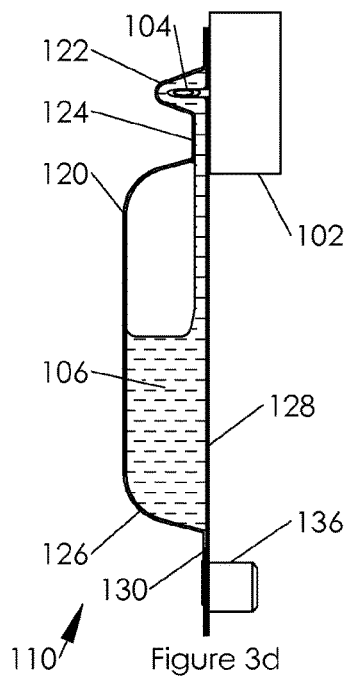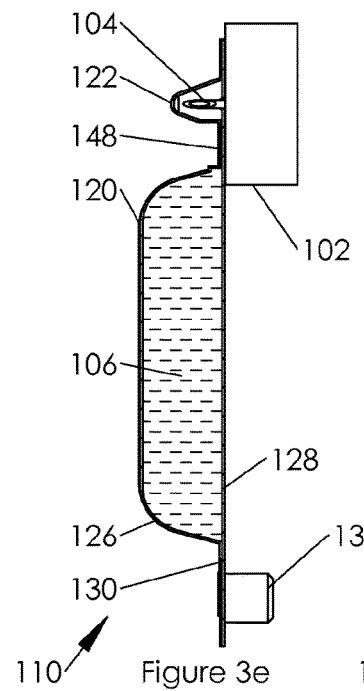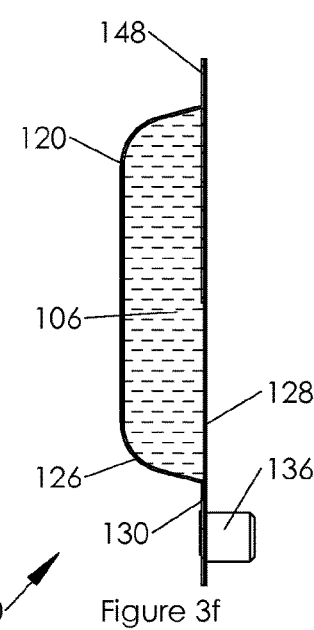

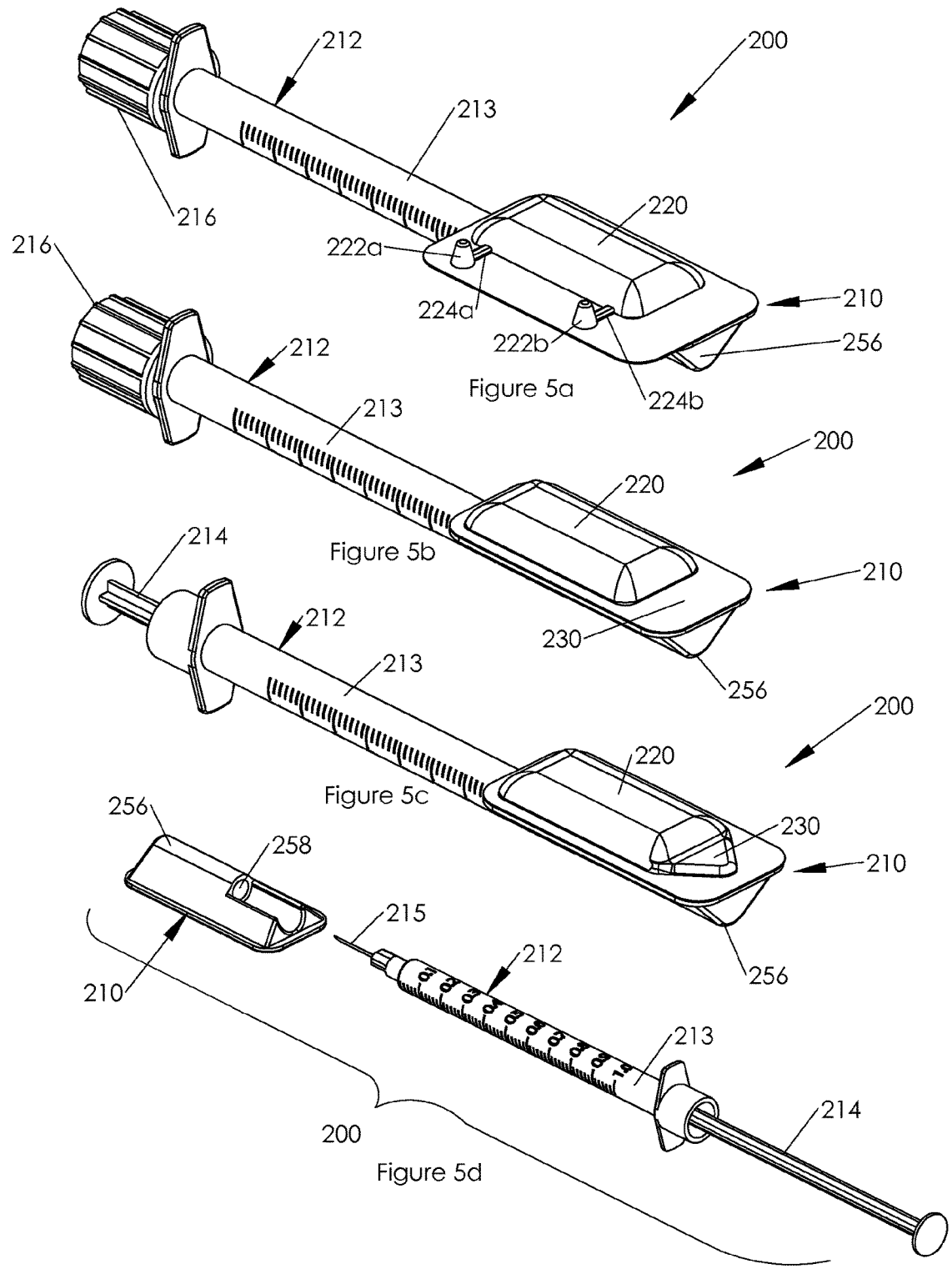

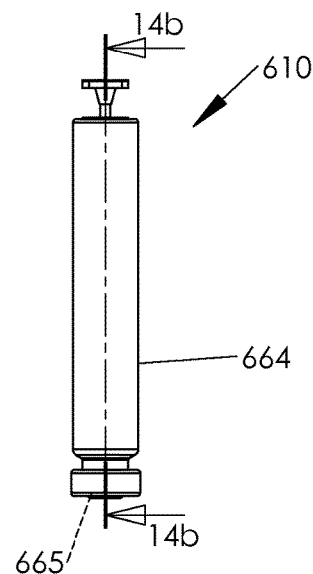
Figure 14a
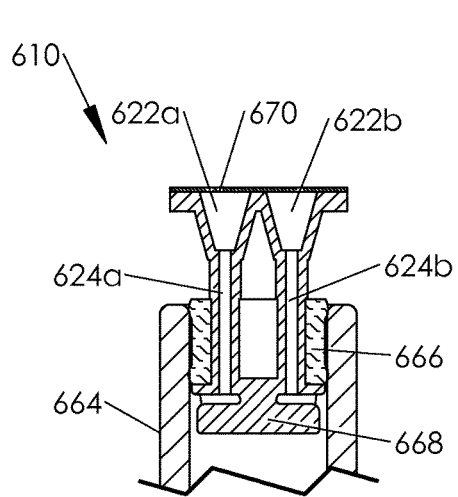
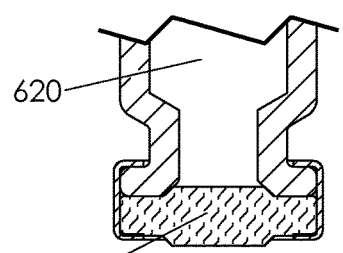
Figure 14b
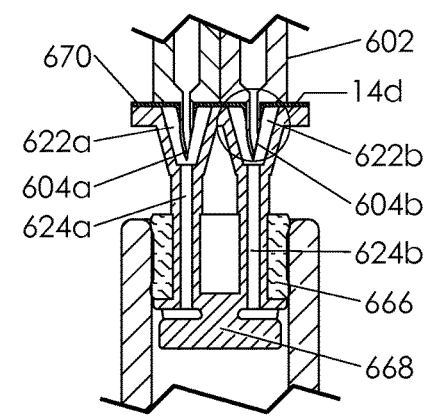
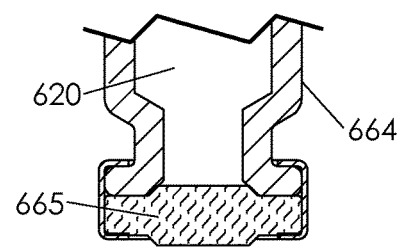
Figure 14bc

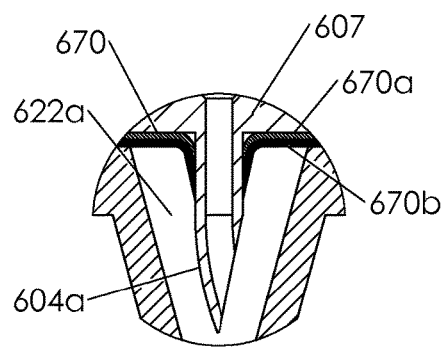
Figure 14d
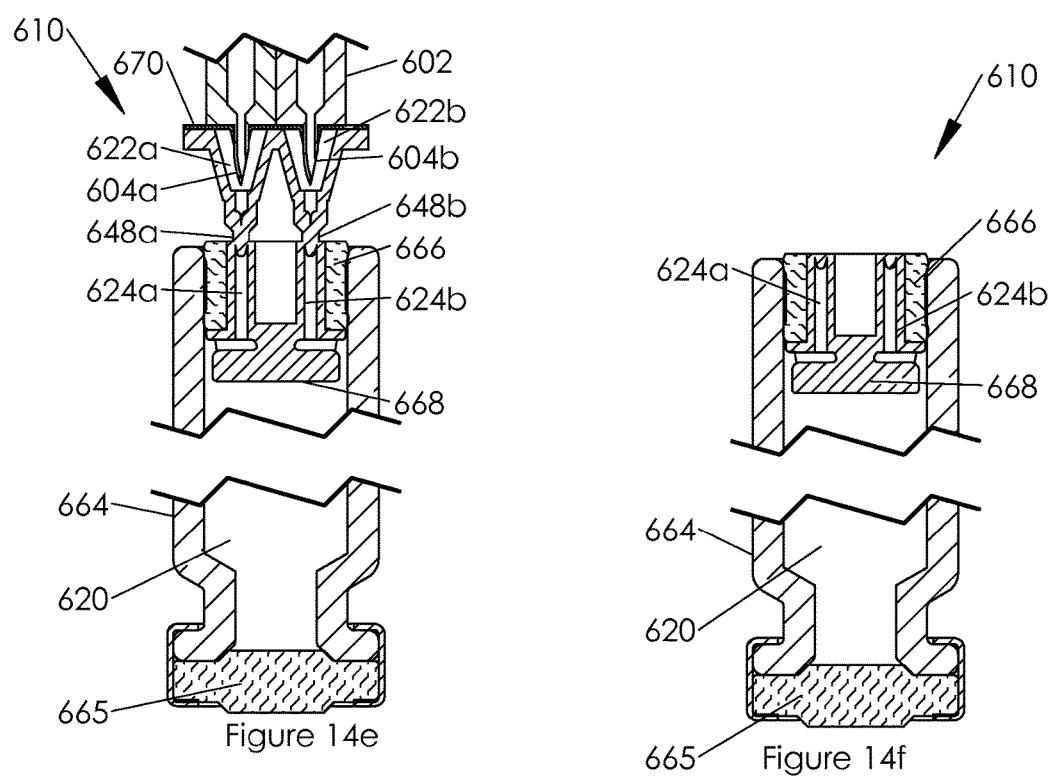
Figure 14e
Figure 14f

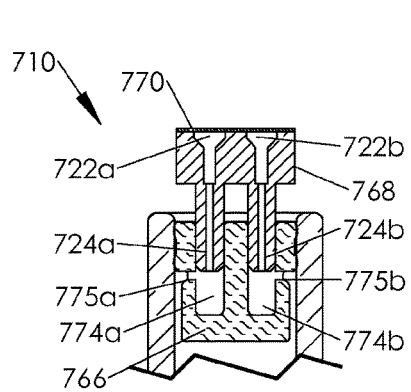
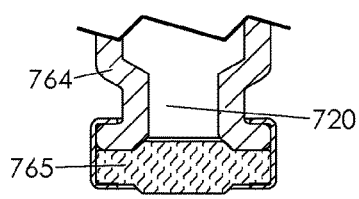
Figure 15a
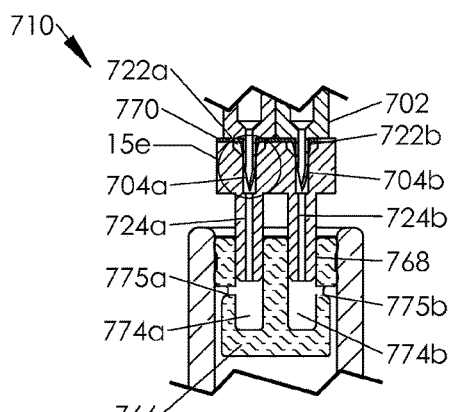
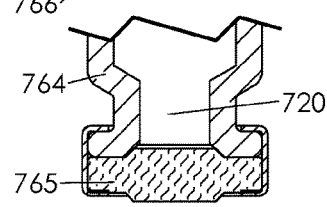
Figure 15b
Figure 15e
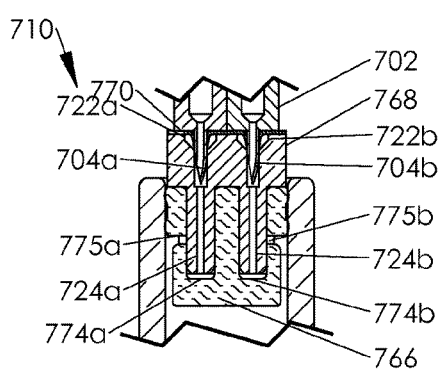
Figure 15c
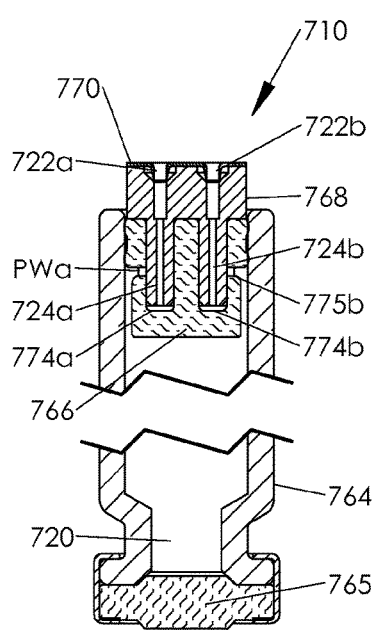
Figure 15d

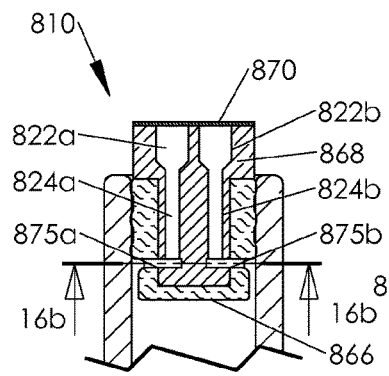
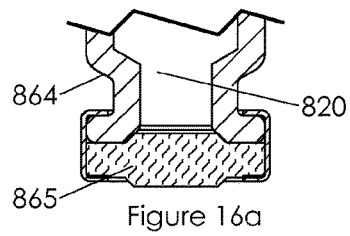
Figure 16a
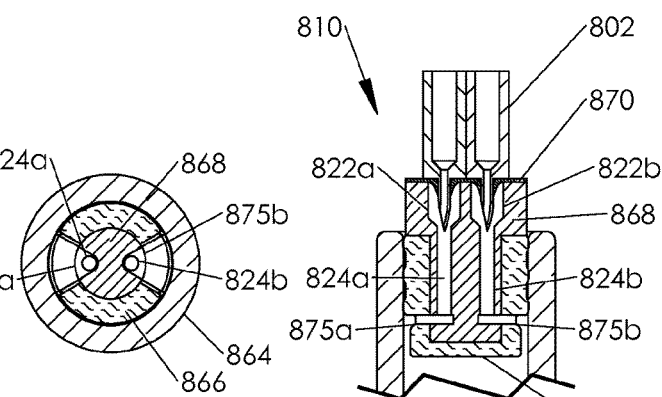
Figure 16b
Figure 16c
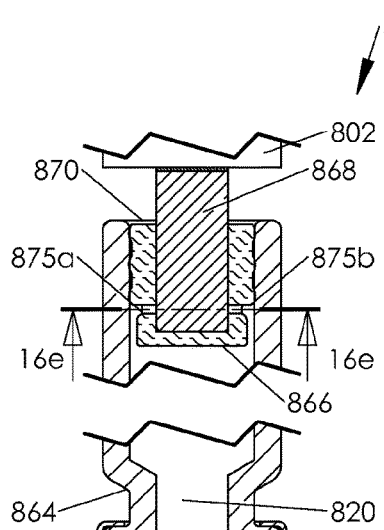
Figure 16d
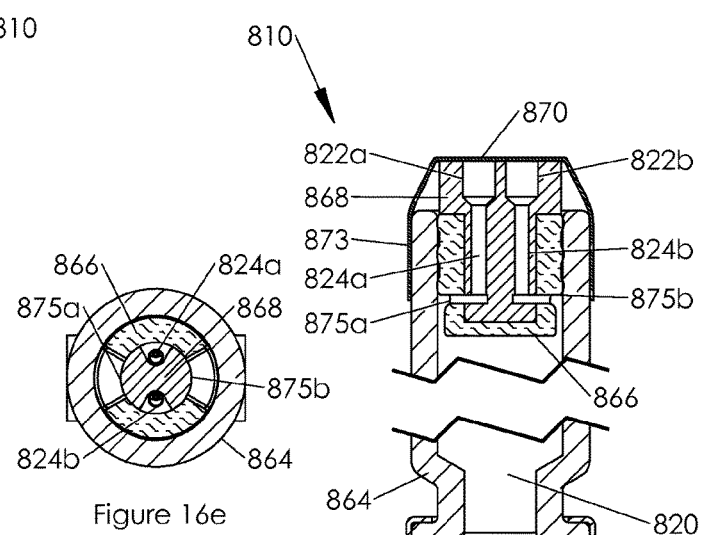
Figure 16e
Figure 16f

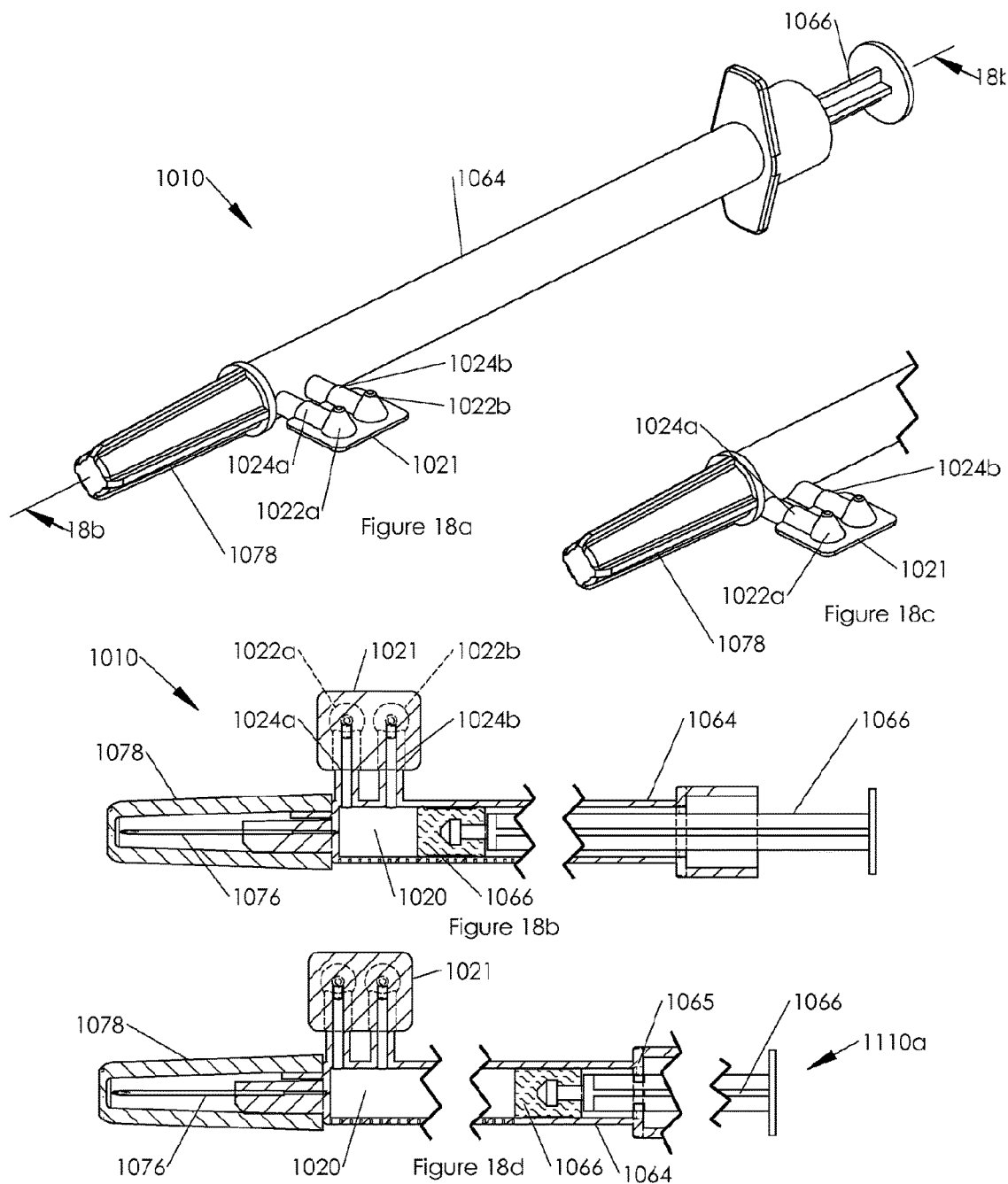

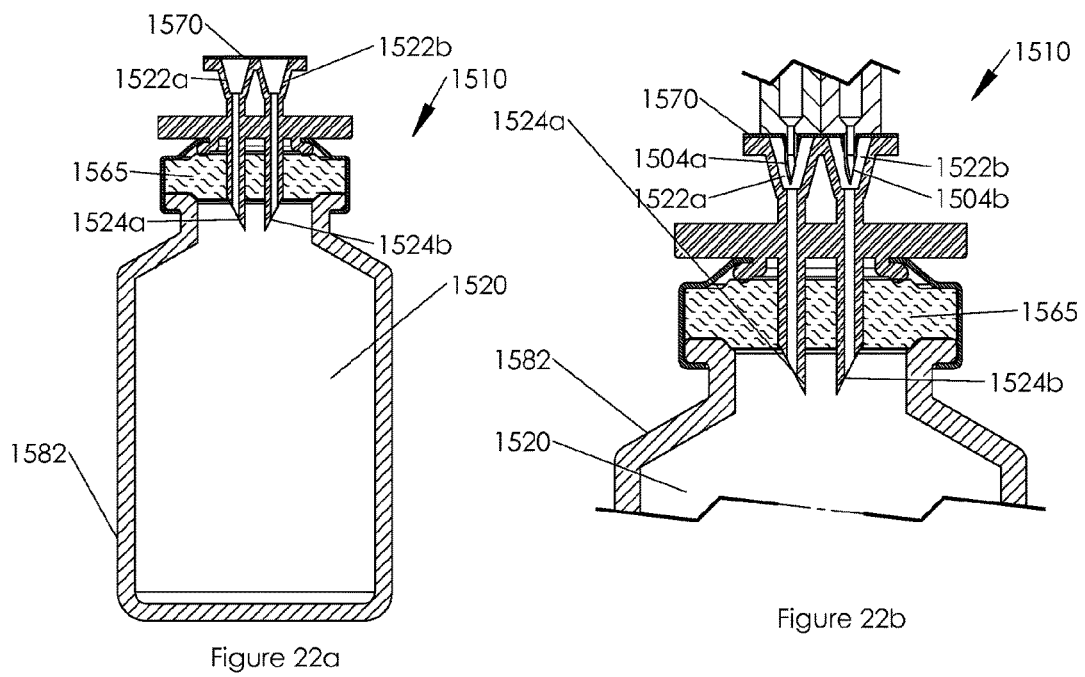
Figure 22a
Figure 22b
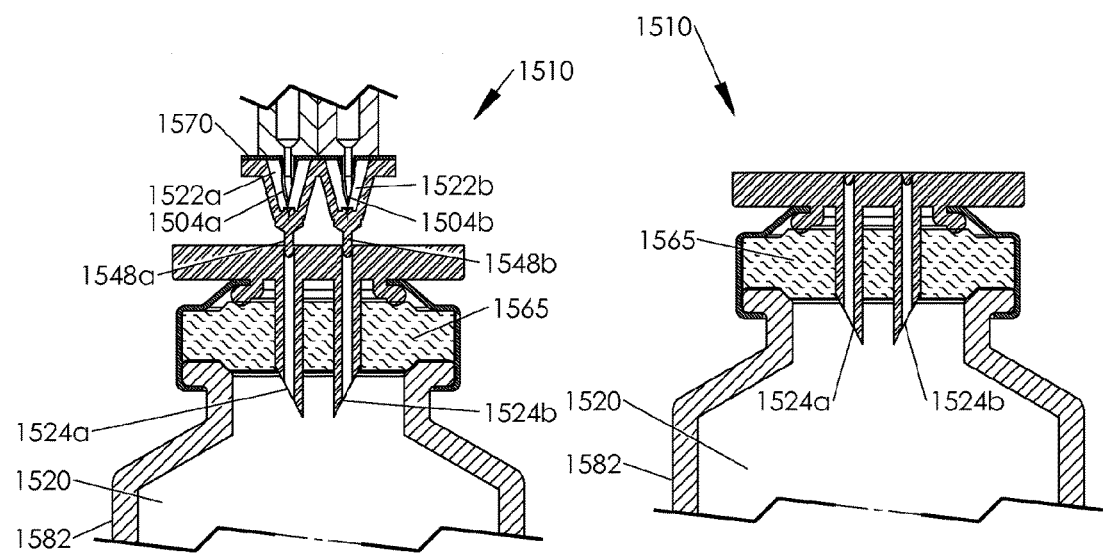
Figure 22c
Figure 22d

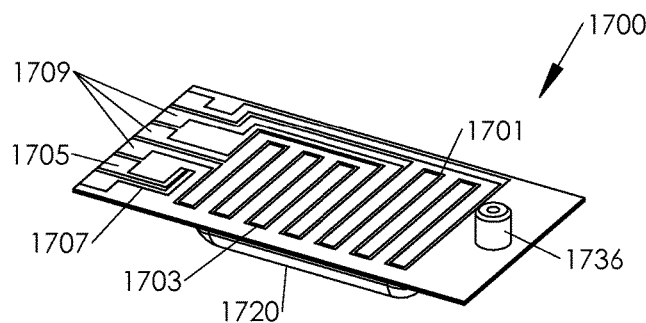
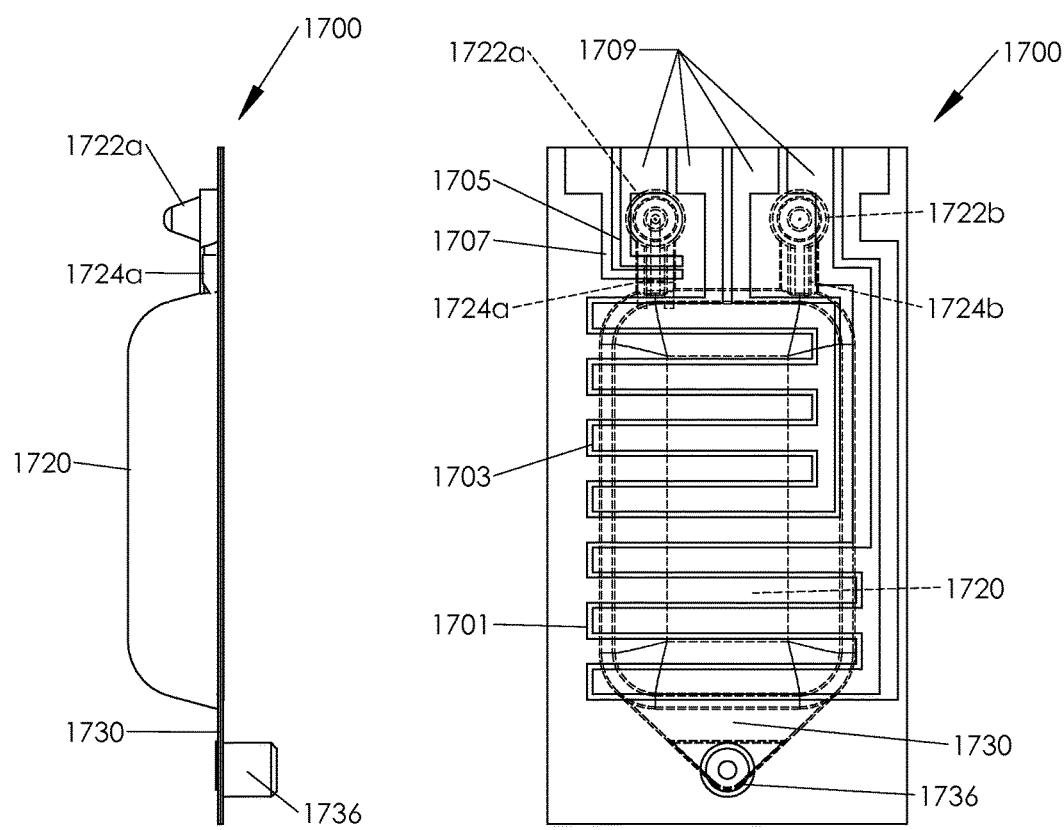
Figure 24a
Figure 24b
Figure 24c

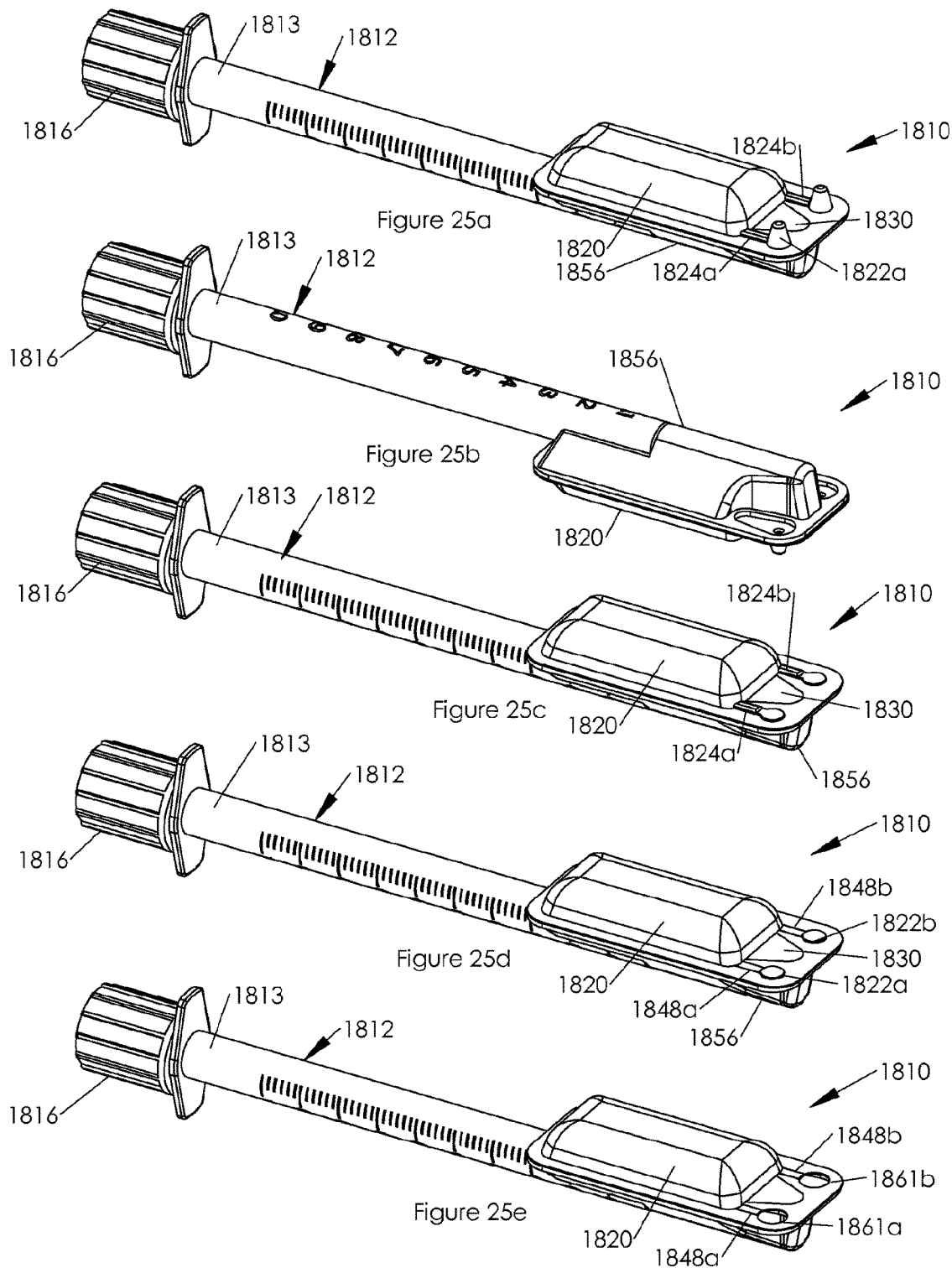

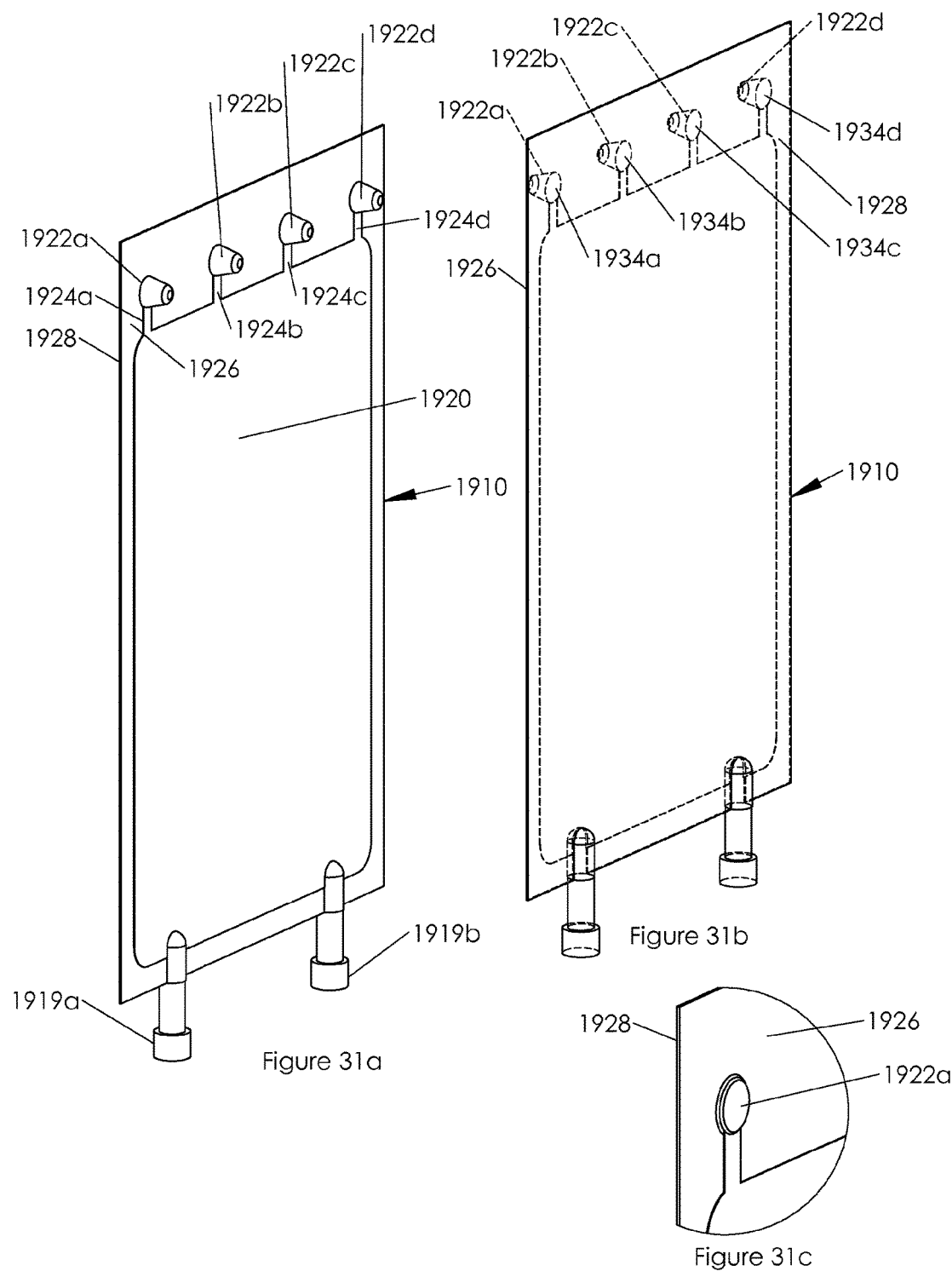

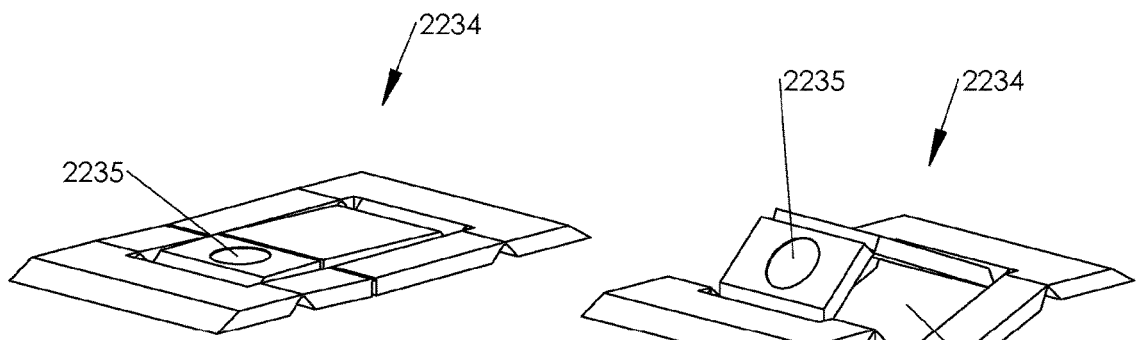
Figure 34a
Figure 34c
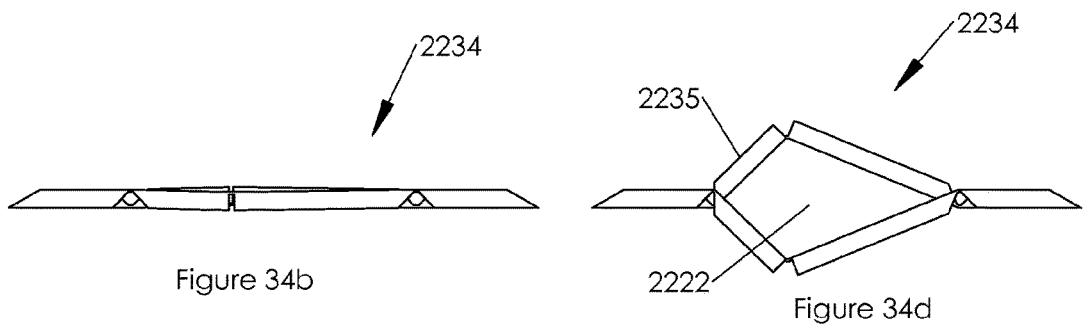
Figure 34b
Figure 34d

FILING SYSTEM AND METHODS FOR ASEPTIC CARTRIDGE AND DISPENSER ARRANGEMENT

TECHNICAL FIELD

The present disclosure preferably, but without limitation, generally pertains to sealed packages, and more specifically pertains pre-fillable sterile packages and method of filling thereof.

BACKGROUND

Medications, and in particular injectable medications, need to be stored sterile in aseptic commercial packages until the time of use. Some medications are stored in pre-filled single dose dispensing devices such as pre-filled syringes, for example, the pre-filled syringes from Vetter (Ravensburg, Germany). Yet most of injectable medication are stored in aseptic packages and are transferred to a dispensing device (i.e., drug delivery device) shortly before use. The term dispensing device include without limitation hypodermic syringes, micro needle syringes, micropumps, autoinjectors, jet injectors, topical dispensers, intradermal delivery devices, patch pumps, auricular dispensers, oral dispensers, eye droppers, autoinjectors, infusers, prefillable syringes, pre-filled syringes, cartridges for pen injectors, cartridges for auto-injectors, or any other type of drug delivery device.

Several aseptic packages for storing injectable medications are commercially available. Perhaps the most common aseptic package for injectable products is glass vials. Some medications are stored in separate vials and are mixed just prior to use. Often this is done to improve the medication's stability or to extend the medication's shelf life. In one example, the medication is a vaccine that is kept dry in one vial to extend the vaccine thermo stability, and a companion vial stores a diluent that is dispensed to the vaccine vial via a syringe and needle prior to injection. In another example, the medication is a vaccine where one vial stores the formulated antigen and the second vial stores an adjuvant.

Several existing products include a flexible package made from film or foils in which a product can be stored in an aseptic manner until the time of use. Some of these products further include a dispensing port communicating with the product in the dispensing package. In some cases, a rupturable barrier is presented between the port and the product to enhance the integrity of the package until the time of use. These flexible packages may comprise at least two product compartments that are mergeable prior to use to allow the substances from the different compartments to mix and form the dispensable product. In some cases, these packages are made from a film or a foil (together referred to as webs or web walls) where a first web wall is sealed to a second web wall to define the boundaries of a product compartment. These packages are sometimes referred to as bags, blisters, pouches or sachets.

Packages for drugs, pharmaceutical agents or other beneficial agents are sometimes referred to as containers, primary containers, and container-closure systems. Packages are typically filled using a filling system. In the broader sense, fillings systems are configured to receive a package empty, fill the package, seal the package, and in some instances further arrange the package in a secondary package. At the filling step, the package is filled with one or more materials that are typically measured to receive a precise dose in the package. For liquids and other flowable substances, metering pumps are used to measure a precise dose into the package. Weighing the package is another common method of measuring a dose into a package. For powders, solids, and non-fluidic substances, filling systems may incorporate a volumetric transfer instrument or an acoustic measuring system to facilitate filling a precisely measured dose into a package.

In most cases, the package is received at the filling system open, or it is open during the filling step such that the interior of the package is exposed to the surrounding environment. For pharmaceutical products, and particularly for sterile products that are administered parenteral such as by intravenous (IV) infusion and injection, rigorous measures are taken to prevent contamination, foreign biologic matter, and foreign particulates from entering into the container. In several cases, the pharmaceutical ingredient cannot be sterilized after filling, hence the filling process is executed using pre-sterilized packages in a controlled clean environment. Several types of filling systems incorporate the steps of receiving open packages, washing, drying, sterilizing, and inspecting the packages prior to filling. After filling, the packages are sealed, still in the controlled environment, by joining the walls of the package or by introducing a closure to the package.

The filling process described above requires a sophisticated filling system that involves very high capital equipment expenditures and operation costs to the pharmaceutical filling company. These systems typically occupy significant and expensive clean-room space at the filling site while having a limited production throughput.

Some of the foregoing shortfalls have been partially addressed by several packaging suppliers. The Stevanato Group, Nuovo Ompi division (Padua, Italy) provides pre-fillable containers that have been pre-washed, sterilized and inspected, in sterile nesting trays, hence avoiding some of the upstream steps of preparation steps prior to filling.

Aseptic Technologies S.A. (Les Isnes, Belgium), and Medinstill (New Milford, Conn.) provide a pre-sterilized, sealed containers, particularly vials, and filling systems for accessing the container by piercing a rubber stopper with a piercing member, in a form of a needle, by which the package is filled; and resealing the access region after the package has been filled and the piercing member has been removed. Using such methods, these containers and filling systems avoid a number of upstream preparations typically required as filling steps at the filling site. Accessing the package for filling in a fluid-tight fashion, while the package is otherwise closed, reduces the risk of exposure of the interior of the package to contaminants, and can potentially reduce the controlled environment requirements during filling. The foregoing technologies have the potential of reducing capital equipment and filling operation complexities and costs while reducing contamination risks. However, such filling systems would benefit from further simplification and minimization of downstream operations after filling.

One limitation that is common to the foregoing filling systems is the challenge to scale up production on a single line because of the filling metering systems. Whether the filled dose requires weighing or metering with a pump, manufacturing scale up require more measuring systems installed and operated on a single line, thereby resulting in more expensive, larger, and less reliable filling systems. Therefore, filling metering systems that allow manufacturing scale up without compromising reliability or increasing the system size and costs would be an important advance in this field.

In some package applications, another limitation is the presence of air bubbles in the package after filling (i.e., sometimes referred to as headspace). Head space, and particularly inconsistency of head space, in a package may affect the accuracy of the dose received by a patient. This is particularly true with cartridges for pen injectors and auto injectors with limited options for removing air bubbles prior to injection, and where air may be injected to the patient in place of the actual drug. Another problem with headspace in the package is that some pharmaceutical products are sensitive to interaction with air, hence the presence of air bubbles may adversely affect the drug stability and efficacy.

The packages and packaging limitation listed above are valid in other industries beside the pharmaceutical industry, including, for example, medical device packaging, food packaging, cosmetic packaging, and nutraceuticals packaging.

SUMMARY

At least some aspects of the present disclosure overcome the disadvantages and limitations of the prior art by providing, for example, a low cost, simple and easy to fill package. Some aspects of the present disclosure provides an improved package and filling method thereof that simplify and minimizes the filling process avoiding several upstream and downstream steps to the filling step. Some aspects of the present disclosure provide a package and filling method thereof that eliminates headspace. Some aspects of the present disclosure eliminate and package or pre-filled delivery device assembly steps on the filling line. Another aspect of the present disclosure is to provide a package and a filling method thereof that allows economic scale up without compromising the filling system reliability.

The terms dispenser, dispensing device, delivery device and delivering device are used interchangeably herein. The terms package, container, primary container, and container-closure system are used interchangeably herein. The term beneficial agent in pharmaceutical application may refer to a pharmaceutical product such as drug, a biologic drug, a substance of a drug, a vaccine, an adjuvant, a preservative, a diluent, a buffer and other materials that may need to be in the package for a specific application. Furthermore, in pharmaceutical applications the beneficial agent may be a material introduced to the package in the process of filling the package for filling or after filling including, a flushing material, a washing material, a chemical agent, a decontamination agent, a cleaning agent, a surfactant, a sterilization agent, hydrogen peroxide vapor, ethylene oxide, steam, sterile water, sterile air, nitrogen, solid object to enhance mechanical mixing during agitation, etc. The beneficial agent and its constituents may be in one or more formats including, a fluid, a liquid, a vapor, a solution, a suspension, a paste, a gel, a slurry, a frozen liquid, a gas, a solid, a powder, a lyophilized cake, granules, pellets, capsules, and tablets.

The term filling refers to accessing the package to introduce material to the package. Filling further refers to introducing a beneficial agent to be sealed in the package and introducing a beneficial agent that is instantly removed from the package. Filling also refers to introducing or removing a beneficial agent after it has interacted with other materials in the package and after it has been contained in the package for a certain time. Filling refers to introducing a material to the package flowing through an accessing device or by releasing it from the surface or from within the accessing device.

One aspect of the present disclosure relates to a package for use with a beneficial agent delivery device. The package includes at least one filling chamber having a sealed penetrable access region, at least one compartment configured to hold a content, wherein the content includes at least one of a beneficial agent or a constituent of a beneficial agent, and at least one channel connecting the at least one filling chamber in fluid communication with the at least one compartment. At least a portion of the package is resealable to contain the content.

The package may include a delivery member operable to remove at least some of the content from the at least one compartment. The delivery member may be operable between a retracted position and a delivery position. The at least one filling chamber may include a plurality of filling chambers. At least one of the filling chambers may be configured for filling the at least one compartment. At least one of the filling chambers may be configured for removing content from the at least one compartment. The at least one compartment may include a plurality of compartments. The plurality of compartments may be separated by at least one frangible seal. The at least one channel may include a plurality of channels. At least one of the channels may be configured for filling the at least one compartment. At least one of the channels may be configured for removing content from the at least one compartment.

The package may include a pre-formed port associated with each of the plurality of filling chambers. The package may include a fitment configured to deliver the content from the at least one compartment. The fitment may include one of a needle, a canula, a catheter, a tube, a connector, a Luer connector, a nozzle, a spray nozzle, a jet nozzle, a dispenser, an oral dispenser, a auricular dispenser, an ocular dispenser, a topical dispenser, or a coupler. The package may include at least first and second walls, the first wall at least partially defining the at least one filling chamber, the at least one channel, and the at least one compartment formed therein. At least a portion of one of the first and second walls may include a flexible material. At least a portion of one of the first and second walls may include one of a film and a foil material.

The package may include a weakened portion to facilitate detaching the at least one chamber from the package. The package may include an insert positioned in one of the at least one chamber and the at least one channel. The insert may be configured to direct flow of the content into a predetermined area of the at least one compartment. The insert may be configured to facilitate sealing of the at least one channel. The package may include a sealing insert portion in the at least one chamber. The at least one channel may be configured to direct flow of the content onto a wall that defines a portion of the at least one compartment to minimize air mixing in the content during filling. At least one of the at least one channel, the at least one chamber, and the at least one compartment may be sealable.

The package may include a resealable region, the resealable region being different from the access region. At least a portion of the package may be resealable. The portion of the package may be the at least one filling chamber. The portion of the package may be the at least one channel. The portion of the package may be the at least one compartment. The package may be supported by a backing. The backing may include a syringe. The package may include at least one pre-formed port formed in the backing and aligned with the at least one filling chamber. The package may be connectable to a delivery device. The package may include a cap removably positioned on the delivery device. The package may include a blow molded container. The package may include a molded container. The package may include a blister construction. The package may be formed as a single, unitary body.

The plurality of channel may be arranged in fluid communication with one another. The plurality of chambers may be arranged in fluid communication with one another. The package may include a fitment, at least a portion of the fitment being positioned between the first and second layers. The package may include a fitment connected to an external surface of the package. The package may include a plurality of compartments and a plurality of channels, wherein the at least one filling chamber may be connected in flow communication with the plurality of compartments using the plurality of channels. The package may include a plurality of filling chambers and a plurality of channels, wherein the plurality of filing chambers are connected in flow communication with the at least one compartment using the plurality of channels. The package may include at least a portion of a heating element arranged in contact with a wall that defines at least a portion of the at least one compartment. The package may include a wall defining at least a portion of the at least one compartment, the wall comprising at least a portion of a heating element. The package may include at least a portion of a sensor configured to sense the presence of the content in the package. The package may include a seal configured to seal the access region, the seal being position externally to the at least one chamber. The seal may be configured to seal the access region, the seal being positioned internally of the at least one chamber. The at least one compartment may be connected in flow communication with a delivery device.

The package may include a syringe. At least a portion of the at least one compartment may be defined between a plunger and a barrel of the syringe. The package may include a cartridge. At least a portion of the at least one compartment may be defined by one of a barrel and a plunger of the cartridge. The package may include an adapter comprising the at least one channel and the at least one chamber. The at least one channel may be movable to seal the at least one channel. The at least one channel may move linearly. The at least one channel may move rotationally. The syringe may include a plurality of plungers. The plungers may be movable during filling of the package with the content. The syringe may include a single plunger, the single plunger being may be immovable during filling of the package. At least one of the plungers may be immovable during filling of the package. At least one of the compartments may evacuate at one end and fills at an opposite end. The package may include a dual compartment syringe. At least one separate channel may be in fluid communication with each compartment of the syringe.

The at least one channel may penetrate through a septum of the package into the at least one compartment. The at least one channel may penetrates through a wall of the package. The wall may include a rubber stopper. The rubber stopper may be a closure for the package. The at least a portion of the package may have a reduced structural integrity as compared to a structural integrity of a surrounding portion of the package so that the at least one chamber may be removable from the package. The at least one channel may be biased away from a wall of the at least one compartment. The at least one access region may include an openable barrier, the openable barrier comprising one of a film, a foil, a rubber, and a molded part. The openable barrier may form a fluid tight seal around a device that pierces the access region.

The at least one chamber may be configured to receive at least one of a flashing fluid, air, gas, dry gas, a decontamination fluid, beneficial agent or a constituent thereof. The at least one chamber may be configured to remove from the package at least one of a flashing fluid, air, gas, dry gas, a decontamination fluid, beneficial agent or a constituent thereof. At least a portion of at least one of the at least one channel and the at least one chamber may be collapsible to deliver content held therein into one of the at least one compartment and an external device. At least a portion of the at least one chamber may be collapsible to deliver content held therein into one of the at least one compartment and an external device.

The package may be structurally joined to at least one other package. At least one compartment of at least a first package and at least one compartment of at least a second package share a at least one of the at least one channel and the at least one chamber. The package may include a delivery device connected to the package and operable to deliver the content from the package. The delivery device may include a syringe. The package may include a sealing insert positioned in at least one of the at least one channel and the at least one chamber, the sealing insert being configured to move from an opened position to a sealed position. The at least one channel may include a tubular structure with a pointed tip.

Another aspect of the present disclosure relates to a package for use with a beneficial agent delivery device. The package includes at least one filling chamber, at least one compartment for receiving a content via the filling chamber, the content comprising at least one of a beneficial agent or a constituent of a beneficial agent, at least one channel connecting the at least one filling chamber in fluid communication with the at least one compartment, and a content sealed in the at least one compartment.

The at least one compartment may include a first compartment holding a liquid content, and a second compartment holding a non-fluidic content. The at least one channel may be sealed. The at least one filling chamber may be resealable. The content may be a powder. The at least one filling chamber may include a plurality of filling chambers. The at least one channel may include a plurality of channels. The package may include a sealing insert positioned in at least one of the at least one channel and the at least one chamber, the sealing insert being configured to move from an opened position to a sealed position.

Another aspect of the present disclosure relates to a device for delivery of a content. The device includes a package and a delivery device. The package includes at least one compartment configured to hold the content, wherein the content includes at least one of a beneficial agent and a constituent of a beneficial agent, at least one filling chamber having a sealed penetrable access region, and at least one channel connecting the at least one compartment in flow communication with the at least one filling chamber. The delivery device is connected to the package and operable to deliver the content from the package.

The delivery device may include a syringe. The package may be configured to direct the content from the at least one filling chamber, through the at least one channel, and into the at least one compartment. The at least one compartment may include a plurality of compartments. The at least one filling chamber may include a plurality of filling chambers. The at least one channel may include a plurality of channels. The access region may provide fluid communication between the filling channel and an external system. At least one of the at least one filling channel, the at least one filling chamber, and the at least one compartment may be sealable. The access region may be configured to wipe a piercing member extending there through to limit foreign particles and contamination from reaching the at least one filling channel. The device may include a sealing insert positioned in at least one of the at least one channel and the at least one chamber, the sealing insert being configured to move from an opened position to a sealed position. One of the filling chambers may be used to evacuate the at least one compartment. One of the filling chambers may be used to fill the at least one compartment.

Another aspect of the present disclosure relates to a filling adapter for use in filling a package that includes at least one compartment for storing a content, the content including at least one of a beneficial agent or a constituent thereof. The filling adapter includes an adapter body comprising at least one channel connectable to at least one compartment of the package, and at least one filling chamber in flow communication with the at least one channel, the at least one filling chamber having a sealed penetrable access region.

The access region may be configured to be opened by a piercing member. The access region provides a fluid-tight seal with the piercing member. The barrier may include at least one of a foil, rubber, and molded plastic. At least one of the at least one channel, the at least one filling chamber, and the at least one compartment may be resealable. The adapter may include a resealing member configured to move from an opened position to a sealed position. The resealing member may be configured to heat seal one of the at least one channel and the at least one filling chamber. The adapter may be supported by a backing.

The adapter may include a sealing insert positioned in at least one of the at least one channel and the at least one chamber, the sealing insert being configured to move from an opened position to a sealed position. The resealing member may be different from the access region. The adapter may be configured to fill the at least one compartment of the package with the content. The adapter may be configured to remove gas from the at least one compartment of the package. The filling adapter may be formed integrally with at least a portion of the package.

Another aspect of the present disclosure relates to a filling system that includes at least one body for receiving a package, the package comprising at least one filling chamber, at least one channel, and at least one compartment, at least one piercing element operable to pierce the sealed package at an access region, and at least one sealing member operable to seal the package.

The body may include a cavity for holding a package, comprising a region for at least one of at least one filling chamber, at least one channel, and at least one compartment. The piercing element may be configured to at least one of fill content into the package and remove content from the package. The piercing element pierces the package to access the at least one filling chamber. The cavity and the at least one compartment may be congruent. The filling system may have a controllable pressure therein configured to retain a wall of the package congruently in the cavity. The vacuum force may maintain at least a portion of a wall of the compartment congruent with the cavity. The filling system may provide a vacuum force that enhances a fluid-tight seal between the filling system and the access region.

The sealing member may be operable to seal the at least one channel with a heat seal. The sealing member may be operable to seal by at least one of heat sealing, pinching, linear actuation, and rotational actuation. The filling system may include a sensor operable to to sense a fluid in at least one the channel and chamber. The filling system may include a valve operable to stop filling of the at least one compartment. The filling system may include a washing device operable to wash the package. The at least one sealing member may be configured to seal the package while the access region may be being accessed. The filling system may include a plurality of piercing elements. The filling system may include a plurality of sealing members. The filling system may include at least one piercing element and the at least one sealing member are configured to pierce a plurality of access regions and perform plurality of seals in sequence. The sequence may include at least one of filling and removing at least one of air, a content, a beneficial agent, a decontamination agent, a disinfectant agent, a cleaning agent, a sterilization agent, a flushing fluid, a fluid, a liquid, a gas, a suspension, a gel, a paste, a powder, pellet, granules, a dry substance, a drying agent, vapor, moisture, and a constituent.

The filling system may provide inspecting content removed from the package. The filling system may provide inspecting the content of the package by analyzing at least one of chemical composition, chemical concentrations, presence and concentration of particles, presence and concentration of particles larger than 50 microns, color, optical absorbance, optical reflectance, optical scattering, optical interference, pH, oxidation, conductivity, total organic carbons, and turbidity of the material. The filling system may include an instrument for substantially emptying the at least one filling chamber by one of collapsing the at least one filling chamber and removing content with the piercing element. The at least one filling chamber may be sealed from the at least one compartment prior to emptying the at least one filling chamber. The at least one filling chamber may be sealed from the at least one compartment after emptying the at least one filling chamber.

The filling system may include a fluidic system comprising at least one reservoir for at least one of receiving content from and delivering content to the package. The fluidic system may include the at least one piercing element. The at least one piercing element may be in fluid communication with the at least one reservoir via a tube. At least a portion of the fluidic system may be disposable. The filling system may include a preparation system for preparing the at least one piercing element and the access region for access by the at least one piercing element. The preparation system may include at least one of wiping, radiating, UV illuminating, IR radiating, flushing, purging, puffing, and dispensing at least one of a cleaning agent, decontamination agent, sterilization agent, hydrogen-peroxide vapor, ethylene-oxide, sterile water, sterile air, water vapor, gas, and nitrogen gas to at least one of the at least one piercing element and the access region.

Another aspect of the present disclosure relates to an adapter for a package. The adapter includes an interface to the package maintaining the sealed integrity of the package, at least one channel having a sealable portion, and at least one chamber comprising an openable access region, the access region being configured to open by insertion of a piercing member through the access region. The sealable portion is sealable while the access region is pierced by the piercing member.

The access region may provide a fluid-tight seal with the piercing member. The access region may include at least one of a web portion, molded plastic, and rubber, pierceable by the piercing member. The adapter may include a resealing insert positioned in the at least one channel and the at least one chamber. The access region may be configured to receive a plurality of piercing members. At least a portion the adapter may be removable after sealing the sealing portion. The interface may be configured to be connected to one of a syringe, a cartridge, a vial, a plunger, a blister, a pouch, a bag, a sachet a cap, a syringe cap, and a needle cap, an infusion bag, a can, a canister, and a tube.

The adapter may include a portion of one of a syringe, a cartridge, a vial, a plunger, a blister, a pouch, a bag, a sachet a cap, a syringe cap, and a needle cap, an infusion bag, a can, a canister, and a tube. At least a portion of the adapter may be integrated into one of a flexible package, a blister, a pouch, a film, a foil, a syringe, a cartridge, a vial, a plunger, a blister, a pouch, a bag, a cap, a syringe cap, and a needle cap. At least a portion of the adapter may be formed in a blow-molded package. The adapter may be configured to be joined to a plunger of a delivery device. At least a portion of the at least one channel may be moveable from an open position to a sealed position. At least a portion of the at least one channel may be heat sealable.

The adapter may be supported by a backing. The backing facilitates forming a seal with the piercing member that pierces the access region. The adapter may be arranged in flow communication with a plurality of compartments. The adapter may be arranged in flow communication with a plurality of packages. A portion of the adapter may be collapsible. At least a portion of the adapter may be movable from a storage configuration to a ready configuration wherein the chamber receives the piercing member. At least one wall of the package may be a flexible wall. The package may include one of a blister, a pouch, a sachet, a bag, a tube, a sleeve, a reservoir, a reservoir of a pump, a reservoir of an injector, a reservoir of an infusor, an infusion bag, and a blow-molded container.

The present disclosure may also be directed to a syringe, a cartridge, a multi-chamber syringe, and a flexible package comprising the adapter disclosed herein.

A further aspect of the present disclosure relates to a method of creating a sealed package containing a sterile content, the content comprising at least one of a beneficial agent or a constituent thereof. The method includes forming a package comprising at least one filling chamber, at least one compartment configured to hold the content, and at least one channel connecting the at least one filling chamber in fluid communication with the at least one compartment, and filling the package with the content while maintaining the at least one filling chamber, at least one compartment, and at least one channel immovable relative to each other.

Another aspect of the present disclosure is directed to a method of creating a package containing a sterile content, the content comprising at least one of a beneficial agent or a constituent thereof. The method providing a sealed, sterile package comprising at least one filling chamber, at least one compartment configured to hold the content, and at least one channel connecting the at least one filling chamber in fluid communication with the at least one compartment, and filling the package with the content while maintaining a fixed volume for the package.

The method may include providing a cavity sized to hold the package during filling, the cavity maintaining the fixed volume for the package. The package may be tilted relative to a horizontal plane during filling. The at least one filling chamber may include first and second filling chambers and the at least one channel may include first and second channels, the second filling chamber communicating with the at least one compartment via the second channel, and material may be removed from the package through the second channel during filling. The material may be a gas. During filling, the second channel may be oriented such that a connection of the second channel with the at least one compartment may be elevated relative to a connection of the first channel with the at least one compartment.

Another aspect of the present disclosure relates to a method of sterile filling a pre-sealed package with a content, the content comprising at least one of a beneficial agent or a constituent thereof, wherein the package comprises at least one filling chamber, at least one compartment configured to hold the content, and at least one channel connecting the at least one filling chamber in fluid communication with the at least one compartment. The method includes opening the pre-sealed package at a penetrable access region to access the at least one filling chamber, filling the at least one compartment via the at least one filling chamber and at least one channel, and resealing the package.

The method may include maintaining sterility of the package while opening, filling and resealing the package. The package may be opened by piercing the at least one chamber with a piercing member. The package may be resealed by sealing the at least one channel. The penetrable access region of the package may be pierced by a piercing member and may be filled through the piercing member. The method may include removing material from the package. Removing material from the package may occur during filling. The method may include inspecting the material that may be removed from the package. The method may include disqualifying the package based on the inspection.

The at least one filling chamber may include first and second filling chambers, and the at least one channel may include first and second channels, and the material may be removed through the second chamber and the second channel. The method may include, prior to filling, at least one of introducing and removing at least one of a flushing fluid, a rinsing fluid, a decontamination fluid, a sterilization fluid, a chemical agent and a test reagent from the at least one compartment. The method may include resealing after the at least one of introducing and removing and prior to filling. The method may include filling through one of the at least one channel, and at least one of introducing and removing through another of the at least one channel. The method may include filling and at least one of introducing and removing through a common one of the at least one channels. The method may include piercing the at least one chamber with a piercing member, the method comprising at least one of filling and exhausting the at least one compartment and removing from the at least one compartment through the piercing member. The method may include inspecting the removed material.

The at least one channel includes a first channel for filling the at least one compartment and a second channel for exhausting gas from the at least one compartment, the method further comprising tilting the package prior to filling the at least one compartment to orient the second channel vertically higher than the first channel. The method may include maintain a fixed volume of the package during filling. The method may include moving a wall of the container prior or during filling to define the container filled configuration. Moving the wall may include one of moving a plunger or holding a flexible wall in a cavity of the package. The method may include detaining a plunger in a filled position prior to or during filling. The method may include inspecting the package after resealing. The method may include drying the content after filling the at least one compartment. The at least one chamber may include a plurality of chambers, and drying occurs through separate of the plurality of chambers. The method may include joining the package to a backing prior to at least one of sterilizing the package and filling the at least one compartment. The method may include joining the package to a backing after at least one of sterilizing the package and filling the at least one compartment. The method may include removing a portion of the package after resealing. The method may include inspecting the package prior to opening.

The method may include inspecting the package after resealing. The method may include providing a sensor and sensing a fill state of the at least one compartment with the sensor. The at least one channel includes a first channel configured to delivery the content to the at least one compartment, and a second channel configured to remove gas from the at least one compartment, the sensor sensing at least one property of a fluid in the second channel. Resealing may include one of displacing a portion of the at least one channel, heat sealing a portion of the package, and melting a fuse. Filling may include filling through a port formed in the backing. The method may include forming a fluid-tight seal between the piercing member and the package. The at least one compartment includes a plurality of compartments, and filling includes filling at least two of the plurality of compartments. At least one of filling and removing material may occur while the package may be joined to at least one other package. The method may include simultaneously at least one of filling and removing material from the package and the at least one other package. At least one of filling and removing material may occur through a common one of the at least one filling chamber or a common one of the at least one channel. The package may be resealed while the at least one filling chamber may be open. The method may include preparing at least one of the penetrable access region and the piercing member for aseptic filling. Preparing may include at least one of applying UV radiation, wiping, swabbing, or puffing at least one of a cleaning agent, a disinfectant, or a decontamination agent.

The method may include wiping the piercing member while passing the piercing member through the penetrable access region into the at least one filling chamber, and wiping may remove foreign particulates from the piercing member. The at least one compartment may include at least first and second compartments, the method further comprising at least one of filling and removing for the second compartment by a different method than at least one of filling and removing for the first compartment. The method may include removing all air from the at least one compartment. The method may include substantially emptying the at least one filling chamber after resealing the package by at least one of removing material with the piercing member and collapsing the at least one filling chamber. The method may include substantially emptying the at least one filling chamber before resealing the package by collapsing the at least one filling chamber. The method may include providing the package sterile for filling.

The package further may include a delivery device, and the method includes providing the package sterile to filling. The penetrable access region may include a web barrier, the method comprising forming a fluid-tight seal between the piercing member and the web barrier. The method may include moving the at least one channel from a first position to a second position to establish fluid communication between the at least one chamber and the at least one compartment. The at least one channel may be moved to provide access into the at least one compartment. The method may include drying the content in the at least one compartment by introducing a drying agent through the at least one channel and removing moisture through the at least one channel. The method may include controlling at least one of the pressure and temperature in the at least one compartment. The at least one channel includes a plurality of channels, the method further comprising sealing at least one of the plurality of channels. The method may include stopping the filling in response to signals from the sensor. Stopping the filling may include closing a valve.

The method may include moving the at least one filling chamber from a storage position to a filling position to configure the at least one filling chamber to receive the piercing member. The method may include at least one of applying a vacuum and deforming a portion of the package to move the at least one filling chamber from the storage position to the filling position.

Another aspect of the present disclosure relates to a method of forming a sealed package configured to hold a content, the content comprising at least one of a beneficial agent or a constituent thereof. The method includes forming a package having at least one filling chamber, at least one compartment configured to hold the content, and at least one channel connecting the at least one filling chamber in fluid communication with the at least one compartment, and concurrently sealing the package.

The method may include forming at least one of the at least one filling chamber, the at least one compartment, and the at least one channel using a blow molding process. All of the compartments, channels and filling chambers may be integrally formed using a blow molding process. The method may include providing a web material defining first wall of the package, forming a cavity in the web material, integrally sealing the cavity to a second wall of the package to at least partially define at least one of the at least one channel, the at least one filling chamber, and the at least one compartment. All of the channels, chambers may be integrally formed between the sealed walls. The method may include providing a molded part defining a first wall of the package, the method comprising forming a cavity in the molded part, and sealing the cavity to a second wall of the package to at least partially define at least one of the at least one channel, the at least one filling chamber, and the at least one compartment. The method may include aseptically forming the sealed package from sterile components. The method may include sterilizing the pre-sealed package after forming. The method may include sterilizing the package by at least one of exposure to heat, radiation, gamma-radiation, e-beam irradiation, UV illumination, chemical agents, decontamination fluid, hydrogen peroxide vapor, or Ethylene Oxide, and flashing fluid.

The package may include a semi-permeable region configured to allow chemical agents to penetrate into the at least one compartment. The semi-permeable region may be positioned in the at least one filling chamber. The method may include penetrating the at least one filling chamber and at least one of introducing chemical agent to the at least one compartment, introducing flashing fluid to the at least one compartment, and removing material from the at least one compartment. The method may include resealing the package. The method may include removing material from the package and inspecting the removed material, wherein the inspection includes analyzing at least one of chemical composition, chemical concentrations, presence and concentration of particles, presence and concentration of particles larger than 50 microns, color, optical absorbance, optical reflectance, optical scattering, optical interference, pH, oxidation, conductivity, total organic carbons, and turbidity of the material.

The method may include penetrating an access region of the at least one chamber with a piercing member in a fluid-tight fashion, the piercing member being configured to perform at least one of introducing chemical agent, introducing flashing fluid, and removing material from the compartment. The method may include introducing at least two materials to the container. The at least two materials are introduced simultaneously. The at least two materials are introduced to the at least one compartment through a common one of the at least one channel and a common one of the at least one filling chamber. The at least one channel includes at least two channels, and the at least one filling chamber includes at least two filling chambers, and the at least two materials are removed from or introduced to the at least one compartment via the at least two channels and the at least two filling chambers. The method may include introducing material to and removing material from the at least one compartment occurs simultaneously.

The method may include removing at least a portion of the at least one filling chamber of the package after sealing the package. The at least one compartment includes at least first and second compartments, the method comprising introducing material to or removing material from the first and second compartments via the at least one filling chamber. The method may include inspecting the content of the package. The method may include inspecting material removed from the at least one compartment. Inspecting may include analyzing at least one of chemical composition, chemical concentrations, presence and concentration of particles, presence and concentration of particles larger than 50 microns, color, optical absorbance, optical reflectance, optical scattering, optical interference, pH, oxidation, conductivity, total organic carbons, and turbidity of the content.

The at least one filling chamber may include a penetrable access region, and the method may include penetrating the access region with a piercing member. The method may include forming a fluid-tight connection between the piercing member and the access region. The piercing device may be configured to perform at least one of introducing material to and removing material from the at least one compartment. Inspecting may include non-contact inspecting of the content of the package. The method may include moving the material in the package during inspecting. The method may include moving the material in the package by at least one of agitation, gravity, acceleration, electric field, magnetic field, pressure, and acoustic wave manipulation. The method may include at least one of attributing, disqualifying, rejecting, or approving the package based on the inspecting.

The method may include forming a plurality of packages that are joined to one another. The plurality of packages may include at least one of a joined channel and a joined chamber. The plurality of packages include first and second packages, wherein at least one of the joined channel and the joined filling chamber may be connected in fluid communication with the at least one compartment of the first package and the at least one compartment of the second package. The method may include at least one of introducing and removing material from at least the first and the second compartments through at least one of the joined chamber and the joined channel. The packages may be resealed. The method may include joining the package to at least one of a backing and a delivery device. The backing may be pre-sterilized and may be aseptically joined with the package. The package may be sterilized after the step of joining the backing. The method may include establishing fluid communication with the package through at least one access port formed in the backing. The fluid communication may be established by at least one piercing member accessing the package through the access port. The at least one piercing member establishes fluid-tight communication with at least one of the package and the backing.

The method may include joining the package to a delivery device. The delivery device may be pre-sterilized and may be aseptically joined with the package. The package may be sterilized after the step of joining the delivery device. The delivery device may be a syringe and the package may be joined at a dispensing end of the syringe. The method may include disposing an insert in the package prior to sealing. The at least one insert may be disposed in at least one of the at least one channel and the at least one chamber. The at least one insert may include at least one of a seal, a flow deflector, a flow director, a fuse, a fitment, and a plug. The method may include creating an opening in the package and positioning the insert such that at least a portion of the insert may be exposed externally from the package. The method may include separating the insert from the compartment by a frangible seal.

A further aspect of the present disclosure relates to a method of creating a sealed package, the packing comprising a compartment containing a sterile content, the content comprising at least one of a beneficial agent or a constituent thereof, and a portion of the compartment being moveable from a first configuration to a second configuration to change a volume of the package and to remove at least a portion of the content after opening the package. The method includes forming the sealed package and maintaining the package in substantially the first configuration while filling the package with the content.

The package may include a penetrable access region and a resealing region, the access region being different than the sealing region, and the method includes filling the package via the access region. The method may include opening the access region, filling the package through the access region, and sealing the resealing region. The method may include removing material from the package during filling. Sealing the resealing region may occur while the access region is open. The package may include a barrel and plunger arrangement at least partially defining the compartment, and the method further includes maintaining the plunger in a fixed position relative to the barrel to provide the filled configuration before, during, and after filling. The package may include at least one filling chamber and at least one channel providing flow communication between the at least one filling chamber and the compartment, and the method further includes accessing the package by piercing the at least one chamber, and resealing the package by sealing the at least one channel.

The at least one filling chamber may include first and second filling chambers, and the at least one channel may include first and second channels, the second channel providing flow communication between the second chamber and the compartment, the method further comprising accessing the second chamber. The method may include maintaining the package in the first configuration during filling of the compartment. The package may include a flexible wall, the flexible wall being a portion of the compartment, the method further comprising maintaining the flexible wall in a cavity to define the first configuration of the package. The flexible wall may be maintained in the cavity by applying vacuum to the external surface of the package. The flexible wall may be maintained in the cavity by applying pressure in the package. The flexible wall congruently maintains the cavity shape by one of applying vacuum to the external side of the flexible wall and applying pressure to the inner side of the flexible wall.

The package may include a plurality of compartments, and filling the package includes filling the plurality of compartments with the content. The method may include filling the plurality of compartments simultaneously. The method may include filling and resealing the plurality of compartments consecutively. The method may include tilting the package during filling to remove gas from the compartment. The method may include providing at least one sensor, and sensing when the compartment may be full of the content. The package may include at least one filling chamber and at least one channel providing flow communication between the compartment and the at least one filling chamber, wherein the sensor senses the content may be being removed in at least one of the at least one filling chamber and the at least one channel.

The method may include providing a plurality of package layers, and forming the sealed package may include forming the compartment between the plurality of layers. The method may include sealing the plurality of layers together to enclose the compartment. The method may include forming at least one of at least one channel and at least one filling chamber between the plurality of layers, the at least one channel providing flow communication between the at least one filling chamber and the compartment. The method may include maintaining the package in substantially the first configuration while filling the package with the content includes fixing the first configuration during filling.

Another aspect of the present disclosure relates to a method of creating a sealed package containing a sterile content, wherein the content includes at least one of a beneficial agent or a constituent thereof. The method includes forming a package comprising at least one filling chamber, at least one compartment configured to hold the content, and at least one channel connecting the at least one filling chamber in fluid communication with the at least one compartment, and filling the package with the content while maintaining the at least one filling chamber, at least one compartment, and at least one channel immovable relative to each other.

A further aspect of the disclosure relates to a method for filling a sealed package, the package comprising at least one compartment, at least one access region, and at least one dispensing portion for removing at least a portion of the content. The method includes providing the package sealed, maintaining the at least one compartment and all the dispensing portions uninterruptedly sealed, filling the at least one compartment through the at least one access region, and resealing the package.

The access region may be accessed for filling in a fluid-tight fashion. The package may include a barrel, and a plunger disposed in the barrel to at least partially define a sealed compartment between the barrel and plunger, and wherein the plunger may be moveable between a dispensed position and a filled position, the method may include moving the plunger from a dispensed position to a filled position during filling. The method may include removing material from the package through an access port. The material may be at least one air bubble. The package may be one of a blister, a pouch, a sachet, a can, a bottle, a vial, a syringe, a cartridge, a blown-container, and a molded container. The package may be resealed at a different region than the access region.

The package may be resealed while the access region may be open. The package may include first and second walls sealable there between by a frangible seal portion and a permanent seal portion, the permanent seal portion having a peeling force greater than a peeling force of the frangible seal portion, and the method may further includes joining the first wall and the second wall along a closed contour defining therein at least one compartment and at least one access region, which are in fluid communication, and sealing between the at least one access region and at least one compartment by a permanent seal.

The method may include creating a frangible seal between the compartment and the at least one dispending portion. The method may include creating a permanent seal around the at least one compartment and the at least one dispensing portion. The permanent seal may circumscribe the at least one compartment and the at least one dispensing portion.

Another aspect of the present disclosure relates to a method for accessing a sealed package, the package comprising at least one compartment and at least one access region for at least one of filling and removing material from the at least one compartment, and the method including providing the package sealed, accessing the package to form a fluid-tight communication with the at least one compartment, and resealing the sealed package at a region different than the at least one access region.

The package may be resealed while the at least one access region may be open. The package may be accessed to remove a sample. The package may be accessed by a piercing member. The material may be at least one of filled and removed from the package by flowing through the piercing member. The material may be at least one of filled and removed from the package by detaching from or attaching to the piercing member, respectively. The package may include a seal between the at least one access region and the at least one compartment, the seal being openable to establish fluid communication between the at least one compartment and the at least one access region, and the method further includes opening the openable seal, transferring content from the package to the at least one access region, resealing the openable seal, and accessing the at least one access region. The method may include removing the at least one access region. The method may include at least one of removing material from and introducing material to the at least one access region when accessed.

The applications of the present invention are not limited to drug delivery, which is provided herein by way of example. The teachings described herein can be applied to packages and dispensing devices in other areas such as, for example, glue dispensing, chemicals dispensing, etc., and medical device packaging, food packaging, electronics packaging, chemical packaging, biologic packaging, cosmetic and nutraceuticals packaging, etc. The present disclosure provides various configurations for accomplishing this.

BRIEF DESCRIPTION OF THE DRAWINGS

FIG. 1c is an exploded perspective view of the package shown in FIG. 1b.

FIG. 1d is a close-up view of a filling chamber and filling channel of the package of FIG. 1a.

FIG. 1e is a close-up view of the filling chamber and filling channel of FIG. 1d with the filling channel sealed closed.

FIGS. 2a-2c show steps of sealing the package shown in FIG. 1a.

FIGS. 3a-3f show another example package in accordance with the present disclosure being filled with a filling device.

FIGS. 5a-5d show an example delivery assembly including a package and a delivery device in accordance with the present disclosure.

FIGS. 14a-14f show another example package in the form of a cartridge in accordance with the present disclosure.

FIGS. 15a-15e shown another example package in the form of a cartridge in accordance with the present disclosure.

FIGS. 16a-16f show another example package in the form of a cartridge in accordance with the present disclosure.

FIG. 17b is a cross-sectional view of the package shown in FIG. 17a.

FIGS. 18a and 18c are perspective views showing another example package having a syringe construction in accordance with the present disclosure.

FIG. 18b is a cross-sectional view of the package of FIG. 18a.

FIG. 18d is a cross-sectional view of an alternative version of the package of FIGS. 18a-18c.

FIGS. 20b-20d are cross-sectional views of the package of FIG. 20a.

FIG. 21b is a cross-sectional view of the package of FIG. 21a.

FIGS. 22a-22d show cross-sectional views of an example package in the form of a vial in accordance with the present disclosure.

FIGS. 24a-24c show another example package having a heating element in accordance with the present disclosure.

FIGS. 25a-25e are perspective views of an example package in the form of a syringe in accordance with the present disclosure.

FIGS. 31a and 31b are a perspective views of another example package in the form of an infusion bag in accordance with the present disclosure.

FIG. 31c shows a filling chamber of the package of FIGS. 31a and 31b collapsed prior to filling of the package.

FIGS. 34a-34d show another example actuatable access member for use in the infusion bag of FIGS. 33a and 33b.

DETAILED DESCRIPTION

Figure 1A:
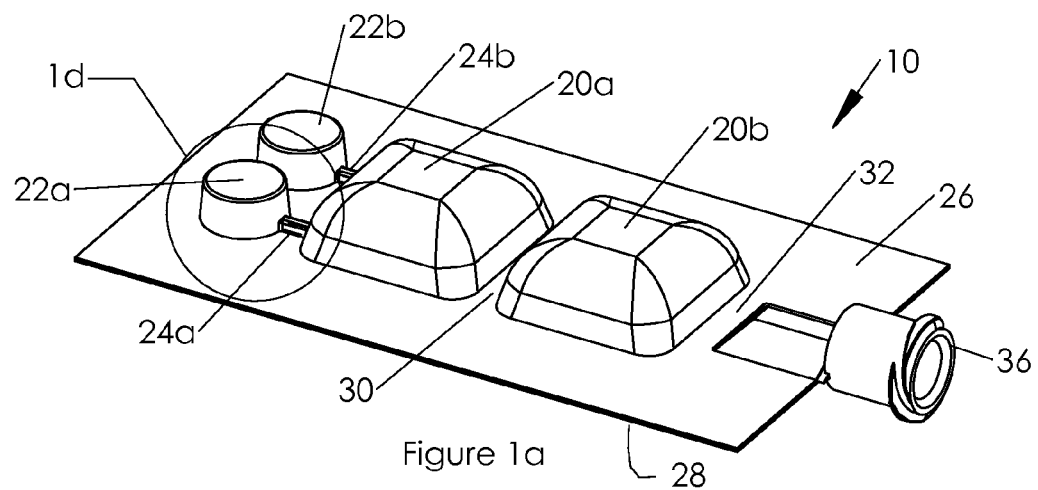
FIGS. 1a and 1b are top and bottom perspective views of an example package in accordance with the present disclosure.
Figure 1B:
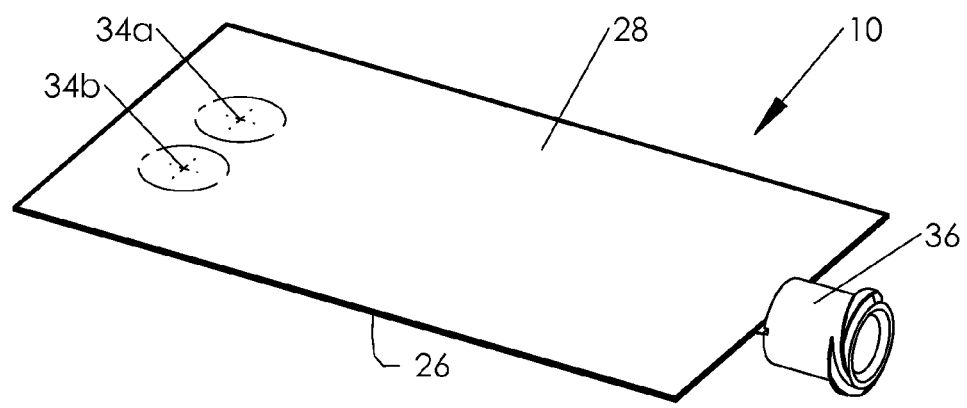

FIGS. 1a-1b show an example package 10 in accordance with the present disclosure. The package 10 includes first and second compartments 20a, 20b, first and second filling chambers 22a, 22b, first and second filling channels 24a, 22b, and first and second layers or walls 26, 28. The package 10 may also include at least first and second frangible seal portions 30, 32, first and second access regions 34a, 34b, and a fitment 36.

FIG. 1c shows the first layer 26 as a pre-formed flexible wall of the package 10. The first layer 26 includes first and second compartment cavities 40a, 40b, which when later sealed using the second layer 28 form the first and second compartments 20a, 40b. The first compartment 20a receives a first constituent (e.g., a beneficial agent or constituent of a beneficial agent). The second compartment 20b receives a second constituent (e.g., a beneficial agent or constituent of a beneficial agent) which is typically different from the first constituent. The first layer 26 also includes an uninterrupted area at a peripheral edge of the first compartment cavity 40a, which is spaced between the first and second compartment cavities 40a, 40b, that subsequently becomes the first frangible seal portion 30. A second uninterrupted area at the peripheral edge of the second compartment cavity 40b, which is spaced between the first compartment cavity 40b and a fitment cavity 46, subsequently defines the second frangible seal portion 32.

The first and second layers 26, 28 may have flexible characteristics and may be referenced as flexible walls of the package 10. A flexible wall may include a portion of the package that is deformable by pressure of force to substantially affect a configuration of the package and accuracy of a volume of at least one of the first and second compartment 20a, 20b.

Typically, the first compartment 20a defined by the first compartment cavity 40a receives a liquid. The second compartment 20b defined by the second compartment cavity 40b typically receives a non-fluidic material or a poorly flowing material such as, for example, powder, compressed or agglomerated powder, granules, pellets, solid, tablets, capsules, slurries, paste, hibiscus fluid, emulsions, or a combination thereof. The substance received in the second compartment 20b is filled into the second compartment 20b by an appropriate filling system that provides the type of material that needs to be filled. The second compartment 20b may also be filled with water or other viscosity fluid. In some examples, it may be challenging to completely fill the second compartment 20b with water or aqueous solution due to surface tension and other properties of the fluid, which may make it challenging to maintain the fluid in the compartment as the compartment is being sealed.

Another challenge related to filling the package 10 is that liquid filling is a relatively slow manufacturing process for a number of factors, one of which is avoiding foaming or bubble formation as the liquid is filling at least one of the first and second compartments 20a, 20b.

The substance used to fill the second compartment 20b may be a loose powder or another form of disbursable dry substance, which may be challenging for filling a second compartment 20b.

The first compartment 20a typically provides another arrangement for efficiently filling a low viscosity fluid to substantially fill the first compartment 20a. In one example, the package 10 includes the first and second filling chambers 22a, 22b provided in flow communication with the first compartment 20a via the first and second filling channels 24a, 24b, respectively. Portions of the first and second filling chambers 22a, 22b may be pre-formed in a first layer 26 as first and second chamber cavities 42a, 42b. Portions of the first and second filling channels 24a, 24b may be pre-formed in the first layer 26 as first and second channel cavities 44a, 44b. The term pre-formed in the context of this figure may be at least one of thermoforming, vacuum forming, cold forming, plug assign forming and pressure forming, however similar package configurations may be made from materials and processes other than web material and processing thereof. Hence in some embodiments at least a portion of at least one of the cavities 40a, 40b, 42a, 42b, 44a, 44b, may by pre-formed using injection molding, blow molding, injection blow molding, stamping, machining, deposition and etching. The first filling chamber 22a may be referred to as an inlet filling chamber. The second filling chamber 22b may be referred to as an outlet, exhaust, or evacuation filling chamber.

The first filling channel 24a may be referred to as an inlet channel or passageway, or a first pre-formed filling channel. The second filling channel 24b may be referred to as an outlet passageway, or a channel, or a second pre-formed filling channel. The first and second filling channels 24a, 24b may be collectively referred to as fillable channels, filling channels, or passageways used to fill the first and second compartments 20a, 20b.

The first and second layers 26, 28 may be portions of a web that have features of the package 10 formed therein. It may be understood by those of skill in the art that in a normal manufacturing process an array of details for multiple cartridges may be formed in a large spread of the first layer 26 and may be handled simultaneously at subsequent forming and filling steps. The package 10, or any portion thereof (e.g., the first or second layers 26, 28) may comprise a blister package construction that defines pre-formed cavities such as the first and second compartment cavities 40a, 40b. The first layer 26 may be pre-formed from a flat web by one or more of the processes including, for example, thermo forming, cold forming, vacuum forming, pressure forming, plug assist forming, or pre-forming from non-web raw material such as by injection molding, blow molding, injection-blow molding, blow-fill-seal, blow-fill-insert-seal, or other methods known in the art. In some embodiments at least one of the first compartment 20a, a channel, 24a, 24b, and a chamber 22a, 22b is not performed without affecting the generality of this disclosure.

FIG. 1d is a close-up view of the first filling chamber 22a and first filling channel 24a shown in FIG. 1a prior to sealing the package 10. FIG. 1e is a close-up view of the package 10 after being sealed along the first filling channel 24a. The second filling channel 24b is typically also sealed. The package 10 may be sealed at other locations such as, for example, at the first and second filling chambers 22a, 22b, at the first compartment 40 (e.g., adjacent to an inlet of the first and second filling channels 24a, 24b), or at a location overlapping any combination of the filling chambers, filling channels, and first compartment. Sealing the package may comprise deforming (or pinching) at least one portion of the package to bring the first wall 26 and second wall of the package 28 into contact than applying heat to cause the walls to join is a sealed fashion.

Figure 1F:
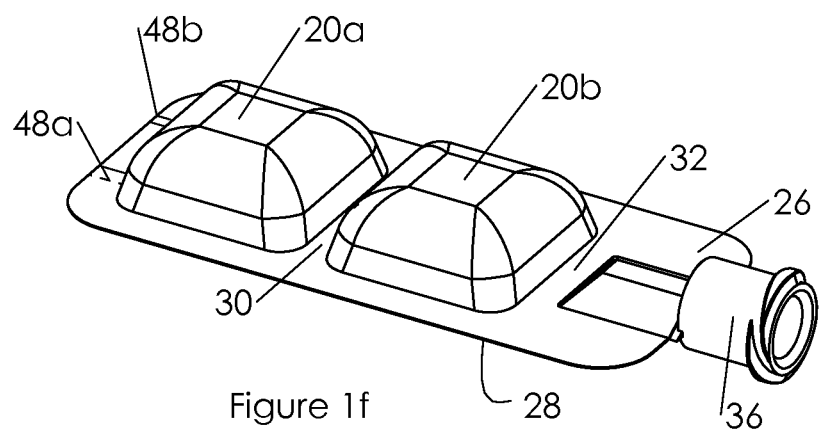
FIG. 1f is a perspective view of the package of FIG. 1a trimmed to remove the filling chambers.
Figure 2A:
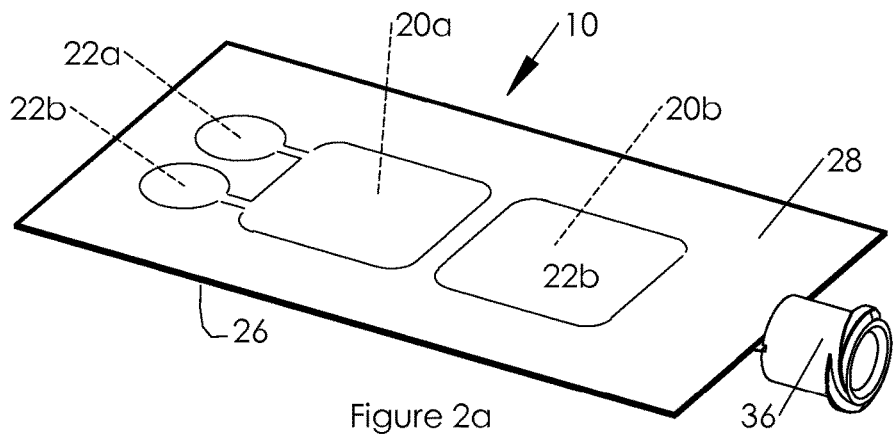
Figure 2B:
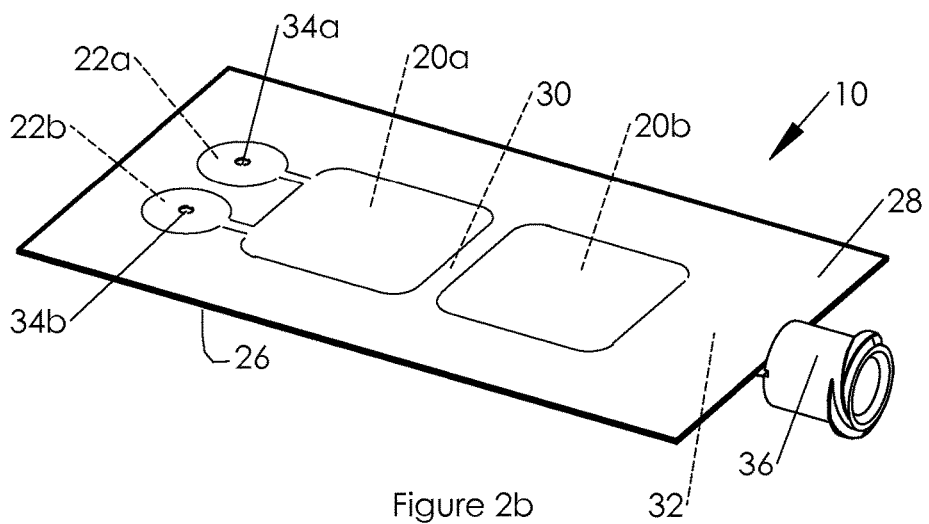
Figure 2C:
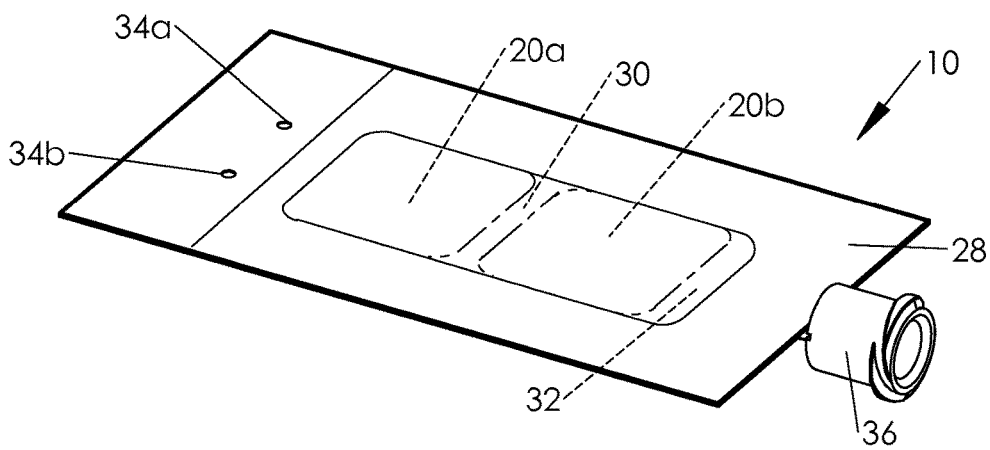

FIG. 1f is a bottom perspective view of the package 10 after a portion of the package has been removed. FIG. 1f shows a subsequent step of the manufacturing process of the package 10. After the first and second compartments 20a, 20b have been filled, the first and second layers 26, 28 are hermetically sealed to provide a permanent seal region 38 around a periphery of the package 10 as shown in FIGS. 2a-2c and first and second frangible seal portions 30, 32 positioned between the first and second compartments 20a, 20b and between the second compartment 20b and the fitment 36, respectively (see FIGS. 2a-2c). In one arrangement, an adhesive is used to secure the first and second layers 26, 28 together to provide a controllable peeling (adhesion) force where a lower sealing temperature (for example, about 300° F.) results in a peelable adhesion ("frangible seal") and a higher sealing temperature (for example, about 420° F.) results in a permanent, non-peelable adhesion. In one arrangement, the frangible seal peeling force is about 1000 g/in$^2$, and the permanent seal is greater than about 1600 g/in$^2$.

In one example, the first sealing step provides adhering substantially all of the uninterrupted surface of the first layer 26 to the second layer 28 (e.g., extending around substantially an entire circumference of the first and second compartments 20a, 20b with the exception of the first and second filling chambers 22a, 22b and the first and second frangible seal portions 30, 32). The first and second filling channels 24a, 24b remain open and unsealed to permit fluid communication between the first and second compartments 20a, 20b and the first and second filling chambers 22a, 22b. With the first and second layers 26, 28 now attached to each other, flow communication is provided between the first compartment 20a and the first and second filling chambers 22a, 22b via the first and second filling channels 24a, 24b, which are formed between the first and second layers 26, 28. Access regions are defined in the second wall 28 in front of the first and second chambers 22a and 22b.

The second layer 28 may include first and second access regions 34a, 34b in the access regions, as shown in FIGS. 1b and 2b. The first and second access regions 34a, 34b may be formed concurrently with accessing the first and second filling chambers 22a, 22b during filling. The first and second access regions 34a, 34b may be formed using any one of the means known in the art such as, for example, punching, die cutting, and laser cutting, and piercing with a piercing member or a filling member. In one example, the second layer 22 is pierced by a filling device during a filling step when filling the first compartment 20a. In another arrangement, the first compartment 20a is filled with a first substance through the first access region 34a while the second access region 34b allows for evacuation of gases from the first compartment 20a during filling. A filling source may be associated with at least one of the first and second access regions 34a, 34b during the filling process to facilitate the introduction of a substance to the first compartment 20a, and drawing the gases through the second filling chamber 22b. At least one of the first and second access regions 34a, 34b and second filling channel 24b may be sized to prevent the substance from reaching the second access region 34b. In one arrangement the filling device includes a needle or a tube that is formed to reach into the first filling channel 24a. The gases drawn through the first or second filling chamber 22a, 22b or the first and second filling channels 24a, 24b may be connected to an exhaust line (not shown) that draws the gases away from the package 10. One of the first and second filling chambers 22a, 22b through which gas is evacuated may be referred to as a gas evacuation chamber. The gas evacuation characteristics achieved by the present designs are not known to exist in the prior art because prior art designs are typically not filling a pre-sealed package that maintains an aseptic environment prior to, during and after filling. The challenges associated with removing gas from an unsealed package are different, and in many scenarios less complicated than gas evacuation from a pre-sealed package in which an aseptic environment is maintained.

In at least one example, the filling device (e.g., device 102 shown in FIGS. 3a-3f) may include a cylindrical filling tube with a diameter greater than that of the first or second access region 34a, 34b within which the tube is inserted. An interface between the filling device (e.g., a cylindrical filling tube 104 shown in FIGS. 3a-3f) and the package 10 may provide a tight fit with a fluid-tight seal when introduced through one of the first and second access regions 34a, 34b. In one arrangement, the first and second access regions 34a, 34b are formed during the filling step by a sharp object such as a hollow needle or other piercing element of the filling device that pierces through the second layer 28 and into one of the first and second filling chambers 22a, 22b in a fluid-tight manner. The sharp filling object may comprise a tube (e.g., a capillary tube) that is connected in fluid communication with a first constituent or beneficial agent. The second layer 28 may form a fluid-tight seal with the tube while the tube is positioned in flow communication with one of the first and second filling chambers 22a, 22b.

This last arrangement may be particularly beneficial as the package 10 is hermetically sealed prior to the introduction of the constituent or beneficial agent, which can be performed on a different portion of the manufacturing line or on a different line. The packages 10 may be stacked between the sealing step and the filling step. In one arrangement, a rubber or semi-rigid sealing member is disposed within at least one of the first and second filling chambers 22a, 22b, thereby forming an interface with the filling device to facilitate the sealing of the filling members coupled to the package 10. In at least one example, the cross-sectional shape and size of the first and second filling channels 24a, 24b may be sufficiently small to prevent the substance filled into the first compartment 20a from returning out through the first and second filling channels 24a, 24b due to surface tension or particle size of the substance.

In one arrangement, a check valve is disposed in at least one of the first and second filling chambers 22a, 22b to control the flow of a substance into the first compartment 20a. A semi-permeable object may be disposed in at least one of the first and second filling chambers 22a, 22b and the first and second filling channels 24a, 24b to allow gases to escape during filling and prevent the substance from leaving the first compartment 20a by backflow. In one arrangement, the flow evacuating the first compartment 20a during filling is monitored and filling is discontinued when the evacuated fluid switches from gas to the filling substance. A sensor may be positioned in or adjacent to one of the first and second filling channels 24a, 24b or the filling chambers 22a, 22b, for detecting presence of the substance being filled into the first compartment 20a. The sensor may indicate that the first compartment 20a is filled. The sensor may comprise electrodes disposed on the first or second layer 26, 28, in the layers or between the layers 26, 28. The electrodes and associated sensing circuitry may be configured to sense conductivity of the fluid in the second or evacuating filling chamber 22b, or change in capacitance of the media in a channel or a chamber. An example sensor arrangement is shown in FIGS. 24a-24c and described below.

The first filling channel 24a may be configured to direct the substance entering the first compartment 20b to move along the second layer 28 in a way that limits jetting that may result in undesirable bubbles or foaming being formed in the substance filling the first compartment 20a. A dedicated flow deflector may be disposed in one of the first and second filling channels 24a, 24b or in one of the first and second filling chambers 22a, 22b to facilitate the gliding of the filled substance on the wall of the second layer 28.

In one arrangement the package 10 is molded as a single body to the configuration shown in FIGS. 1a-1b by, for example, blow molding or gas assist molding.

The package 10 may be sealed after being filled by sealing closed the first and second filling channels 24a, 24b from the open construction of FIGS. 1a-1d to the closed or sealed arrangement of FIGS. 1e and 1f. The first and second filling channels 24a, 24b may be changed from the open construction of FIGS. 1a and 1d to the closed or sealed arrangement of FIGS. 1e and 1f. The first and second filling channels 24a, 24b may be depressed and welded to completely seal the substance within the first compartment 20a. The sealing temperature used to seal closed the first and second filling channels 24a, 24b may be higher than the temperature used to form the first and second frangible seal portions 30, 32, thereby avoiding rupture of the first and second filling channels 24a, 24b (hereafter sometimes referred to as permanent seal verses frangible seal). In one arrangement, this sealing step is further applied to the circumference of the package 10 to create the permanent seal 38 described above to at least some of the areas where the frangible seal is unwanted.

A sealable insert (e.g., insert 150 shown in FIG. 4) may be disposed in the first and second filling channels 24a, 24b to facilitate sealing of the channels. The sealable insert may comprise of material with a lower melting temperature than the first and second layers 26, 28. The material of the sealable insert may be adherable to the surfaces of the first and second layers 26, 28 that form the first and second filling channels 24a, 24b to enhance the seal provided within the first and second filling channels 24a, 24b during the sealing step. A sealable insert may be disposed in at least one of the first and second filling channels 24a, 24b and in at least one of the first and second filling chambers 22a, 22b to provide at least a portion of a flow control device. The flow control device may be one of, for example, a valve (e.g., an isolation valve or check valve), a flow or pressure regulator, a flow or pressure restrictor, or a flow deflector.

After the package 10 is sealed to seal closed the first compartment 20a with the constituent or beneficial agent retained therein, the package 10 may be trimmed. FIG. 1f shows the package 10 trimmed by methods known in the art such as, for example, punching, ruler steel cutting, laser cutting, etc. At least the first and second filling chambers 22a, 22b may be removed from the package 10 during the trimming step. Additional portions of the first and second layers 26, 28 may be trimmed to reduce an outer profile of the package 10. The package 10 may be trimmed along the sealed portion of the first and second filling channels 24a, 24b.

Figure 1G:
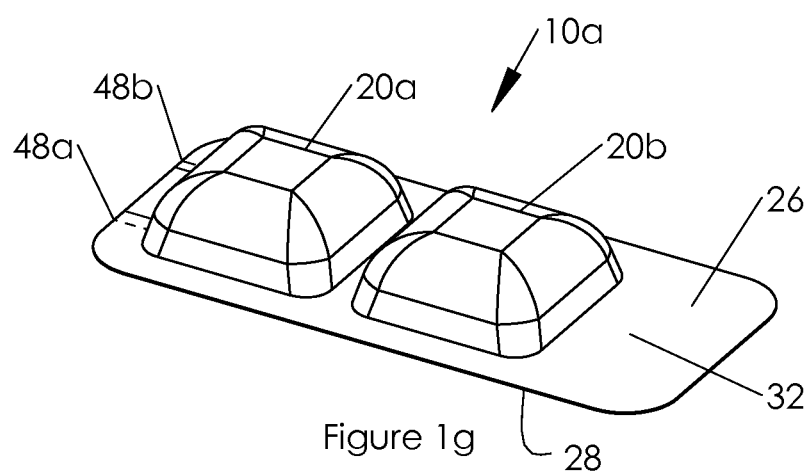
FIG. 1g is a perspective view of an alternative version of the package of FIG. 1a with a fitment removed.

FIG. 1g shows another example package 10a that does not include the fitment 36 or the fitment cavity 46 formed in the first layer 26. The package 10a has been filled, sealed, and trimmed to provide the shape shown in FIG. 1g.

It should be understood to those of skill in the art that the order of manufacturing steps disclosed above may be rearranged in whole or in part to best suit a particular design, application, and applicable manufacturing equipment. It should also be understood to those of skill in the art that additional manufacturing steps may be performed prior to, in between, and after the steps described with reference to FIGS. 1a-1f.

The fitment 36 may be secured to (e.g., welded) and positioned between the first and second layers 26, 28. The fitment 36 may be secured to the package 10 prior to or during the step of forming the first and second frangible seal portions 30, 32 or during the step of forming the permanent seal 38. The fitment 36 may be secured to the package 10 in any subsequent step by one of the fitment connecting methods known in the art including, for example, heat stake welding, impulse welding, vibration, ultrasonic, RF welding, and light beam welding.

FIG. 2a shows a first welding step of securing the first and second layers 26, 28 together to form the package 10. The seal pattern may completely circumscribe the first and second compartments 20a, 20b, the first and second filling chambers 22a, 22b, and the first and second filling channels 24a, 24b. In this first welding step, the welding is provided with a frangible seal type connection. The subsequent location of the first and second filling ports 34a, 34b may be marked so that the first and second filling ports 34a, 34b may be formed at a later manufacturing step (e.g., see FIG. 2b). The first welding step may provide a hermetic seal that hermetically seals the first and second compartments 20a, 20b, the first and second filling chambers 22a, 22b, and the first and second filling channels 24a, 24b. FIG. 2b shows the package 10 after the access area has been penetrated by a piercing member at first and second filling ports 34a, 34b opposite to the first and second filling chambers 22a, 22b. This step is typically done by an automated filling system.

The portion of package 10 through which the first and second filling chambers 22a, 22b are accessed may be referred to as an access region or a penetrable access region. The access region may include the first and second access regions 34a, 34b. The access region may be resealable. The access region may provide a sealed interface with a device that accesses the first and second filling chambers 22a, 22b through the access region.

FIG. 2c illustrates a further welding step in which a permanent seal is formed. The permanent seal 38 is formed around an entire periphery of the first and second compartments 20a, 20b and the area in which the first and second frangible seal portions 30, 32 are defined adjacent to the first and second compartments 20a, 20b. The permanent seal pattern 38 surrounds the first and second compartments 20a, 20b and overlaps most of the frangible seal pattern formed in the first welding steps shown FIG. 2a, leaving frangible seals 30 and 32 unchanged. The first and second filling ports 34a, 34b at the access regions may be formed prior to filling or as part of filling the package 10, and may be performed prior to or after the second weld step to form the permanent seal 38, however the channels 24a, 24b, would typically be sealed after the filling chamber has been used for filling or removing material from the package. In one example, the second weld step to form the permanent seal may also seal closed the first and second filling channels 24a, 24b. As such, it may be beneficial to provide the permanent seal in the second welding step after filling the first and second compartments 20a, 20b (e.g., filling the first compartment 20a using the filling methods described above).

Referring now to FIGS. 3a-3f, another example package 100 is shown including a compartment 120, a filling chamber 122, a filling channel 124, first and second layers 126, 128, a frangible seal 130, and a fitment 136. FIGS. 3a-3f illustrate filling steps of a method of filling the package 10. The package 10 includes the first layer 126 having a plurality of features formed therein such that when the first and second layers 126 and 128 are connected together the compartment 120, filling chamber 122, and filling channel 124 are defined. The filling channel 124 provides flow communication between the compartment 120 and the filling chamber 122. FIG. 3a shows the package 100 prior to filling, wherein the compartment 120, filling chamber 122, and filling channel 124 are integrally sealed to provide a hermetically sealed package. The package 100 may be sterilized by, for example, heat, radiation, or other sterilizing methods.

FIG. 3b illustrates the package 100 having a filling device 102 that is engaged with the package 100. The filling device 102 includes a filling tube 104 having a piercing feature at its distal end for piercing the second layer 28 of the package 100. The filling device 102 is engaged with the second layer 28 in a fluid-tight fashion, and defines a access region where the filling tube 104 pierces the second layer 128 to gain access to the filling chamber 122. The filling tube 104 and the access region may be disinfected prior to engagement to further reduce contamination risks for the package 100. In one arrangement, the package 100 and the filling device 102 are disinfected using, for example, hydrogen peroxide.

FIG. 3c illustrates the filling device 102 starting the process of filling the package 100. The filling channel 124 directs a fluid 106 along an inner surface 127 of the second layer 128. Directing the fluid 106 along the inner surface 127 may reduce jetting, bubbles and foaming of the fluid 106.

FIG. 3d illustrates a subsequent step in the filling process when the package 100 is about half full. The fluid 106 continues to flow along the inner surface 127 of the second layer 128 and avoids jetting and reduces bubbles, foaming and mixing of the fluid 106. A gas content within the package 100 may be evacuated through the filling chamber 122 or through a separate filling chamber and filling channel that is in flow communication with the compartment 120.

FIG. 3e illustrates the compartment 120 completely filled and sealed. A sealing device (not shown) may collapse and thermally seal the filling channel 124. In one arrangement, the filling chamber 122 is squeezed prior to sealing the filling channel 124 to transfer the fluidic content of the filling chamber 122 into the compartment 120. In another arrangement, the fluidic content of the filling chamber 122 is sucked back into the filling device 102 via the filling tube 104 after sealing the filling channel 124.

FIG. 3f shows the package 100 after the filling device 102 is retracted and the filling chamber 122 is trimmed from the package 100. The fitment 36 may be connected to a delivery device, such as one of the syringes shown in the figures. The frangible seal 130 may be ruptured to provide flow communications between the compartment 120 and the fitment 136. The frangible seal 130 may be ruptured by increasing pressure within the compartment 120, for example, by applying a compression force to an exterior of the compartment 120.

Figure 4:
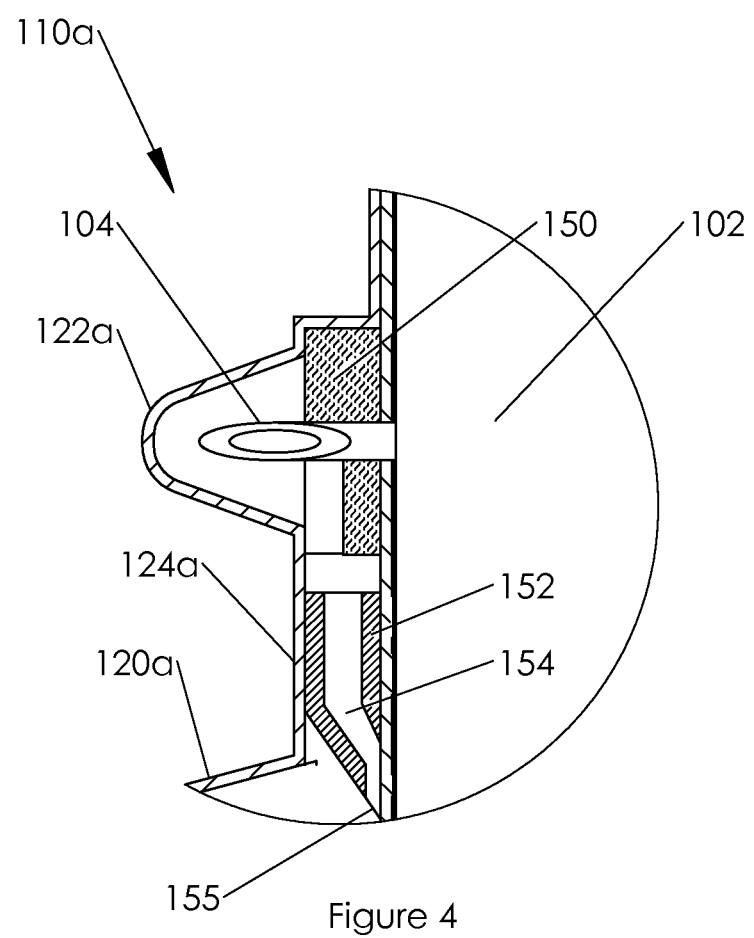
FIG. 4 is a close-up view of the package and filling device of FIG. 3b with an insert positioned therein.

Referring now to FIG. 4, another arrangement of a portion of a package 110a is shown having first and second inserts 150a, 152a disposed in the filling chamber 122a and filling channel 124a. The first insert 150a may serve as a seal to enhance a fluid-tight seal between the filling device 102a and the package 110a. The second insert 152a may include an internal channel 154a and an outlet 155a configured to direct the fluid 106a to the compartment 120a onto an inner surface of the second layer of the package 110a. In one arrangement, at least one of the first and second inserts 152a, 152b includes a low melting temperature material that adheres with the first and second layers of the package 110a. During the step of sealing the compartment 120a, the second insert 152a may melt, collapse, and seal the filling channel 124a.

Referring now to FIGS. 5a-5d, another example package 210 is shown in use with a delivery device 212 as part of a delivery assembly 200. The delivery device 212 may include a Luer syringe that includes a piston and barrel syringe arrangement with a needle 215 for delivering medication. The delivery device also includes a barrel 213, a plunger 214, and a cap 216. The package 210 may be connected to the delivery device 212 with an aseptic engagement. The delivery device 212 may be removable from the package 210. FIGS. 5a-5c show the package 210 having a single compartment 220 configured to a beneficial agent or a constituent thereof. The beneficial agent or constituent thereof may have been activated to form a dose that can be drawn into the delivery device 212 via the needle 215. The package 210 may include a body 256 having an opening 258 that receives the delivery device 212 to provide flow communication between the package 210 and the delivery device 212.

The package 210 also includes first and second filling chambers 222a, 222b and first and second filling channels 224a, 224b that provide flow communication between the compartment 220 and the first and second filling chambers 220a, 220b. The package 210 may also include a frangible seal 230 that is openable to provide flow communication between the compartment 220 and the needle 215 of the delivery device 212. FIG. 5b shows the frangible seal 230 closed. FIG. 5c shows the frangible seal 230 opened.

Similar configurations may be operative with other needle arrangements known in the art including, for example, syringes with catheter, needle with protective soft sheathe, intramuscular (IM) needle, subcutaneous (SQ) needle, intradermal (ID) needle, micro needle, safety needles, retractable needles, irrigation needles, and applicators.

The delivery device 212 may include the cap 216 that provides an aseptic closure to the space between the barrel 213 and plunger 214. The cap 216 may help maintain the delivery device 212 as a sterile syringe assembly without the need of a sterile overwrap. FIG. 5d shows the cap 216 removed with the delivery device 212 filled and removed from the package 210. In at least some arrangements, the package 210 and delivery device 212 may be generally referred to as a package or a package having delivery capability.

Figures 6A, 6B:
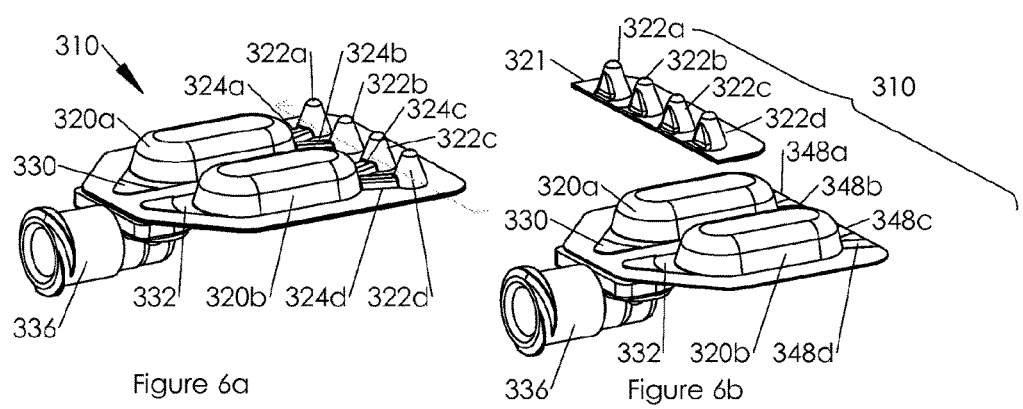
FIGS. 6a and 6b are perspective views of another example package in accordance with the present disclosure.
Figure 6C:
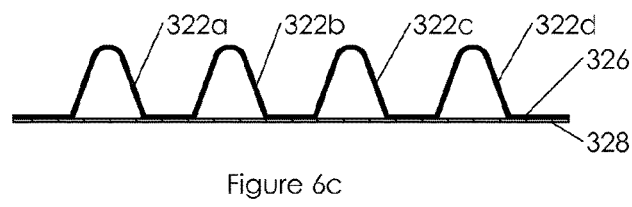
FIG. 6c is an end view of the package of FIGS. 6a and 6b.

Referring now to FIGS. 6a-6c, another example package 310 is shown including first and second compartments 320a, 320b, first, second, third and fourth filling chambers 322a-322d, and first, second, third and fourth filling channels 324a-324d. Package 310 also includes first and second frangible seal portions 330, 332 and a fitment 336. FIG. 6c shows a cross-section view of the filling chambers 322a-322d. The filling chambers are integrally sealed between first and second layers 326, 328 of the package 310. The package 310 may be sealed empty or filled with air or gas (e.g., Nitrogen). The package 310 may be made in an aseptic fashion from sterile components. Alternatively, the package 310 may be sterilized after formation using, for example, gamma irradiation or e-beam or autoclave. In one example, at least a portion of the second layer 328 comprises a material that is semi-permeable to gas that allows sterilization of the package 310 using a gas such as ETO. An example of such a semi-permeable material is Tyvek.

FIG. 6b shows the package 310 after filling, sealing, and trimming has occurred. The first, second, third and fourth filling channels 324a-324d are sealed closed and a sacrificed portion 321 carrying the first, second, third and fourth filling chambers 322a-322d is removed. The fitment 336 may be connected to a delivery device such as a syringe to deliver contents of the first and second compartments 320a, 320b.

Figures 6D, 6E:
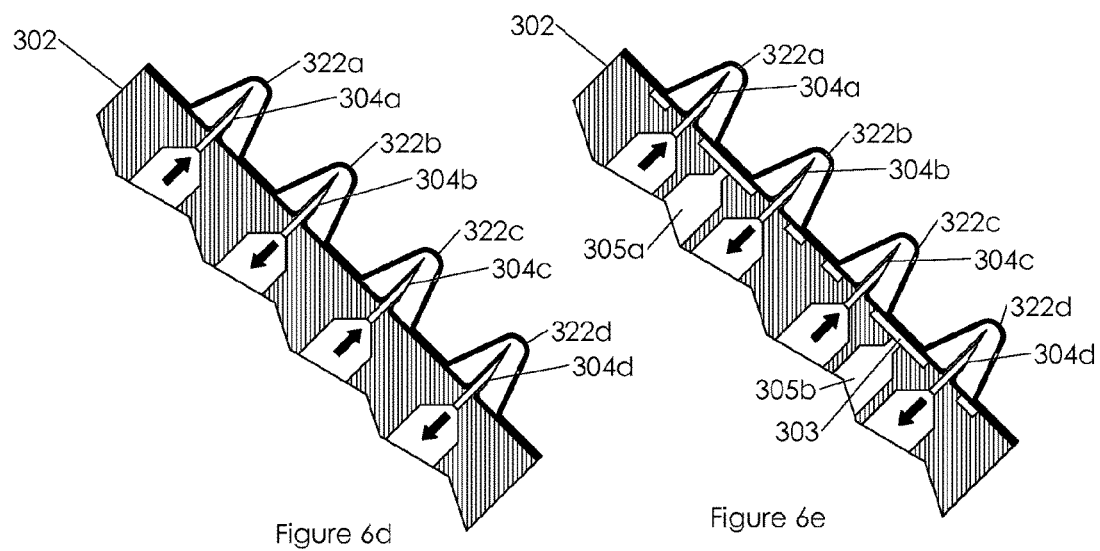
FIGS. 6d and 6e are cross-sectional views of the package of FIG. 6a being filled with a filling device.

FIGS. 6d and 6e illustrate methods of filling the package 310. A filling device 302 comprises a plurality of filling tubes 304a-304d in the form of hollow needles is shown. The filling tubes 304a-304d pierce through the second layer 328 to establish fluid communication with the filling chambers 322a-322d. A fluid-tight seal may be formed between the second layer 328 and the filling tubes 304a-304d. In one example, a first filling tube 304a may communicate with a first filling chamber 322a to deliver a first constituent to the first compartment 320a via a first filling channel 324a. A second filling tube 304b communicates with a second of the filling chambers 322b to exhaust gases from the first compartment 320a during filling of the first compartment 320a with a first constituent.

Vacuum may be applied at the second filling tube 304b to facilitate the filling process. In some arrangements, counter pressure is applied to the exhaust filling chamber 322b to inflate the constituent compartment 320a during filling to maximize its holding volume. Similarly, the first compartment 320a may be inflated by applying flow resistance in the second filling channel 324b, the second filling chamber 322b, the second filling tube 304b, or elsewhere in the exhaust line. In one arrangement, the first compartment 320a is inflated to its maximum holding volume by applying a vacuum external to the second filling chamber 322b. The compartment 320a may be held in a shaped mold while the vacuum is applied to define the inflated first compartment 320a shape while applying the vacuum.

The package 310 may be tilted during filling such that the exhaust filling channel 324b and exhaust filling chamber 322b are elevated relative to the filling channel 324a and filling chamber 322a to allow all gases to exit out of the first compartment 320a before the constituent reaches the exhaust filling channel 324b. An artificial gravity field may be applied by centrifuge motion. A detector may be embedded in the filling device 302 or in the package 310, or elsewhere to sense that the first compartment 320a is adequately filled and to indicate to halt the filling process.

In one arrangement, the package 310 is depressed against the filling device 302 by applying force with a body against the first layer 326. In other arrangements, a surface of the filling device 302 comprises vacuum grooves 303 arranged adjacent to the package 310 and in communication with vacuum ports 305a, 305b. The applied vacuum helps hold the package 310 against the filling device 302.

An additional sealing member may be disposed in the filling chambers 322a-322d to enhance the aseptic seal between the filling device 302 and the package 310. An environment around the package 310 may not necessarily be aseptic or required to be aseptic because the internal compartments, chambers and channels of the package 310 were previously integrally sealed during the process of forming the package 310. Contamination or foreign particles may be avoided from the filling device 302 and associated filling tubes 304a-304d by locally maintaining these objects and the portions of the package 310 to interface with the filling device 302 as clean and disinfected. Dry wiping, wiping with alcohol, UV radiation, infrared radiation, heat, freezing, spraying, puffing, brushing, and local depyrogenation are some of the techniques that may be applied, individually or combined, to prevent foreign particles from being introduced into the compartment 320a as a result of the filling tubes 304a-304d piercing the second layer 328.

The filling channels 324a-324d may be designed such that the constituent flows along an inner surface of the second layer 322 within the compartment 320a, 320b by moving (e.g., gliding) along the inner surface thereby limiting undesirable jetting and foaming. A nozzle or other insert may be disposed in at least one of the filling chambers 322a, 322c and filling channels 324a, 324c to enhance a desired flow pattern in the compartments 320a, 320b. A valve or other regulator may be disposed in one of the filling chambers 322a, 322c and filling channels 324a, 324c to control the flow to the compartments 320a, 320b. Similar valves or regulators may be positioned in the outlet or exhaust filling chambers 322b, 322d and filling channels 324b, 324d to help provide flow control.

The arrangement of FIGS. 6d and 6e may provide concurrent filling and exhausting of both of the compartments 320a, 320b. The elevated, angled orientation of the package 310 and filling device 302 shown in FIGS. 7a and 7b may help remove gases from the compartments 320a, 320b during filling.

The arrangement of FIGS. 6d and 6e may also be useful for lyophilizing a constituent in the compartments 320a, 320b. In one example, the first constituent is introduced through the filling chambers 322a, 322c, and humidity and pressure in the compartments 320a, 320b are controlled through the exhaust filling chambers 322b, 322d. Filling of the constituent may be performed in one dose or in multiple smaller doses. Filling using multiple smaller doses may allow for better surface evaporation and also allow for more efficient filling of the compartments 320a, 320b with a lyophilized cake. Temperature may be controlled by controlling heat transfer through the first and second layers 326, 328, either by introducing the package in a lyophilizer or a controlled environment chamber, or by locally pumping heat to and/or from the first and second layers 326, 328. Because the package is aseptically sealed, the lyophilization environment may not necessarily be aseptic.

The filling channels 324a-324d may be sealed closed by heat welding across all of the filling channels 324a-324d as shown in FIG. 6b. The filling channels 324a-324d may collapse so that the first layer 326 is joined with the second layer 328 to form a permanent closure. Inserts may be disposed in the filling channels 324a-324d to facilitate an improved seal. In one arrangement, the inserts may at least partially melt during heat sealing. In one arrangement, the sealing is achieved by bringing the heating element and a counter surface in contact with opposing sides of the package 310. The filling device 302 may comprise the heating element or the counter surface. In one arrangement, the heating element is embedded into package 310 such as in the first or second layers 326, 328, or therebetween. Once the filling channels 324a-324d are sealed, the filling chambers 322a-322d are removed as shown in FIG. 6b. Residue of the constituents delivered to the first and second compartments 320a, 320b may be evacuated either into the first and second compartments 320a, 320b or drawn out of the filling chambers 322a-322b and filling channels 324a-324d prior to or during the process of sealing closed the filling channels 324a-324d.

Figure 7A:
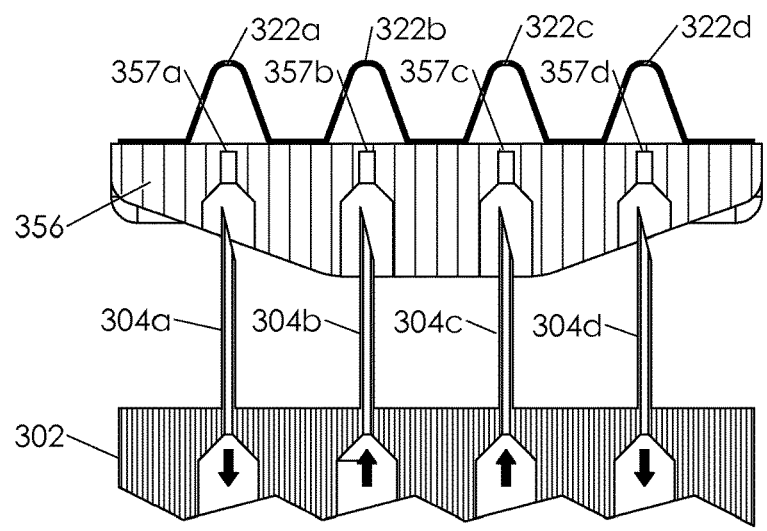
FIGS. 7a-7c show alternative package embodiments being filled by various filling devices in accordance with the present disclosure.
Figure 7B:
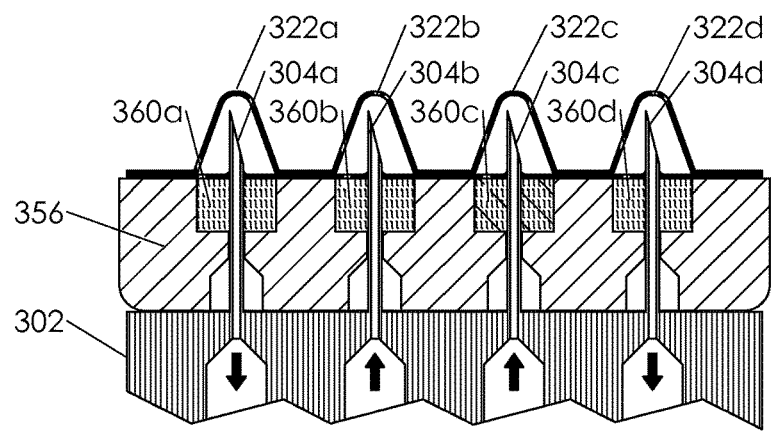
Figure 7C:
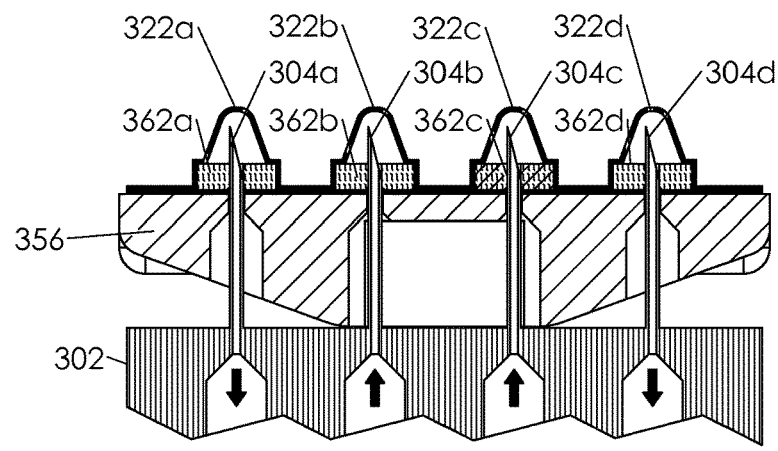

Referring now to FIGS. 7a-7c, the package 310 may include a backing 356 and outer sealing members 360a-360d aligned with each of the filling chambers 322a-322d. The sealing members 360a-360d seal around the filling tubes 304a-304d as they are inserted into the filling chambers 322a-322d. The sealing members 360a-360d may comprise a semi-rigid polymer or elastomer or a combination thereof. In some arrangements, the second layer 328 may include pre-formed holes that are sealed closed by the sealing members 360a-360d and ready to receive the filling tubes 304a-304d as the filling tubes are inserted through the sealing members 360a-360d.

FIG. 7b illustrates an arrangement wherein the backing 356 includes through-holes 357a-357d. The through-holes 357a-357d may help align the filling tubes 304a-304d with the filling chambers 322a-322d. A portion of the backing 356 may remain between the through-holes 357a-357d and the second layer 328 to maintain the filling chambers 322a-322d sealed closed. The backing 356 may be configured to be pierced and may comprise, for example, a pierceable membrane designed to seal around the intruding filling tubes 304a-304d.

FIG. 7c shows a plurality of internal sealing members 362a-362d positioned within the filling chambers 322a-322d. The internal sealing members 362a-362d may provide an additional fluid-tight seal between the filling tubes 304a-304d and the package 310 during filling. The internal sealing members 362a-362d may also provide improved closure of the filling chambers 322a-322d upon removal of the filling device 302. The sealing members 362a-362d may be joined in a fluid-tight fashion such as by heat welding to the first or second layer 326, 328. The second layer 328 may include ports or through-holes pre-formed therein for receiving the filling tubes 304a-304d.

Referring now to FIGS. 8a-8f, another example package 410 is shown including a compartment 420, first, second and third filling chambers 422a-422c, and first, second and third filling channels 424a-424c. The package 410 also includes first and second layers 426, 428, a fitment cavity 446, a fitment opening 429 formed in the second layer 428, and a fitment 436 having a flange portion 468, a protrusion 465 having an internal conduit 469, a channel 466, and a knockoff portion 467 (see FIG. 8e).

The channel 466 of the fitment 436 provides fluid communication with the interior of the compartment 420. The fitment 436 is positioned between the first and second layers 426, 428. The flange portion 464 retains the fitment 436 between the first and second layers 426, 428. The protrusion 465 extends through the fitment opening 429. A fluid-tight seal is provided between the first and second layers 426, 428 and the flange portion 464 and protrusion 465. The protrusion 465 is configured to join with a fluid passageway of a dispensing system, a backing, or other external device. A force may be applied to the flange portion 464 through the first layer 426 when joining the package 410 with an external device. In one arrangement, ultrasonic vibration, combined with axial force, is directed to the flange portion 464 to ultrasonically weld the protrusion 465 to an external device. Other joining methods known in the art may be used to connect the fitment 436 to an external device including, for example, gluing and adhesion.

The channel 466 in the flange portion 464 may allow the constituent to flow from the compartment 420 to an outlet of the fitment 436. A frangible seal 430 may be provided between the compartment 420 and the channel 466.

The knockoff portion 467 may be optionally provided at a distal end of the protrusion 465. The knockoff portion 467 may help maintain the channel 466 aseptically sealed. The knockoff portion 467 may be removed prior to usage of the package 410 or prior to integrating the package 410 with an external device. Alternatively to use of the knockoff portion 467, the fitment 436 may be aseptically sealed with a twist-off closure, a flip-off closure, a plug, a cap, an adhered foil, or a welded foil.

In one example, the first and second filling channels 424a-424b may be used to fill the compartment 420 by providing filling and exhausting as described above with previous examples. The first and second filling channels 424a-424b may be sealed at the end of the filling process after the compartment 420 is completely filled. A third filling chamber 422c and third filling channel 424c may be used at a later stage to establish communication of a device with the content of compartment 420 by accessing (e.g., piercing) the third filling chamber 422c. The third filling channel 424c may be permanently sealed at the end of this later stage access of the compartment 420 via the third filling chamber 422c. In one arrangement, the third filling chamber 422c may be used to sample the constituent held in the compartment 420 or to measure a property of that constituent or product in the compartment 420. In another example, the third filling chamber 422c and associated third filling channel 424c may be used to add a substance such as a third constituent to the compartment 420. In another example, the third filling chamber 422c and associated third filling channel 424c may be used to remove a substance from the compartment 420. In a still further example, the third filling chamber 422c and associated third filling channel 424c may be used to remove moisture from the compartment 420. Other example packages may include any number of additional filling chambers and filling channels that are used in subsequent steps to access the compartment 420 after the compartment 420 has been filled via the first and second filling chambers 422a, 422b and first and second filling channels 424a, 424b.

According to one example, third and fourth filling chambers may be used to add a constituent to the compartment 420. This arrangement may be advantageous as the compartment 420 is integrally sealed after filling the compartment 420 with a first constituent, and a second constituent is filled via the third and fourth filling chambers at a later stage, such as on a different filling system or in the field of use by a user. In another example, third and fourth filling chambers and third and fourth filling channels may be used to drive a fluid through the compartment 420 to cause fluid exchange in the compartment 420. In a still further arrangement, a third filling chamber and associated third filling channel may provide injection of dry air or inert gas into the compartment 420, and a fourth filling chamber and associated fourth filling channel may be used to recover moist air from the compartment 420.

In another example, a filling chamber and filling channel may introduce gas to a liquid phase constituent that is sealed within the compartment 420 at an entry point below the surface of the liquid constituent's surface within the compartment 420, and a further filling chamber and associated filling channel may be used to evacuate gas from the compartment 420 at a point above the liquid level of the constituent within the compartment 420. As is evident from these examples, a plurality of filling chambers and filling channels may be used to formulate a constituent in the compartment 420 during or after filling of the compartment and sealing the compartment. The introduction of, for example, light, heat, radiation, vibration, cooling or a combination thereof may be provided through one of the first and second layers 426, 428. A heating element may be implemented in the first and second layers 426, 428. In one example, a heating element is embedded in the second layer 428.

Figure 11:
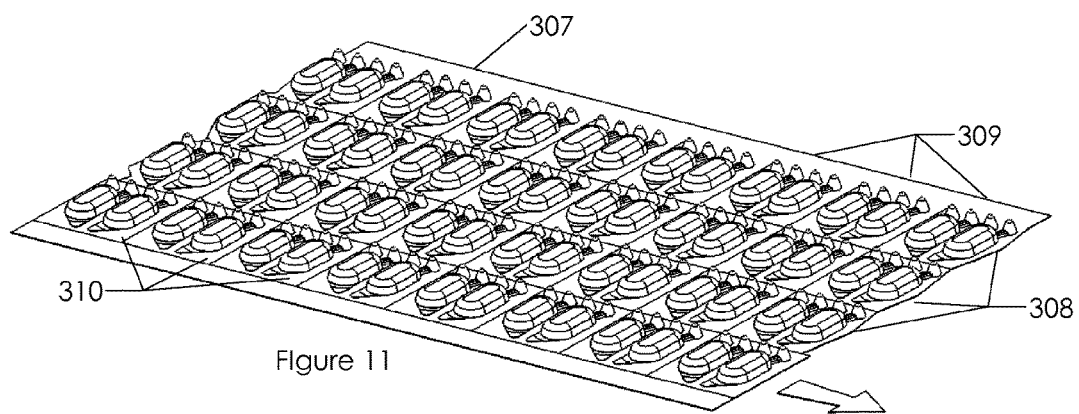
FIG. 11 is a perspective view of a plurality of the packages of FIGS. 8a-8f connected together as a web.

In another example manufacturing process, a plurality of packages 410 are made on a web format as illustrated in FIG. 11, and a plurality of heating elements of neighboring packages 410 on the web may be connected in parallel. In one such arrangement, the heating element is a thin registered conductive layer joined to a nonconductive laminate. In one example, a conductive laminate of the second layer 428 is used as a heating element. Electrodes may be connected to the ends of a large web format comprising a plurality of packages 410 and heat cavities by conducting electric current through the conductive layer. A package having at least one heating element is shown and described with reference to FIGS. 24a-24c.

Figure 8A:
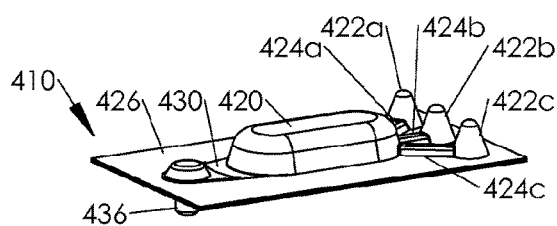
FIGS. 8a-8f show another example package in accordance with the present disclosure.
Figure 8B:
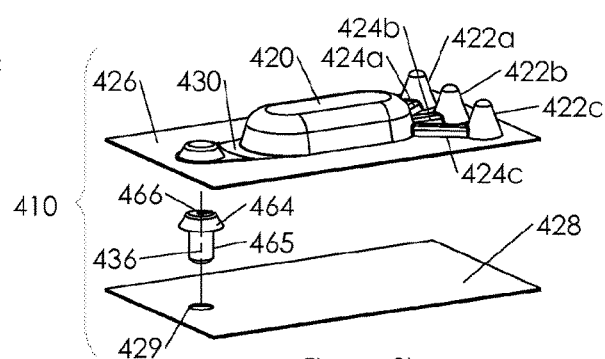
Figure 8C:
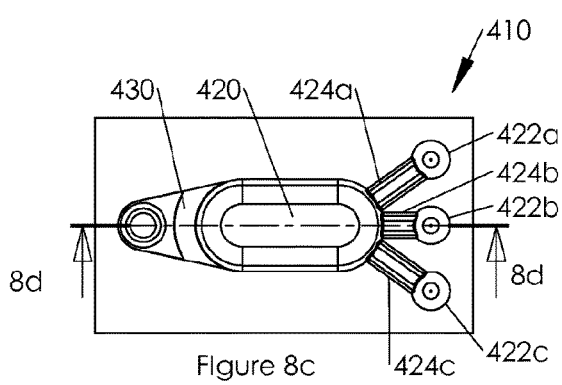
Figure 8E:
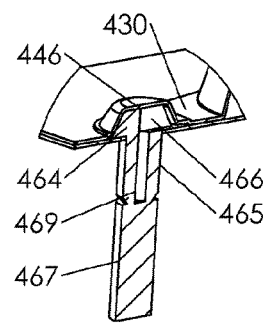
Figure 8D:
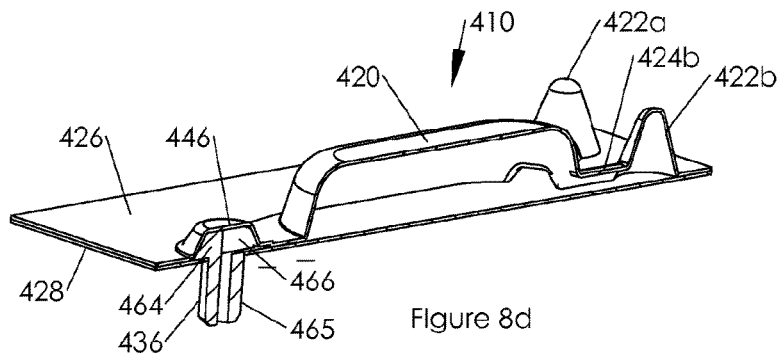
Figure 8F:
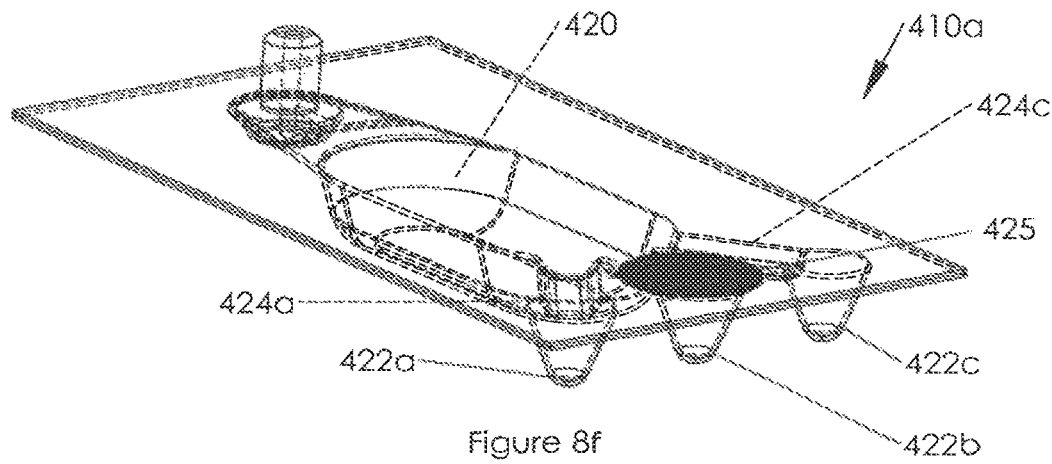

FIG. 8f shows semi-permeable wall portion 425 aligned with at least one of the filling chambers 424a-424c. The semi-permeable wall portion 425 may provide an access region for insertion of a filling member (e.g., filling tube 104 of FIGS. 3a-3f) through the second layer 428 and into one of the filling chambers 424a-424c.

The package 410 may be accessed to remove material or introduce material from the compartment 420. In one example, the first and second filling chambers 422a, 422b are accessed via the semi-permeable wall portion 425 for at least one of removing material (e.g., removing gas or removing a sample of the beneficial agent or constituent thereof) and introducing material (e.g., the beneficial agent or constituent thereof) from the compartment 420 or at least one of the first and second filling chambers 422a, 422b.

The forming of package 410 may be completed prior to accessing at least one of the first and second filling chambers 422a, 422b to fill or remove content from the compartment 420. The forming of package 410 may occur currently with accessing the package 410. The forming of package 410 may occur concurrently with any one of filling the package 410 and sealing the package 410.

Figure 9:
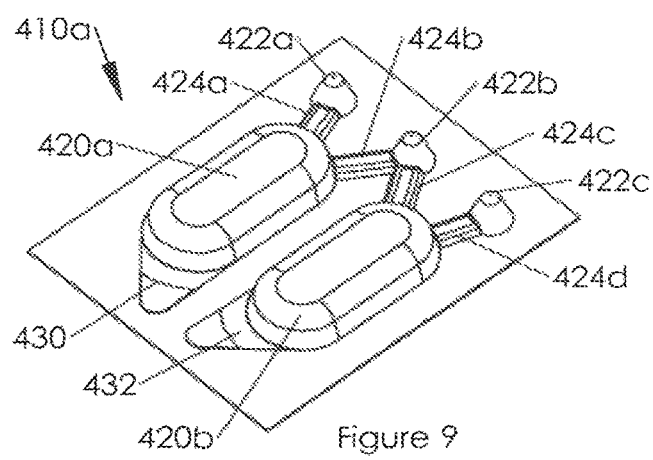
FIGS. 9 and 10 show alternative embodiments of the package shown in FIGS. 8a-8e.
Figure 10:
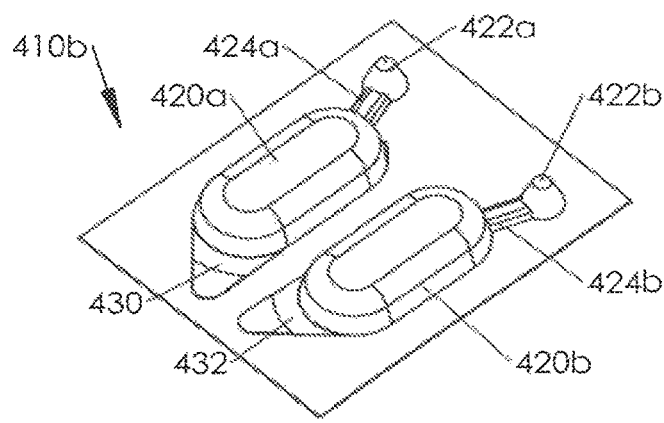

FIG. 9 shows an arrangement of a package 410a wherein a first compartment 420a and a second compartment 420b share a common filling chamber 422b. FIG. 10 shows another example package 410b in which each of the compartments 420a, 420b of a single package comprise a single filling chamber 422a, 422b, respectively, and a single filling channel 424a, 424b, respectively. Each of the compartments 420a, 420b may include a separate frangible seal portion 430, 432, respectively.

Figure 12A:
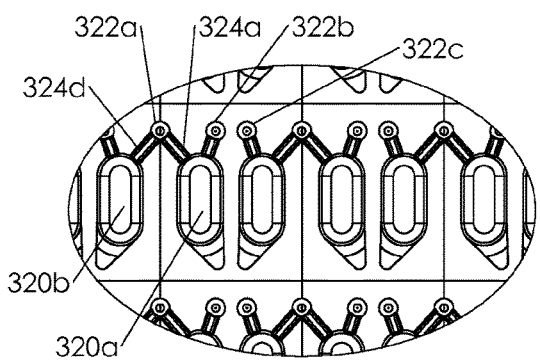
FIGS. 12a and 12b show alternative embodiments of the web shown in FIG. 11.

Referring again to FIG. 11, a plurality of first layers of a plurality of packages 310 are formed of a single sheet of web material. The compartments, filling chambers and channels are formed in the first layer. The web advances in a production line to receive the second layer and a fitment. Filling of the compartments 320a, 320b in packages 310 may be performed simultaneously for a plurality of the packages 310. In one arrangement, adjacent cavities of separate packages on the web 307 may share a filling chamber 322a as shown in FIG. 12a. Separate filling channels 324a and 324d may provide flow communication between the filling chamber 322a and separate compartments 320a, 320b on adjacent packages 310. Alternatively, the adjacent compartments may be on the same package. In one example, an exhaust filling chamber may communicate with a plurality of compartments. The packages 310 may be arranged in rows 308 and columns 309 on the web 307.

Figure 12B:
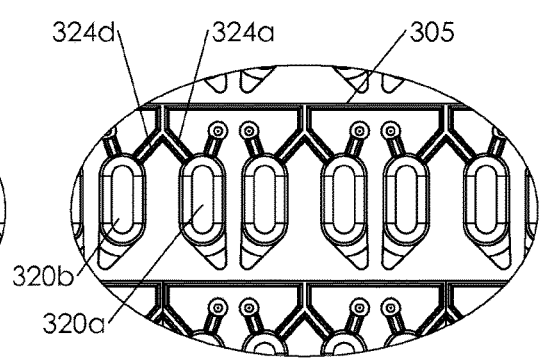

In another example, a joined communication channel or bus may communicate with multiple filling chambers for multiple packages as shown in FIG. 12b. FIG. 12b illustrates an arrangement where a plurality of filling channels 324a, 324d associated with adjacent compartments 320a, 320b are in communication via a bus channel 305 that provides flow communication between a plurality of (to be formed) packages 310.

Figure 13A:
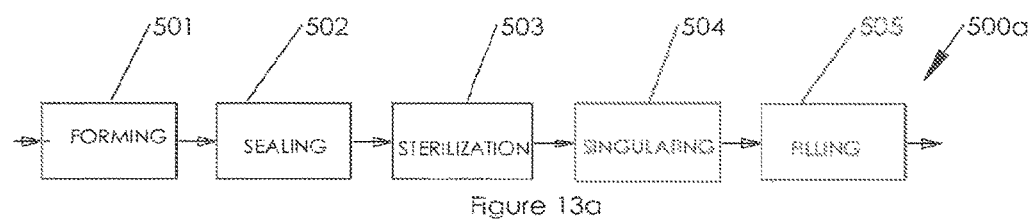
FIGS. 13a-13f are flow diagrams showing various methods of forming the packages disclosed herein.

FIGS. 13a-13f are flow diagrams showing example methods of creating a filled, sealed package in accordance with the various teachings provided herein. FIG. 13a shows a method 500a of first forming the package at 501, sealing the package at 502, sterilizing the package at 503, filling the package at 504, and singulating the packages from each other at 505.

Figure 13B:
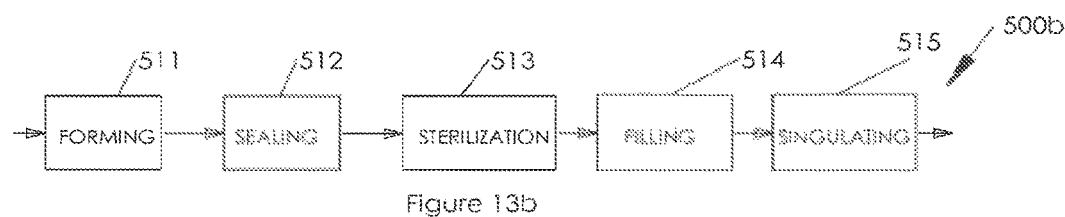

FIG. 13b shows a method 500b of first forming the package at 511, sealing the package at 512, sterilizing the package at 513, singulating the packages from each other at 514, and filling the packages at 515.

Figure 13C:
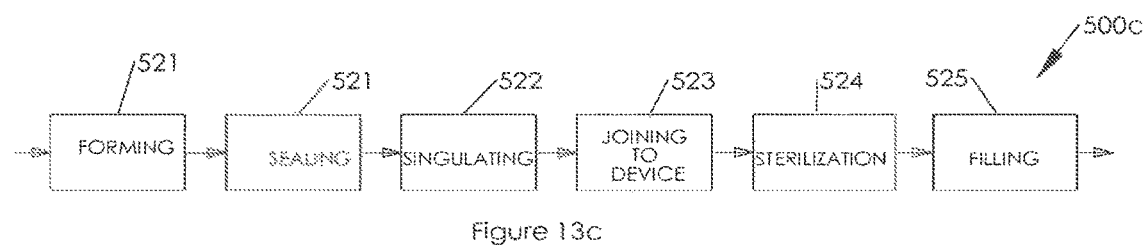

FIG. 13c shows an example method 500c that includes first forming the package at 521, sealing the package at 522, singulating the packages from each other at 523, sterilizing the packages at 524, and filling the packages at 525.

Figure 13D:
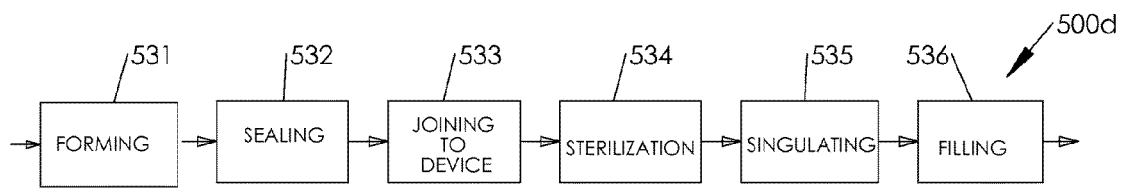

FIG. 13d shows a method 500d that includes forming a package at 531, sealing the package at 532, joining the packages to a device at 533, sterilizing the package (and the device) at 534, singulating the packages from each other at 535, and filling the packages at 536.

Figure 13E:
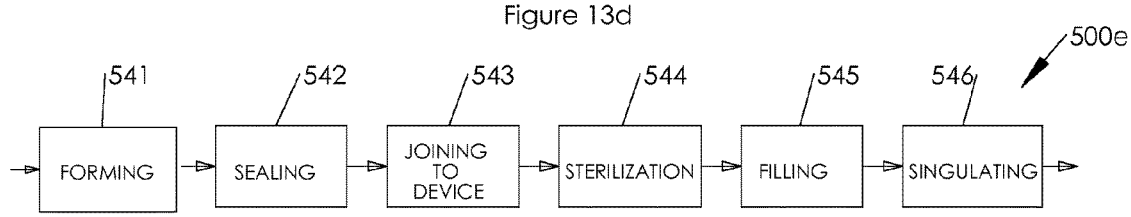

FIG. 13e shows an example method 500e that includes forming a plurality of packages at 541, sealing the packages at 542, joining the packages to a device at 543, sterilizing the packages at 544, filling the packages at 545, and singulating the packages at 546.

Figure 13F:
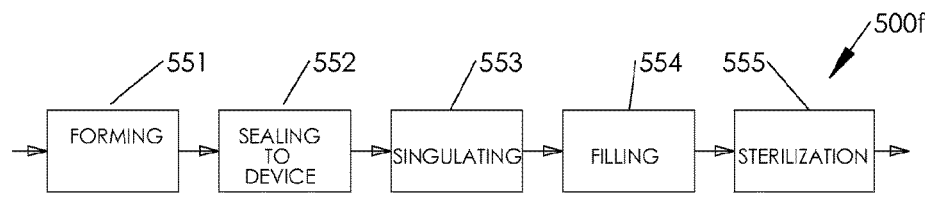

FIG. 13f shows an example method 500f that includes forming a plurality of packages at 551, sealing the packages to at least one device at 552, singulating the packages at 553, filling the packages at 554, and sterilizing the packages at 555.

FIGS. 14a-14f show another example package 610 in the form of a cartridge. The cartridge includes a barrel 664, a plunger 666, a plunger core 668, and a barrier 670 positioned at a proximal end of the plunger core 668. The package 610 defines a compartment 620 and may be sealed at its distal end with an end seal 665. The plunger 666 and plunger core 668 define first and second filling chambers 622a, 622b and first and second filling channels 624a, 624b. The barrel 664 may comprise, for example, glass or polymer such as polyethylene, polypropylene, COC, COP, or polycarbonate.

FIG. 14b shows the plunger core 668 positioned within the plunger 666. The plunger core may include a thermoplastic material. The barrier 670 may maintain the package 610 aseptically sealed prior to filling. The barrier 670 may comprise any desired material including, for example, a film, foil, molded plastic or rubber, or a combination thereof. The package 610 may be sterilized using, for example, heat or irradiation.

FIGS. 14c and 14d illustrate the package 610 during filling. A filling device 602 having first and second filling tubes 604a, 604b may be connected to the package 610. The filling tube 604a, 604b may pierce through the barrier 670 to establish fluid communication with the compartment 620 via the first and second filling chambers 622a, 622b and the first and second filling channels 624a, 624b. In one arrangement, the filling tube 604a is used to deliver a drug or other beneficial agent into the compartment 620 and the second filling tube 604b is used to exhaust or draw air or other gases from the compartment 620 prior to or during filling.

The filling tubes 604a, 604b may seal against the barrier 670 to maintain the package 610 aseptically sealed during filling. In one example, the barrier 670 comprises a multilayer foil having at least first and second layers 670a, 670b, as illustrated in FIG. 14d. The second layer 670b may include an elastic material that is stretched to form a sheathe or a sleeve-like seal around the filling tube when the barrier 670 is pierced by the first and second filling tubes 604a, 604b (see FIG. 14d). During filling, a pressure within the filling chambers 622a, 622b rises to further tighten the seal around the filling tubes 604a, 604b to limit leaking. The first layer of the barrier 670a may comprise a material that is more rigid or less deformable than the inner elastic layer to help maintain the structure and rigidity of the barrier 670 to inhibit collapsing of the barrier 670 when being pierced by the filling tubes 604a, 604b and during filling.

The elastic layer of the barrier 670 (e.g., layer 670b) may include, for example, EVA, EAA, or PE ionomer or ionomer blend such as Easy Peel. The more rigid layer of the barrier 670 (e.g., layer 670a) may comprise, for example, aluminum, PET, polyester, nylon, or an oriented film.

In at least one example, the filling tube 604a, 604b may comprise a relatively dull piercing end that promotes stretching of the inner elastic layer thereby increasing the sleeve effect of the seal 672 when the barrier 670 is being pierced.

The package 610 may be tilted or arranged at an angle during filling so that the air or gas in the compartment 620, which needs to be evacuated during filling, will more readily travel towards the exhaust filling channel 624b. The filling device 102 may include a sensor for detecting when the compartment 620 is completely filled. This may be detected by sensing the presence of the liquid or other substance being delivered into compartment 620 by the filling device 102. When the compartment 620 is filled, it may be resealed by deforming the filling channels 624a, 624b to form a fluid-tight seal or sealed channels 648a, 648b as shown in FIG. 14e. The sealed channels 648a, 648b may be formed by pinching the filling channels 624a, 624b with heated members to form a heat seal. In other arrangements, plugs or sealing members may be disposed in the filling channels 624a, 624b to facilitate sealing. The plugs may have a cross-sectional shape that is smaller than that of the filling channels 624a, 624b to allow flow around the plugs and seal against the inner wall of the filling channels 624a, 624b as the channels are collapsed. Alternatively, the plugs may comprise at least one through-hole allowing fluid flow to and from the compartment 620 and the path into the compartment 620 is sealed when the filling channels 624a, 624b collapse.

The plugs may comprise a rubber material or a low melting point polymer. After sealing the filling channels 624a, 624b, the portion of plunger 666 and plunger core 668 that define the filling chambers 622a, 622b may be removed as illustrated in FIG. 14f. The sealed channels 648a, 648b may maintain the package 610 aseptically sealed.

The arrangement of package 610 in a cartridge form may allow a manufacturing method wherein the package 610 can be transferred to a filling station (or filling line or filling site) fully assembled and sterilized, thereby substantially reducing capital equipment and filling operation costs and complexity.

In one example, the plunger 666 and plunger core 668 comprise a common material that provides properties advantageous for sealing the barrel 664 and heat sealing the filling channels 624a, 624b. In one example, the filling chambers 622a, 622b are merely extensions of the filling channels 624a, 624b. The filling device 102 may seal against a wall defining the filling chambers 622a, 622b instead of against a barrier 670. In another example, only a single one of the filling chambers 622a, 622b is included in the package 610. In another arrangement, more than two filling chambers 622a, 622b may be provided with the package 610 for simultaneous or consecutive delivery of several substances to the compartment 620. In one example, only a single filling channel 624a, 624b is provided in the device. In other examples, more than two filling channels 624, 624b are provided such that several substances may be filled simultaneously or consecutively into the compartment 620.

In one arrangement, at least one filling chamber is sealed with a semi-permeable material to allow sterilization of the compartment 620 using sterilization fluid such as, for example, ETO or HPV. In one example, the filling chambers 622a, 622b are sealed with a sealing component such as a rubber seal instead of or in addition to the barrier 670. A vacuum system may be used to attach the filling device 102 to the package 610 (e.g., against the barrier 670). The use of vacuum may help prevent leakage between the filling device 602 and the package 610. In one example, the substance (drug) remaining in the plunger 666 and plunger core 668 after sealing the filling channels 624a, 624b may be withdrawn by the filling system 602. The package 610 may be maintained under vacuum prior to piercing of the barrier 670 with the filling system 602 to facilitate delivery of the substance (e.g., drug) into the compartment 620.

Referring now to FIGS. 15a-15b, another example package 710 is shown including many of the same or similar features as described above with reference to package 610. The package 710 includes a barrel 764, plunger 766 and plunger core 768. The package 710 may define a compartment 720 and may be sealed at its distal end with an end seal 765. The plunger 766 and plunger core 768 may define first and second filling chambers 722a, 722b, first and second filling channels 724a, 724b, first and second filling bores 774a, 774b, and first and second passageways 775a, 775b.

The plunger core 768 may be movable in an axial direction relative to the plunger 766 from a first position wherein the first and second passageways 775a, 775b from the filling channels 724a, 724b through the filling bores 774a, 774b to the compartment 720 are open, to a second position wherein the first and second passageways 775a, 775b are sealed closed. The filling bores 774a, 774b may be sized to receive distal tips of the plunger core 768 within which the filling channels 724a, 724b are formed. Advancing the plunger core 768 relative to the plunger 766 seals closed fluid flow into the compartment 720. Retracting the plunger core 768 relative to the plunger 766 opens the compartment 720 in flow communication with the filling chambers 722a, 722b.

FIG. 15a shows the package 710 prior to filling. FIG. 15b shows the package 710 during filling as filling tubes 704a, 704b of a filling system 702 pierce through the barrier 770. The plunger core 768 is in a first position allowing fluid communication between the filling system 702 and the compartment 720. When filling of the compartment 720 is completed, the plunger core 768 is advanced to the second position shown in FIG. 15c. The outer wall of the plunger core 768 seals with the filling bores 774a, 774b within the plunger 766 to form the seal. FIG. 15d shows the package 710 after the filling system 702 has been removed and the compartment 720 is filled and aseptically sealed. In this arrangement, the filling channels 724a, 724b do not need to be separately sealed using, for example, a heated member that compresses and seals closed the filling channels.

The package 710 may be operable between sealed and unsealed states or conditions using a linear or axial actuation of the plunger 766 relative to the plunger core 768. The seal interface may occur within the barrel 764. Other arrangements are possible in which the seal is formed by relative movement between the plunger 766 and the barrel 764, or between the plunger core 768 and the barrel 764. The seal may be maintained by an interference fit between portions of the plunger 766 and plunger core 768. Once moved into the sealed or second position, the plunger core 768 may be fixed in the sealed position and not be capable of removing to the first or unsealed position relative to the plunger 766.

FIGS. 15b, 15c and 15e show an additional sealing interface between the filling tubes 704a, 704b and the package 710. The filling chambers 722a, 722b may have a tapered shape that provides contact between the plunger core 768 and distal end portions of the filling tubes 704a, 704b to provide a distal seal 771. The distal seal 771 may be a fluid tight seal that is formed in place of or in addition to the seal provided between the barrier 770 and the filling tubes 704a, 704b. In at least some embodiments, the distal seal 771 is provided between distal end portions of the filling tubes 704a, 704b and the filling channels 724a, 724b. The arrangement of the filling tubes 704a, 704b shown in FIGS. 15b, 15c and 15e may be referred to as a double sealing or double piercing arrangement for accessing the filling chambers 722a, 722b.

Referring now to FIGS. 16a-16f, a package 810 is shown having many of the same or similar features as the packages 610, 710 described above, but is configured to provide sealing of the compartment using a rotational motion.

The package 810 includes a barrel 864, a plunger 866, a plunger core 868, a barrier 870, and an end seal 865. The barrel 864 and plunger 866 may define a compartment 820. The plunger 866 and plunger core 868 may define first and second filling chambers 822a, 822b, first and second filling channels 824a, 824b, and first and second passageways 875a, 875b. The plunger core 868 may rotate relative to plunger 866 to open and close access to the compartment 820 by closing the first and second passageways 875a, 875b. In a first position, the plunger core 868 leaves open the first and second passageways 875a, 875b from the filling chambers 822a, 822b, through the filling channels 824a, 824b and into the compartment 820, as shown in FIGS. 16a-16c. The plunger core 868 is rotatable into a closed position shown in FIGS. 16d and 16e in which the fluidic passageway is closed to seal the compartment 820.

FIGS. 16a and 16b show the package 810 in a pre-filled, aseptically sealed configuration. The plunger 866 is in a first position wherein the filling channels 824a, 824b provide flow communication between the filling chambers 822a, 822b and the compartment 820. FIG. 16c illustrates the barrier 870 being pierced by filling tubes 804a, 804b of a filling device 802 to deliver a substance into compartment 820.

FIGS. 16d and 16e show the plunger core 868 in a closed position after filling the compartment 820 is completed. The plunger core 868 has been rotated relative to the plunger 866 so that the plunger core 868 seals the compartment 820. Many other types of rotational seals may be possible for controlling fluid flow from the filling chambers 824a, 824b to the compartment 820.

FIG. 16f shows the package 810 having a barrier 870 having a skirt 873 that extends to an outer surface of the barrel 864. The skirt 873 may provide additional sealing of the package 810 that limits contamination from reaching the area between the plunger 866 and inner surfaces of the barrel 864.

Figure 17A:
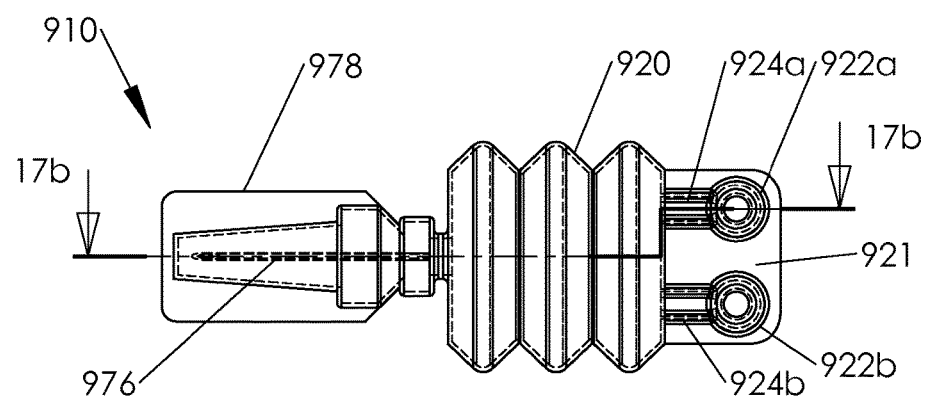
FIG. 17a shows another example package formed using a blow-mold-fill method in accordance with the present disclosure.
Figure 17B:
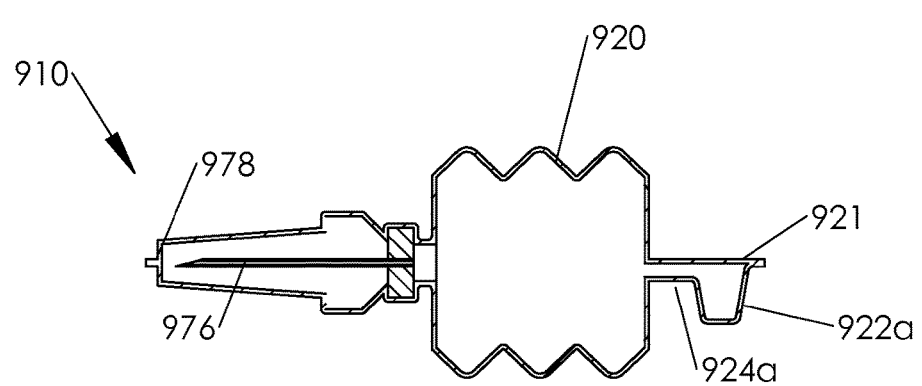

FIGS. 17a and 17b show another example package 910 wherein the package is formed using a blow molded and self-contained administration device 976 behind a removable (e.g., twist-off) cover 978. The package 910 includes first and second filling chambers 922a, 922b that communicate with a compartment 920 via first and second filling chambers 924a, 924b. The package 910 may be blow molded around the administration device 976 with the cover 978 formed integral with the remaining portions of the package 910 with the exception of the administration device 976. The package 910 is one example of a package that is formed in a single molding step wherein the package is aseptically sealed and prepared for filling by a beneficial agent or constituent thereof.

The compartment 920 may have a billows or accordion shape that promotes delivery of the substance, which is later filled into the compartment 920 via the filling chambers 922a, 922b and filling channels 924a, 924b, upon application of an axial force that compresses the compartment 920 to deliver the substance out through the administration device 976.

The first and second filling chambers 922a, 922b and at least portions of the first and second filling channels 924a, 924b may be carried by a sacrificial portion 921 that is removed after filling the compartment 920 and sealing the first and second filling channels 924a, 924b.

FIGS. 18a-18b show another example package 1010 in the form of a syringe delivery device. The package 1010 includes a barrel 1064 and a plunger 1066 that define a compartment 1020. An adapter 1021 having first and second filling chambers 1022a, 1022b and first and second filling channels 1024a, 1024b may be attached to the barrel and arranged in flow communication with the compartment 1020 as shown in FIG. 18b. The package 1010 may also include an administration device 1076 enclosed within a removable cover 1078.

The package 1010 may be configured as a disposable syringe. In accordance with one filling method, the plunger 1066 may be retracted prior to filling to create a desired volume of the compartment 1020 within the barrel 1064 to hold a desired amount of dispensable substance (i.e., beneficial agent or constituent thereof). Alternatively, the plunger 1066 may be pushed back by pressure exerted by delivery of the substance into the compartment 1020 via the first and second filling channels 1024a, 1024b. In one arrangement, the filling channels are sealed and the filling compartments are removed after filling the compartment 1020. The first and second filling channels 1024a, 1024b may be sealed by application of a heated sealing member or any of the other sealing methods described herein. In one example, the first and second filling channels 1024a, 1024b communicate with a tip of the syringe structure at the area covered by the cover 1078. In some arrangements, the adapter 1021 is configured to provide an interface between the tip of the syringe (i.e., at a location where the administration device 1076 is secured to the barrel 1064) and the first and second filling channels 1024a, 1024b.

FIG. 18d shows the package 1010 of FIGS. 18a-18c having a detent 1065 that retains the plunger 1066 in a fixed axial position during filling of the compartment 1020. The detent may be adjustable to release the plunger 1066 to permit axial movement of the plunger 1066 during delivery of the content via the administration device 1076.

Referring now to FIGS. 19a-19e, a package 1110 is shown in the form of a dual chamber syringe for delivery of a first substance (i.e., a first beneficial agent) and a second substance (i.e., second beneficial agent) consecutively in a single linear operation of a plunger. The package 1110 includes a barrel 1164 having first and second plungers 1166a, 1166b positioned therein to define first and second compartments 1120a, 1120b. An adapter such as adapter 1021 described above and shown with reference to FIGS. 18a and 18b may be connected in flow communication with one or both of the first and second compartments 1120a, 1120b. Filling of the package 1110 may be completed using one of the adapter arrangements described below with reference to FIGS. 20a-20d or 21a-21d.

Figure 19A:
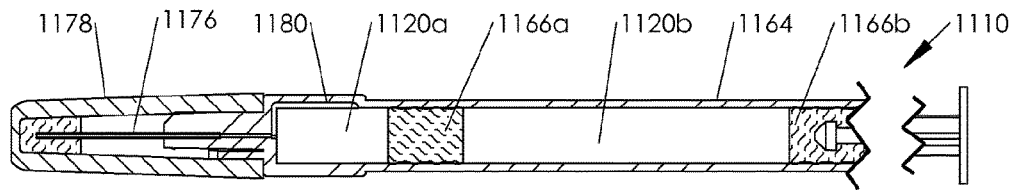
FIGS. 19a-19e show cross-sectional views of an alternative embodiment of the package shown in FIGS. 18a-18b having a plurality of plungers in accordance with the present disclosure.
Figure 19B:
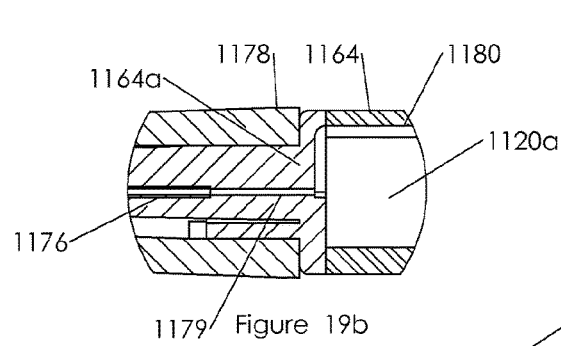
Figure 19C:
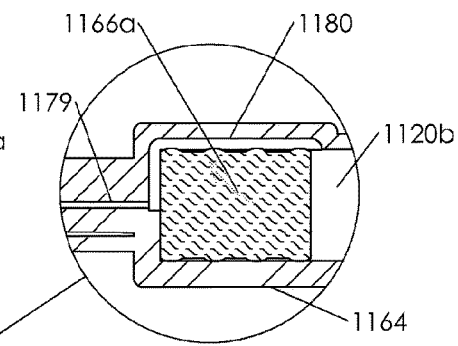
Figure 19D:
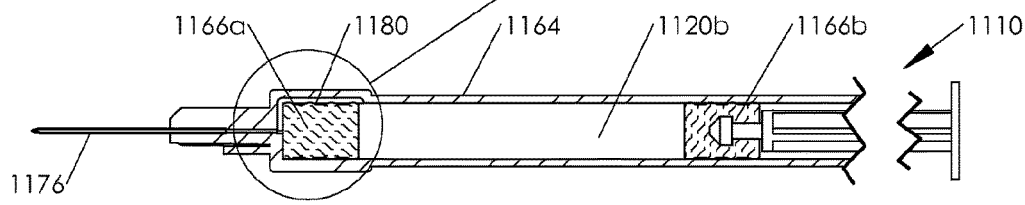

The barrel 1164 may include a bypass channel 1180 that provides a flow path around the first plunger 1166a when the first plunger 1166a is in a distal most advanced position within the barrel 1064 as shown in FIGS. 19c and 19d. An administration device 1176 and associated cover 1178 may be positioned at a distal end of the barrel 1164.

The barrel 1164 may include a distal portion 1164a that is separable from the rest of the barrel 1164 as shown in FIG. 19b. The distal portion 1164a may be, for example, pre-assembled with the administration device 1176 and associated cover 1178 before connection to the barrel 1164. The distal portion 1164a may also include a channel 1179 that provides flow communication from the administration device 1176 to the bypass channel 1180 and the compartment 1120.

The first compartment 1120a is configured to store a first beneficial agent, and is defined in the package 1110 between a distal end of the barrel 1164 and the first plunger 1166. The second compartment 1120b, for storing a second beneficial agent, is defined in the barrel 1164 between the first plunger 1166a and the second plunger 1166b.

The package 1110 may be formed by separately forming the barrel 1164 from a distal portion of the barrel 1164 that includes the bypass channel 1180. The two portions may be formed separately and assembled together in a later step. Alternatively, the bypass channel 1180 could be formed in a single step when forming the remaining portions of the barrel 1164. The portion of the barrel including the bypass channel 1180 may be connected to the remaining portion of the barrel 1164 by any method known in the art including, for example, heat welding, spin welding, ultrasonic welding, RF welding, vibration welding, solvents, glues, adhesives, mechanical interface, press-fit, or via a coupler or tape. Alternatively, the bypass channel 1180 may be molded on an inner wall of the barrel 1164 by applying a reciprocal ridge shape to a core of an injection mold.

FIG. 19a shows the package 1110 after the first and second beneficial agents have been delivered into the first and second compartments 1120a, 1120b. FIGS. 19c and 19d show the package 1110 after the second plunger 1166b has been advanced to advance the first plunger 1166a to administer the first beneficial agent from the package 1110. The first plunger 1166a is positioned at a distal most portion of the barrel 1164 so that the bypass channel 1180 extends from a front or distal end of the first plunger 1166a to a rear or proximal end of the first plunger 1166a. At this position, the bypass channel 1180 establishes fluid communication between the second compartment 1120b and the administration device 1176. Further advancement of the second plunger 1166b toward the distal end of the barrel 1164 will deliver the second beneficial agent through the bypass channel 1180 to the administration device 1176. In one arrangement, the first plunger 1166a is compressible and its axial length is such that the bypass channel 1180 does not open to the second compartment 1120b when the first plunger 1166a reaches the distal end of the barrel 1164 (i.e., when the delivery of the first beneficial agent is completed). A further advancement of the second plunger 1166b pressurizes the second beneficial agent within the second compartment 1120b causing the first plunger 1166a to compress and establish fluid communication through the bypass channel 1180 to the administration device 1176. This multi-stage advancement of the first and second beneficial agents is possible by not opening the bypass channel 1180 until intending to deliver the second beneficial agent further reduces possibility of mixture of the first and second beneficial agents and provides a pronounced sensation to the user when switching from delivering the first beneficial agent to delivering the second beneficial agent.

Figure 19E:
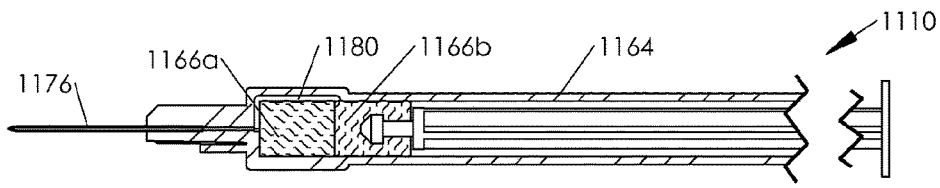

FIG. 19e shows the package 1110 when the first and second plungers 1166a, 1166b are advanced to the distal end of the barrel 1164 and delivery of the first and second beneficial agents has been completed.

Referring now to FIGS. 20a-20d, another example package 1210 in the form of a disposable syringe is described. The package 1210 includes a barrel 1264, first and second plungers 1266a, 1266b, a bypass channel 1280, an adapter 1221 having a barrier 1270, first and second compartments 1220a, 1220b defined within the barrel 1264, and first and second filling chambers 1222a, 1222b and first and second filling channels 1224a, 1224b defined within the adapter 1221.

Figure 20A:
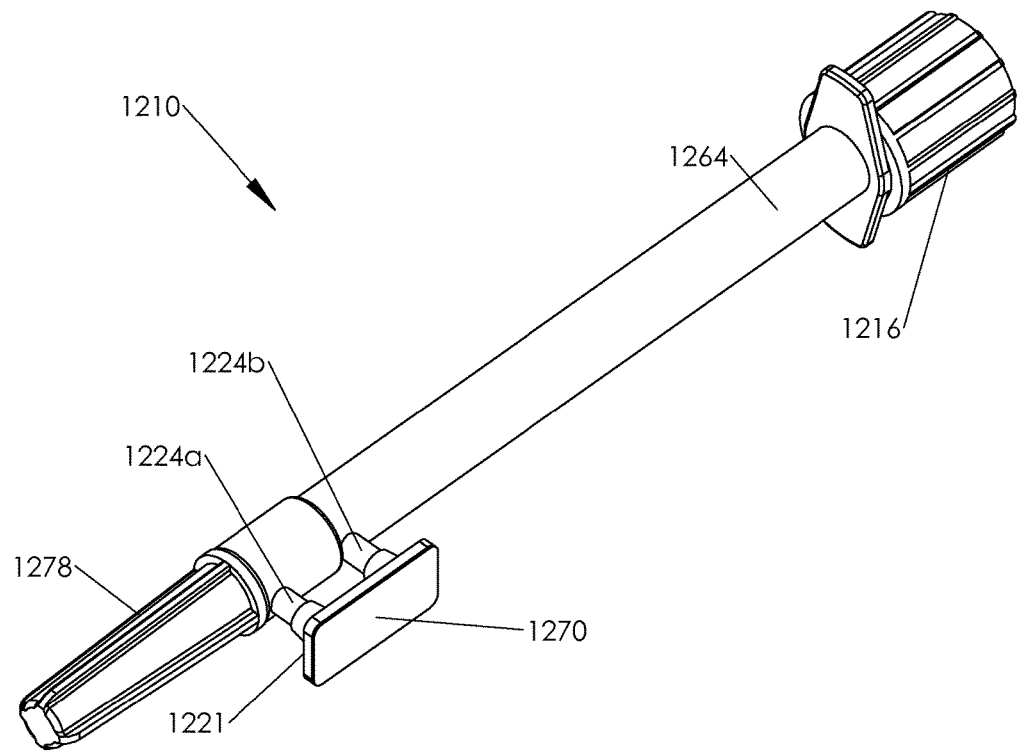
FIG. 20a is a perspective view of another example package in the form of a syringe in accordance with the present disclosure.
Figure 20B:
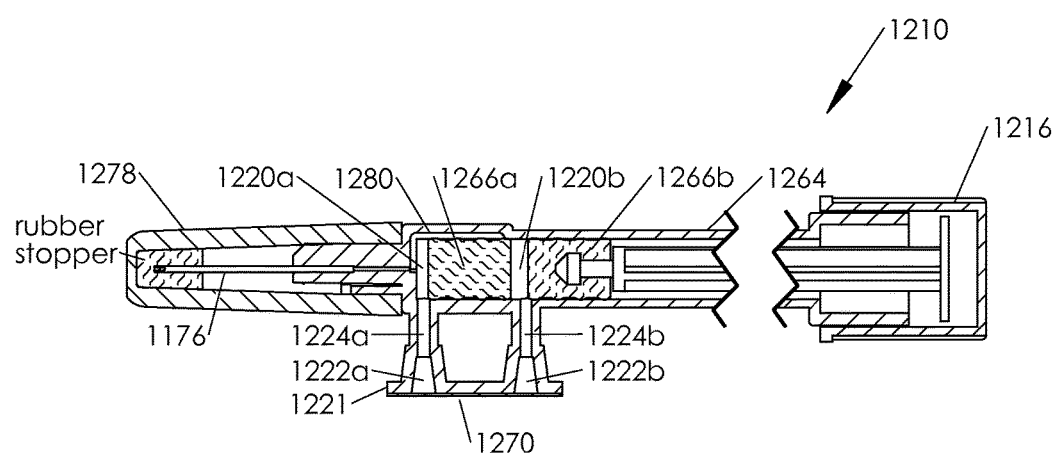
Figure 20C:
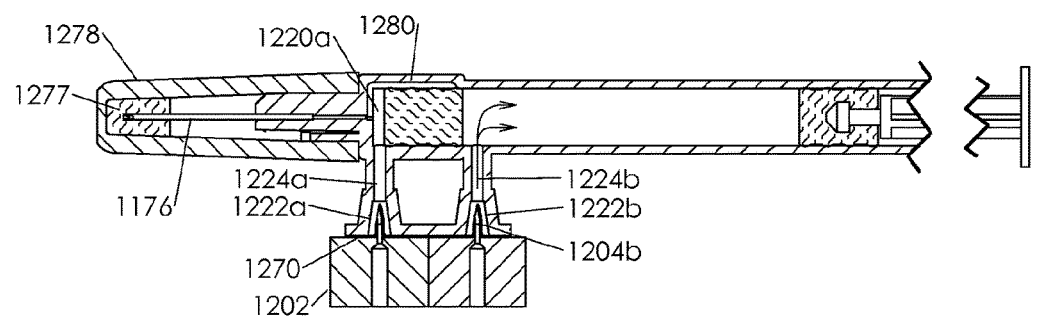
Figure 20D:
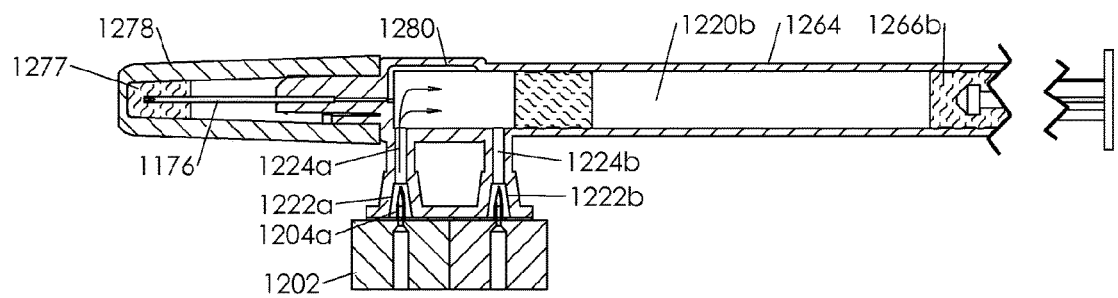

The dual syringe arrangement of the package 1210 may have at least some of the advantages described above with reference to the package 1110 concerning consecutive delivery of first and second beneficial agents. The package 1210 includes an administration device 1276 and a cover 1278 enclosing the administration device 1276. A sealing member 1277 (e.g., a rubber stopper) may be used to seal the administration device 1276. The sealing member 1277 may be positioned between the administration device 1276 and cover 1278 as shown in FIGS. 20b-20d. The package 1210 may include a sterile cap 1216 that maintains a sterile environment within the barrel 1264 at the proximal end of the barrel 1264. The first and second filling channels 1224a, 1224b are associated with the distal end of the barrel and may provide access to the first and second compartments 1220a, 1220b when the first plunger 1266a is positioned at a distal end of the barrel 1264 as shown in FIGS. 20b and 20c. The first filling channel 1224a communicates with the first compartment 1220a and the first filling chamber 1222a. The second filling channel 1224b communicates with the second compartment 1220b and the second filling chamber 1222b. The barrier 1270 aseptically seals the first and second filling chambers 1222a, 1222b.

FIG. 20c shows a filling device 1202 having first and second filling tubes 1204a, 1204b in fluid communication with the first and second filling chambers 1222a, 1222b. In one example method of filling the package 1210, the second compartment 1220b is first filled by delivering a beneficial agent through the second filling tube 1204b through the second filling chamber 1222b and second filling channel 1224b. The second plunger 1266b may be retracted upon pressure created in the second compartment 1220b by delivery of the beneficial agent into the second compartment 1220b. Alternatively, the second plunger 1266b may be retracted prior to delivering the second beneficial agent into the second compartment 1220b.

FIG. 20d shows filling of the first compartment 1220a by the filling system 1202. The first plunger 1266a is typically positioned so that the bypass channel 1280 is closed prior to delivering the first beneficial agent via the first filling tube 1204a, first filling chamber 1222a, and first filling channel 1224a to the first compartment 1220a. Delivering the first beneficial agent into the first compartment 1220a may push back the first plunger 1266a. As the first plunger 1266a is pushed back, the second beneficial agent pushes the second plunger 1266b further back. After the first and second compartments 1220a, 1220b are filled, the first and second filling channels 1224a, 1224b may be sealed and the adapter 1221 removed in a similar fashion as described above with reference to other embodiments disclosed herein.

The package 1210 may be emptied according to, for example, the methods described above with reference to FIGS. 19a-19e. The content held in package 1210 may be removed for testing or other purposes. The package 1210 may be resealed after being filled, sealed, and later accessed for removing some of the content.

Figure 21A:
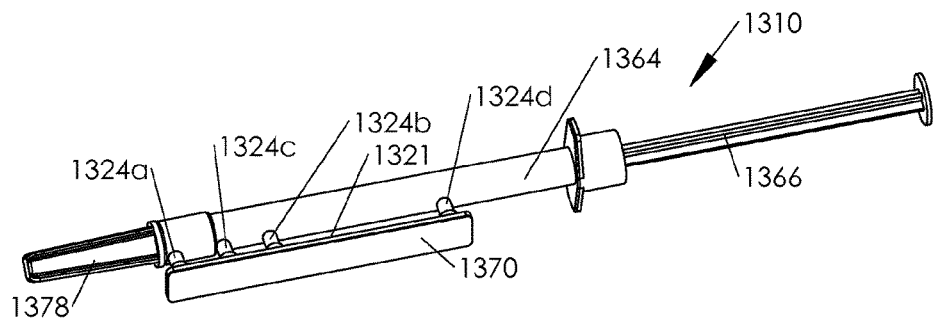
FIG. 21a is a perspective view of another example package in the form of a syringe in accordance with the present disclosure.
Figure 21B:
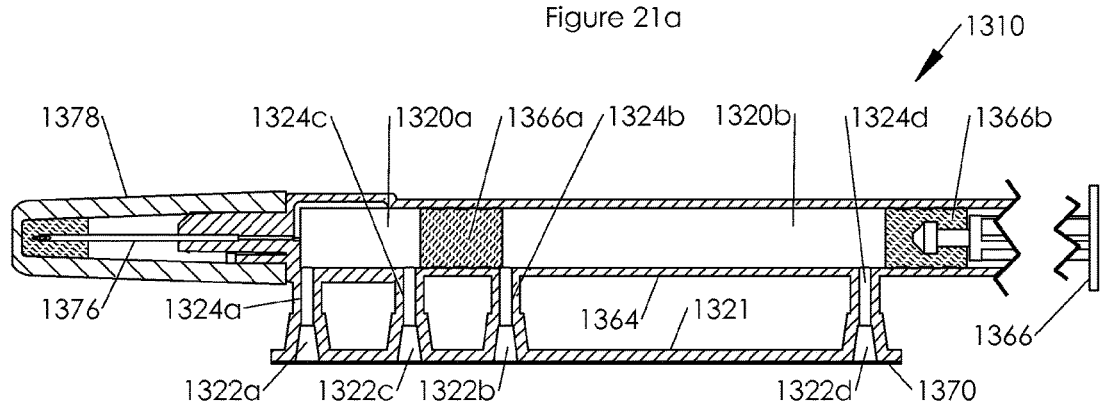
Figure 21C:
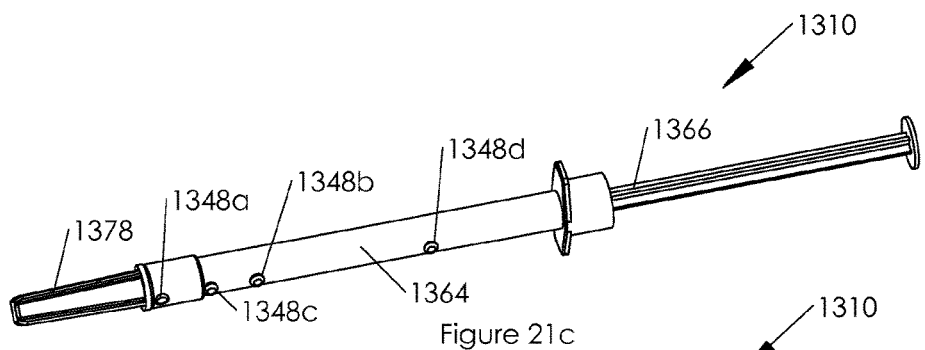
FIGS. 21c and 21d are perspective views of the package of FIG. 21a with the adapter removed.
Figure 21D:
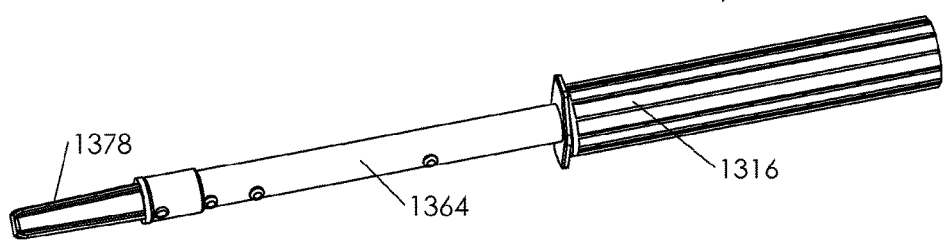

Referring now to FIGS. 21a-21d, another example package 1310 in the form of a disposable, dual chamber syringe is shown and described. The package 1310 includes a barrel 1364, a plunger 1366 having first and second plunger portions 1366a, 1366b, and an adapter 1321. The package 1310 may also include an administration device 1376 that is covered by a cover 1378. The barrel 1364 and first and second plunger portions 1366a, 1366b may define first and second compartments 1320a, 1320b. The adapter 1321 may carry first, second, third and fourth filling chambers 1322a-1322d, and first, second, third, and fourth filling channels 1324a-1324d. A sterile cap 1316 may be mounted to the plunger 1366 to seal closed a proximal end of the barrel 1364 as shown in FIG. 21d.

The package 1310 may be arranged in a pre-filled orientation shown in FIG. 21b with the first and second plunger portions 1366a, 1366b positioned at spaced apart locations within the barrel 1364. The first and second filling channels 1324a, 1324b and associated first and second filling chambers 1322a, 1322b may be connected to a filling device that delivers beneficial agent into the first and second compartments 1320a, 1320b. The third and fourth filling channels 1324c, 1324d and associated third and fourth filling chambers 1322c, 1322d may be connected to a filling device that provides evacuation of gases from the first and second compartments 1320a, 1320b. The first and third filling channels 1324a, 1324c may be spaced apart axially along barrel 1364, and the second and fourth filling channels 1324b, 1324d may be spaced apart axially along the second barrel 1364 to help promote quick and complete filling of the first and second compartments 1320a, 1320b.

For filling, the first and second plunger portions 1366a, 1366b may be preset in the fill position shown in FIG. 21b, thereby defining the volumes of the first and second compartments 1320a, 1320b. The first and second beneficial agents are delivered into the first and second compartments 1320a, 1320b via the first and second filling chambers 1322a, 1322b and first and second filling channels 1324a, 1324b. Gas is evacuated or exhausted from the first and second compartments 1320a, 1320b through the second and fourth filling channels 1324c, 1324d and the second and fourth filling chambers 1322c, 1322d. After the filling of compartments 1320a, 1320b is complete, the filling channels 1324a-1324d are sealed and the adapters 1321a, 1321b are removed as shown in FIGS. 21c and 21d. The channels 1324a-1324d may be sealed to form sealed channels 1348a-1348d.

FIGS. 22a-22d show another example package 1510 in the form of a vial. The package 1510 includes a vial 1582 sealed with an end seal 1565 to define a compartment 1520. The package 1510 also includes first and second filling chambers 1522a, 1522b, first and second filling channels 1524a, 1524b, and a barrier 1570 that seals closed the first and second filling chambers 1522a, 1522b. The end seal 1565 may be configured as a stopper or septum through which tubes defining the first and second filling channels 1524a, 1524b pierce to obtain access to the compartment 1520. The first and second filling channels 1524a, 1524b may be associated with a flip top cap of the vial 1582 and pierce through the end seal 1565, and are later removed with the flip top cover when the vial 1582 is opened.

FIG. 22d shows a filling device 1502 having filling tubes 1504a, 1504b connected to the package 1510 with the filling tubes 1504a, 1504b piercing through the barrier 1570 to obtain access to the first and second filling chambers 1522a, 1522b. After delivery of a substance such as a beneficial agent via the filling device 1502 to fill the compartment 1520, the first and second filling channels 1524a, 1524b are sealed to form first and second sealed channels 1548a, 1548b as shown in FIG. 22c. The filling chambers 1522a, 1522b may be removed as shown in FIG. 22d.

Figures 23A, 23B:
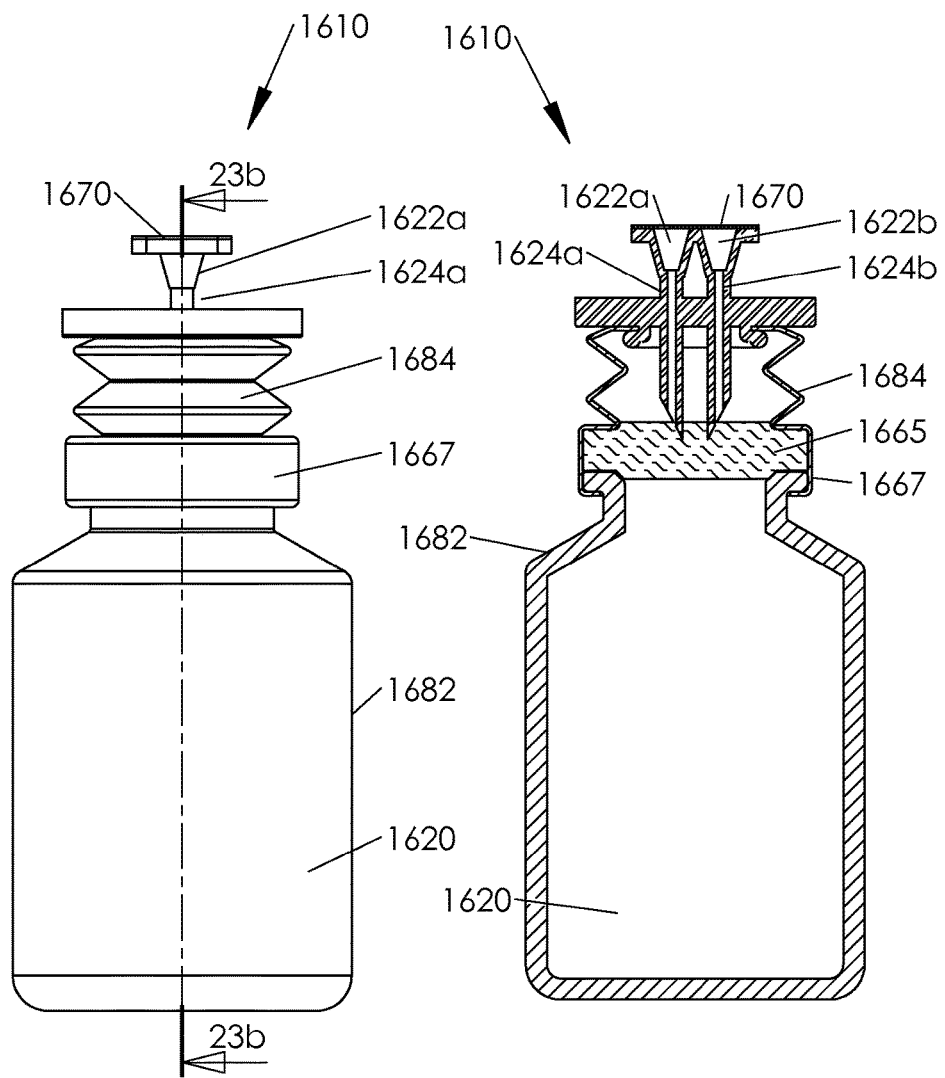
FIGS. 23a and 23b show another example package in the form of a vial in accordance with the present disclosure.

Referring to FIGS. 23a and 23b, another example package 1610 is shown having a similar construction as the package 1510 described above. Package 1610 includes a vial 1682 and end seal 1665 that define a compartment 1620. Package 1610 also includes first and second filling chambers 1622a, 1622b, first and second filling channels 1624a, 1624b, a barrier 1670 that seals closed the first and second filling chambers 1622a, 1622b, and a biasing member 1684. The biasing member 1684 may bias the filling channels 1624a, 1624b away from the end seal 1665 until it is intended to fill the compartment 1620. The biasing member 1684 may also bias the filling channels 1624a, 1624b out of the compartment 1620 and out of contact with the end seal 1665 after filling the compartment 1620.

The biasing member 1684 may be continuous with a stopper crimp 1667 that holds the end seal 1665 assembled with the vial. The biasing member 1684 may have other constructions comprising different materials, shapes, sizes and configurations to provide a similar function of spacing apart the first and second filling channels 1624a, 1624b away from the end seal 1665 and out of flow communication with the compartment 1620. The filling channels 1624a, 1624b may be operatively moved between a first position where they do not pierce the end seal 1665 and a second position where they do pierce the end seal 1665.

FIGS. 24a-24c show another example package 1700 having at least one heating element operable to control a temperature of the content of the package 1700. The package 1700 includes a compartment 1720, first and second filling chamber 1722a, 1722b, first and second filling channels 1724a, 1724b, a frangible seal portion 1730, a fitment 1736, first and second heating elements 1701, 1703, first and second heating sensors 1705, 1707. The first and second heating elements 1701, 1703 may control a temperature of the content held in the compartment 1720. At least one of the first and second sensors 1705, 1707 may help determine a fill level of the compartment 1720. Alternatively, at least one of the first and second sensors 1705, 1707 may help determine a temperature of the content held in the compartment 1720. The heating and sensor features of FIGS. 24a-24c may be used with any of the other example packages disclosed herein.

The package 1700 may also include a plurality of electronic connectors or tabs 1709 that provide electronic connection of the package 1700 to an external system. The tabs 1709 may be electronically connected to the first and second heating elements 1701, 1703 and the first and second sensors 1705, 1707.

FIGS. 25a-25e illustrate another example delivery assembly 1800 that includes a package 1810 and a delivery device 1812. The delivery device 1812 is in the form of, for example, a syringe having a barrel 1813, a plunger (not shown), and a cap 1816. The cap 1816 provides a sterile and sealed proximal end of the delivery device 212 where the plunger is inserted into the barrel 1813.

The package 1810 includes a compartment 1820, first and second filling chambers 1822a, 1822b, and first and second filling channels 1824a, 1824b. The package 1810 may include a body or backing 1856 arranged on a side of the package 1810 opposite the compartment 1820. A pair of filling ports or access regions 1834a, 1834b may be provided for accessing the first and second filling chambers 1822a, 1822b. In one example, the access regions 1834a, 1834b are positioned on a side of the package 1810 opposite the first and second filling chambers 1822a, 1822b. The access regions 1834, 1834b may be resealable, and may be configured to provide a sealed interface between a filling device inserted through the access regions 1834a, 1834b into the first and second filling chambers 1822a, 1822b as will be described in further detail below.

FIGS. 25a and 25b illustrate top and bottom perspective views of the delivery assembly 1800. FIG. 25b shows the access regions 1834a, 1834b having been penetrated (e.g., pierced) to gain access to the first and second filling chambers 1822a, 1822b as part of filling the compartment 1820.

FIG. 25c shows the first and second filling chambers 1822a, 1822b collapsed to remove the contents held in the first and second filling chambers 1822a, 1822b during filling. Collapsing the first and second filling chambers 1822a, 1822b may direct the content held therein into the compartment 1820 or into the filling device.

FIG. 25d shows the first and second filling channels 1824a, 1824b collapsed to seal closed a flow path between the compartment 1820 and the first and second filling chambers 1822a, 1822b. The filling channels 1824a, 1824b may be sealed closed using, for example, a heating element. The first and second filling channels 1824a, 1824b after being sealed may be referred to as first and second sealed channels 1848a, 1848b.

FIG. 25e shows an alternative form of trimming the package 1810 to remove the collapsed first and second filling chambers 1822a, 1822b. A pair of punched holes 1861a, 1861b are formed in the package 1810 to remove the first and second filling chambers 1822a, 1822b. Other types of trimming are shown with reference to, for example, the package 10 discussed with reference to FIGS. 1a-1f and the package 210 shown with reference to FIGS. 5a-5d. The step of trimming may be conducted at a separate location from the filling, collapsing and sealing steps shown with reference to FIGS. 5a-5d. In at least some examples, the trimming step, including punching the holes 1861a, 1861b, may create contaminants such as dust that may affect sterility of the filling instruments used to fill, collapse and seal the package 1810.

FIGS. 26a and 26b show additional views of the delivery assembly 1800. FIG. 26b shows a cross-sectional view of the compartment 1820, first filling chamber 1822a, first filling channel 1824a, access region 1834a and a portion of the body 1856 of package 1810. The cross-sectional view of FIG. 26b is included in FIGS. 30a-30e to help illustrate a process or method of filling the package 1810.

Figures 26, 27:
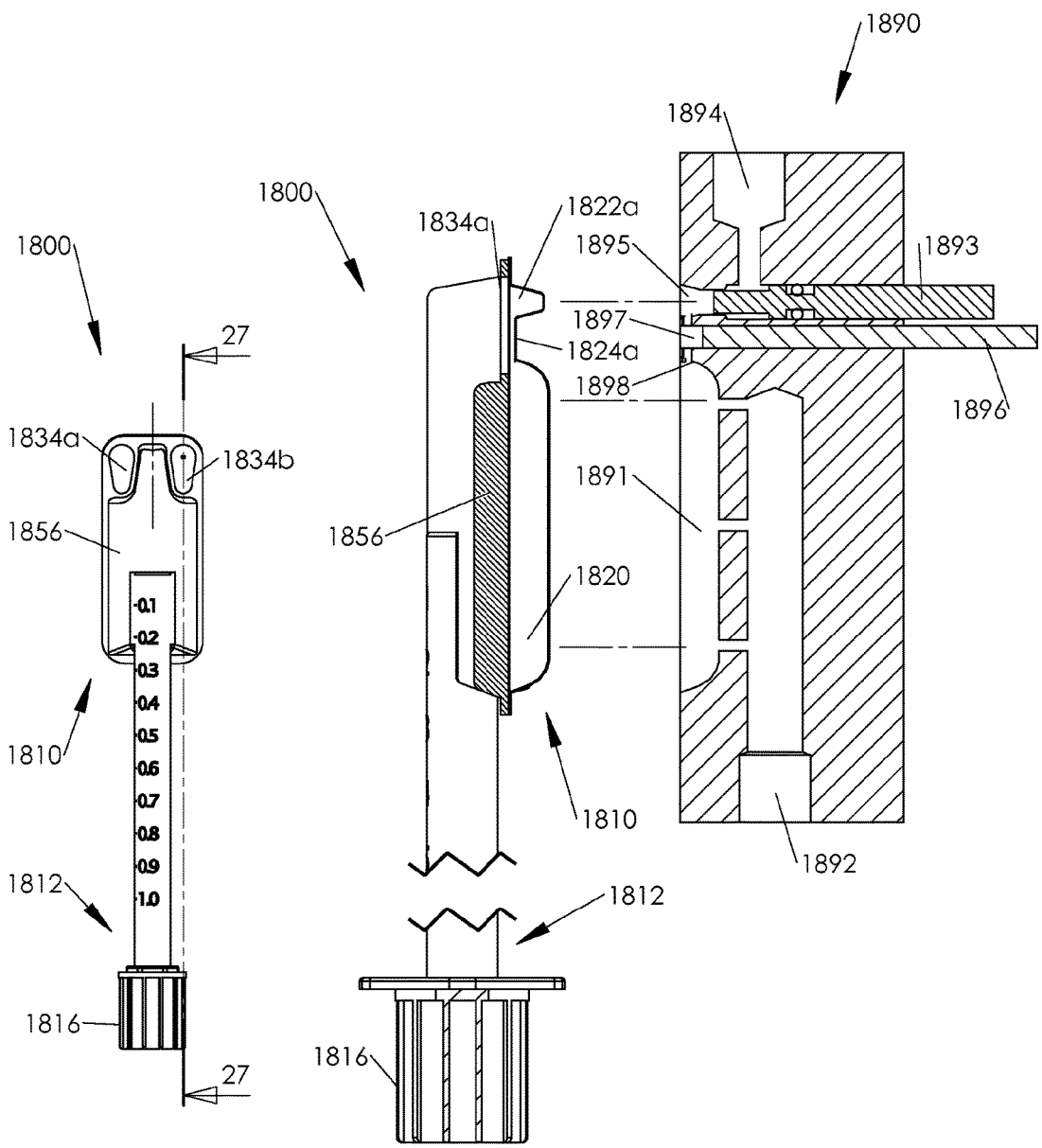
FIG. 26 is a side view of the package of FIGS. 25a-25e.
FIG. 27 is a cross-sectional view of the package of FIG. 26 and a filling station of an example filling system in accordance with the present disclosure.

FIG. 27 shows a filling station 1890 of an example filling system. The filling station 1890 includes a holding cavity 1891, a cavity vacuum line 1892, a chamber collapsing member 1893, a collapsing member bore 1894, a chamber vacuum line 1895, a heating member 1896, a heating member bore 1897, and a channel recess 1898. The holding cavity 1891 is sized to receive the compartment 1820 of the package 1810. The holding cavity 1891 is connected to the cavity vacuum line 1892 such that a vacuum applied in the cavity vacuum line 1892 holds the compartment 1820 within the holding cavity 1891.

The chamber collapsing member 1893 is aligned with the first filling chamber 1822a and moves within the collapsing member bore 1894 toward the first filling chamber 1822a to collapse the first filling chamber 1822a. The collapsing member bore 1894 may be connected in flow communication with the chamber vacuum line 1895. A vacuum applied in the chamber vacuum line 1895 may help hold the first filling chamber 1822a within the collapsing member bore 1894. The channel recess 1898 is sized to receive the first filling channel 1824a. The heating member 1896 moves within the heating member bore 1897 to contact the first filling channel 1824a positioned within the channel recess 1898 to seal closed the first filling channel 1824a.

The filling station 1890 is shown having a single chamber collapsing member 1893 and a single heating member 1896 that are arranged to interact with the first filling chamber 1822a and the first filling channel 1824a, respectively. The filling station 1890 typically includes another chamber collapsing member and another heating member that are movable within a chamber member bore and heating member bore, respectively, to interact with the second filling chamber 1824b and second filling channel 1824b. The same chamber vacuum line 1894 may be in flow communication with both of the collapsing member bores, or a separate vacuum line 1894 may be provided for each collapsing member bore. In some arrangements, a vacuum line may be connected in flow communication with at least one of the heating member bores.

The collapsing member bore 1894 may have an open end that receives the first filling chamber 1822a. A shape of the collapsing member bore 1894 may helps shape or maintain a shape of the first filling chamber 1822a during filling. The shape of the first filling chamber 1822a formed by positioning in the collapsing member bore 1984 may be preferred for receiving a particular filling device (e.g., filling tube 1804 shown and described with reference to FIGS. 28a and 28b). A filling chamber having an incorrect or deformed shape may be improperly punctured with the filling device.

Other filling station embodiments may be operable without using a chamber collapsing member. The content held within the filling chamber of the package may be removed by other means including, for example, suction applied by the filling tube 1804. Alternatively, the content is maintained within the filling chamber of the package after sealing of the filling channel and may be discarded as part of trimming the package 1810.

The heating member 1896 may have various constructions and provide sealing in different ways. For example, the heating member 1896 may be an impulse sealer operable with a short burst of heat provided by a low energy source using a high conductive heating element.

Figure 28A:
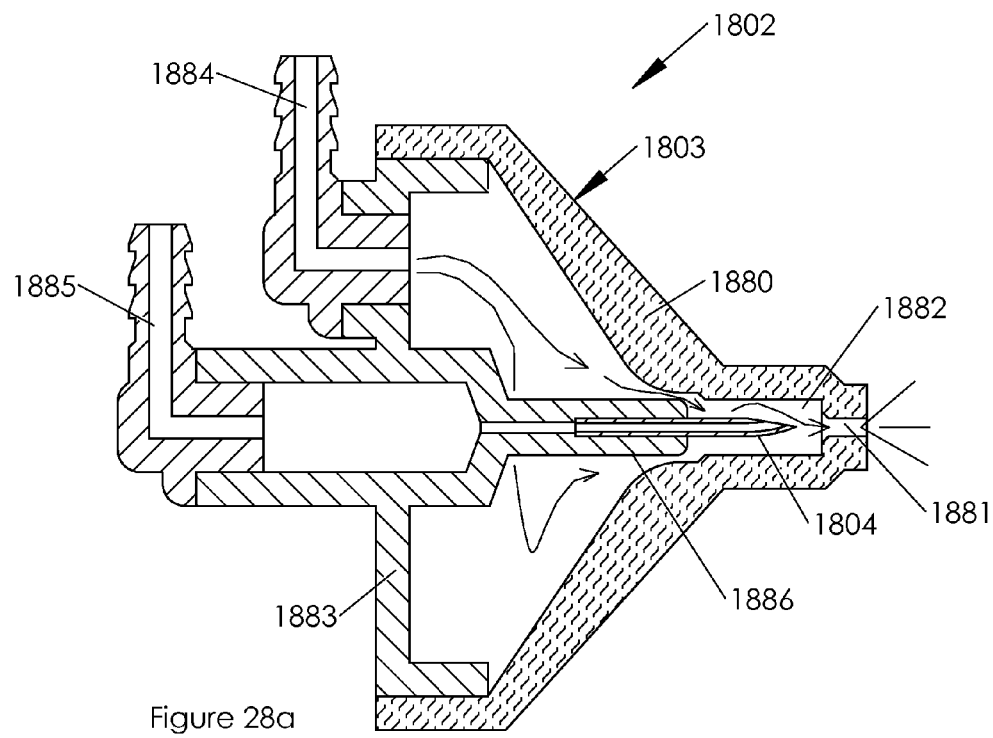
FIGS. 28a and 28b are cross-sectional views of an example filling head for use with the filling station of FIG. 27 for filling the package of FIG. 26.
Figure 28B:
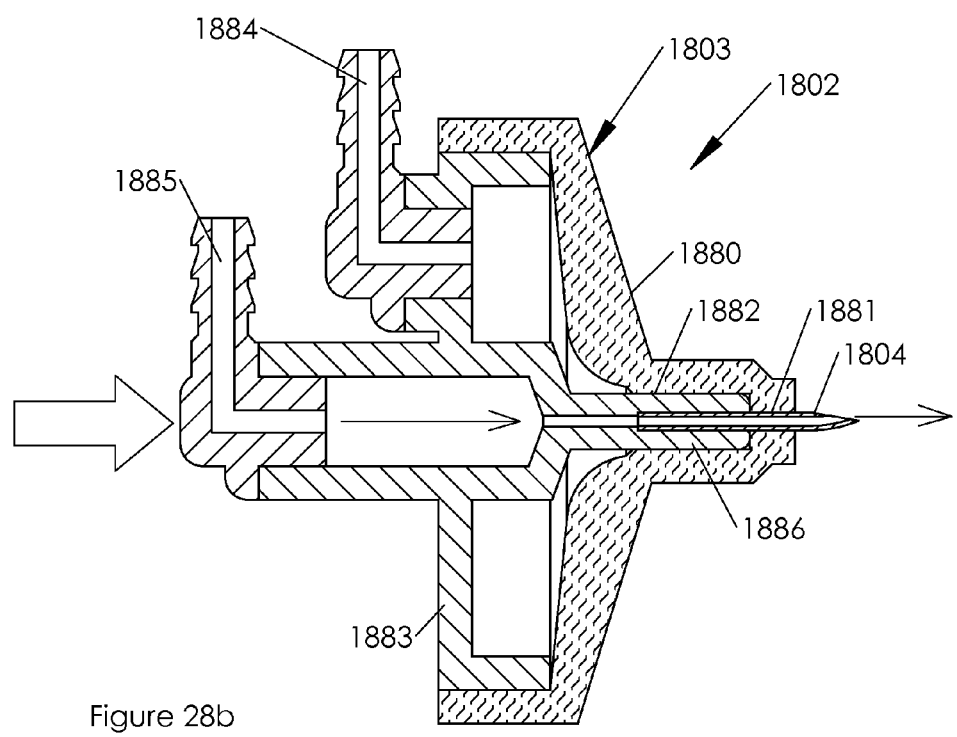

FIGS. 28a and 28b show an example filling head 1802 as part of a filling system comprising the filling station 1890. The filling head 1802 includes a sheath 1803 having a flexible skirt 1880, an outlet 1881, and an internal sealing surface 1882. The filling head 1802 also includes a filling tube 1804. The filling tube 1804 may have a pointed tip arranged and configured to penetrate through the access region 1834a of the package 1810 to position the filling tube 1804 within the first filling chamber 1822a.

The filling head 1802 may also include a carrier base 1883, a decontamination port 1884, a beneficial agent port 1885, and a filling tube support 1886. The filling tube support may support the filling tube 1804. The beneficial agent port 1885 may be arranged in flow communication with the filling tube 1804. The decontamination port 1884 may be connected in flow communication with an exterior of the filling tube 1804, the outlet 1881 and the sealing surface 1882 to flush out the filling head 1802 prior to connecting with the package 1810 (see FIG. 28a). FIG. 28b shows the filling tube 1804 advanced through the outlet 1881 to a position wherein the filling tube 1804 penetrates into the first filling chamber 1822a.

The skirt 1880 of the sheath 1803 may flex to permit movement of the carrier base 1883 to advance the filling tube support 1886 and contact with the sealing surface 1882, and advance the filling tube 1804 through the outlet 1881. A beneficial agent or a constituent thereof is advanced from the beneficial agent port 1885 and out through the filling tube 1804.

Figure 29A:
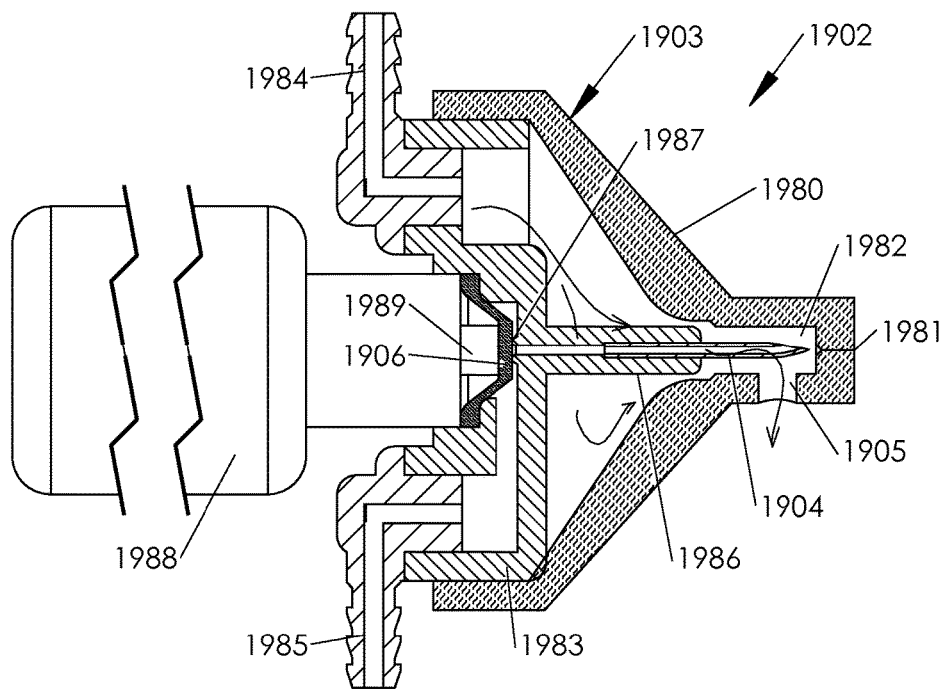
FIGS. 29a and 29b are cross-sectional views of another example filling head for use in filling the package of FIGS. 25a-26b.
Figure 29B:
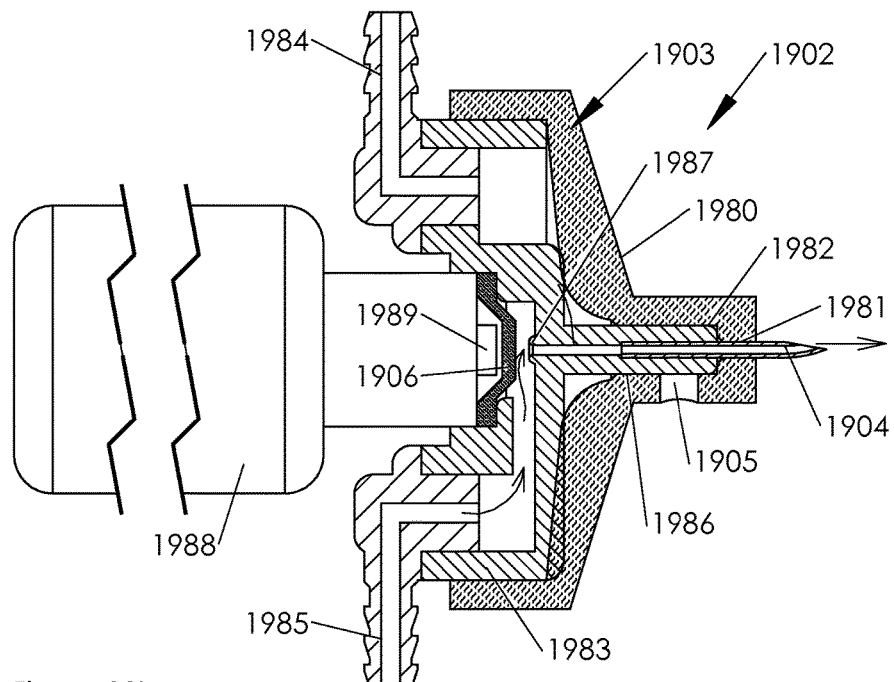

FIGS. 29a and 29b show another example filling head 1902. The filling head 1902 includes a sheath 1903 and filling tube 1904. The sheath 1903 includes a skirt 1980, an outlet 1981, a sealing surface 1982, and an exit 1905 for the decontamination fluid. The filling head 1902 also includes a carrier base 1983, a decontamination port 1984, a beneficial agent port 1985, a tube support 1986, a valve sealing lip 1987, and a valve seal membrane 1906. A solenoid body 1988 may move a solenoid actuator 1989 to move the valve seal membrane 1906 into and out of contact with the valve sealing lip 1987 to control flow of a beneficial agent or constituent thereof via the beneficial agent port 1985 into the filling tube 1904.

The solenoid actuator 1989 may help maintain a seal between the valve seal membrane 1906 and the valve sealing lip 1987 during delivery of the decontamination fluid via the decontamination port 1984 around the filling tube 1904 and out of the beneficial agent exit 1905 as shown in FIG. 29a. The carrier base 1983 is then advanced relative to the sheath 1903 to move the filling tube 1904 through the outlet 1981 to advance the filling tube 1904 into the first filling chamber 1822a. The solenoid actuator 1989 is then move the valve seal membrane 1906 out of sealing contact with the valve sealing lip 1987 to permit flow of a beneficial agent or constituent thereof from the beneficial agent port 1985 into the filling tube 1904 as shown in FIG. 29*b*.

Many other embodiments are possible for filling heads that may be used in conjunction with a filling station for filling various packages, such as those packages described herein with reference to the attached figures. Another example filling head may include one or more vacuum lines used to remove a sample from the package or to remove content held within the filling chamber of the package prior to or after sealing closed the filling channel after filling the compartment. Other types of filling heads may be operable without use of a decontamination fluid and may use different structure besides the sheath shown with reference to FIGS. 28*a*-29*b*. Other features are possible for use with the filling head to maintain sterility of the filling head prior to, during, and after interacting with the package and filling station.

Figure 30A:
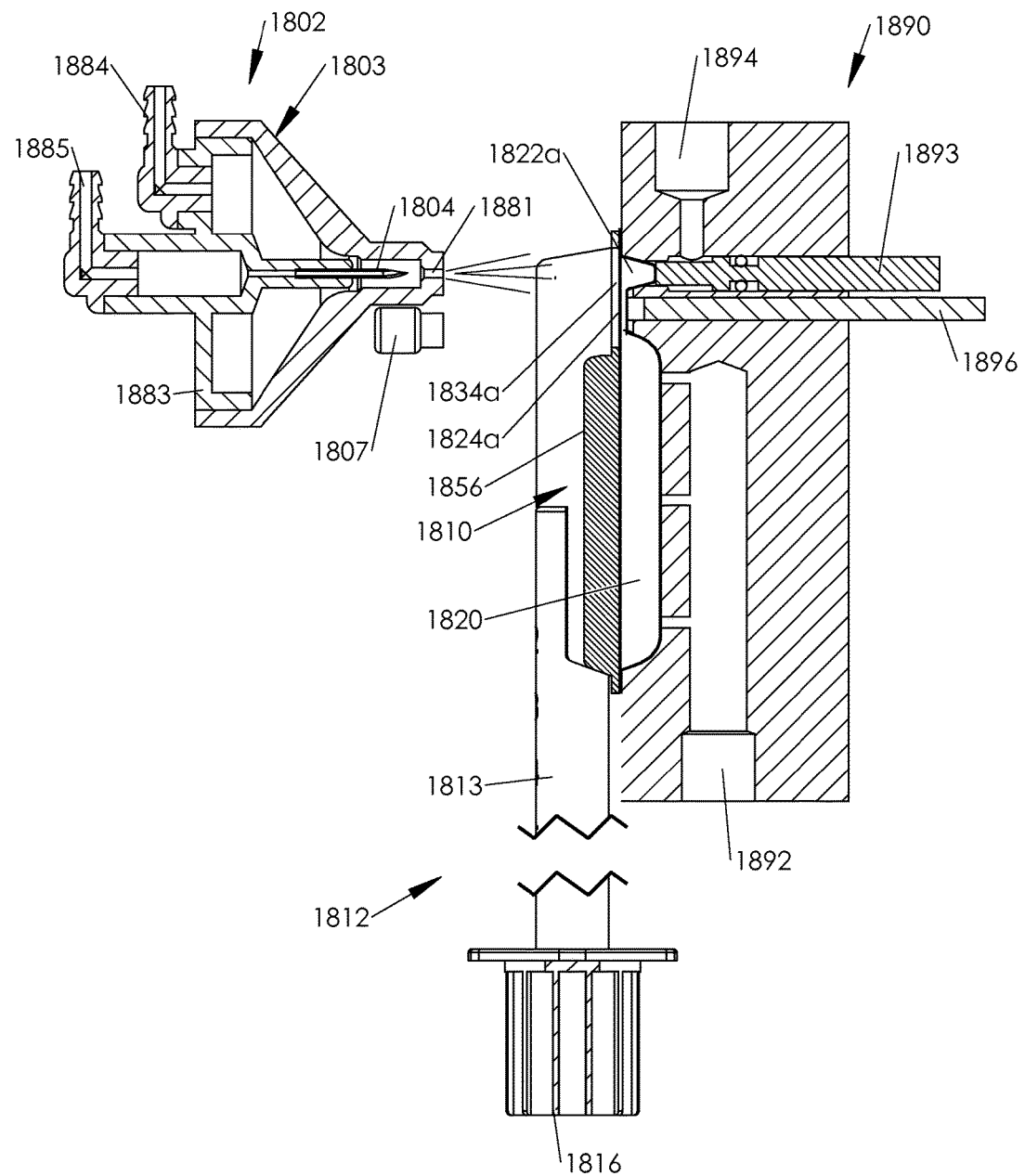
FIGS. 30a-30e show filling of the package of FIGS. 25a-25e using the filling station of FIG. 27 and the filling head of FIGS. 28a and 28b.

Referring now to FIGS. 30*a*-30*e*, an example method of filling the package 1810 of delivery assembly 1800, and preparing the delivery device 1812 for use is shown and described. FIG. 30*a* shows the package 1810 mounted to the filling station 1890. The compartment 1820 is positioned within the holding cavity 1891. The first filling chamber 1822*a* is positioned within the collapsing member bore 1894. The first filling channel 1824 is aligned within the heating member bore 1897. The cavity vacuum line 1892 and chamber vacuum line 1895 may apply a vacuum force that holds the package 1810 in contact with the filling station 1890. The vacuum force applied at the cavity vacuum line 1892 and chamber vacuum line 1895 may maintain a shape or reshape portions of the compartment 1820 and first filling chamber 1822*a*.

The filling head 1802 may be prepared for interfacing with the package 1810 by delivering a volume of decontamination fluid via the decontamination port 1884 that passes around the filling tube 1804 and out of the outlet 1881. The filling head 1802 may be aligned with the access region 1834*a*. A filling sensor 1807 may be mounted to the filling head 1802 and arranged to align with the first filling channel 1824*a*. The filling sensor 1807 may be operable to determine when the compartment 1820 is filled to capacity. In one example, the filling sensor 1807 determines when at least one of the first filling channel 1824*a* and compartment 1820 no longer has any gas (e.g., air) positioned therein, which indicates that the compartment 1820 is filled completely with contents (e.g., a beneficial agent or a constituent thereof).

Figure 30B:
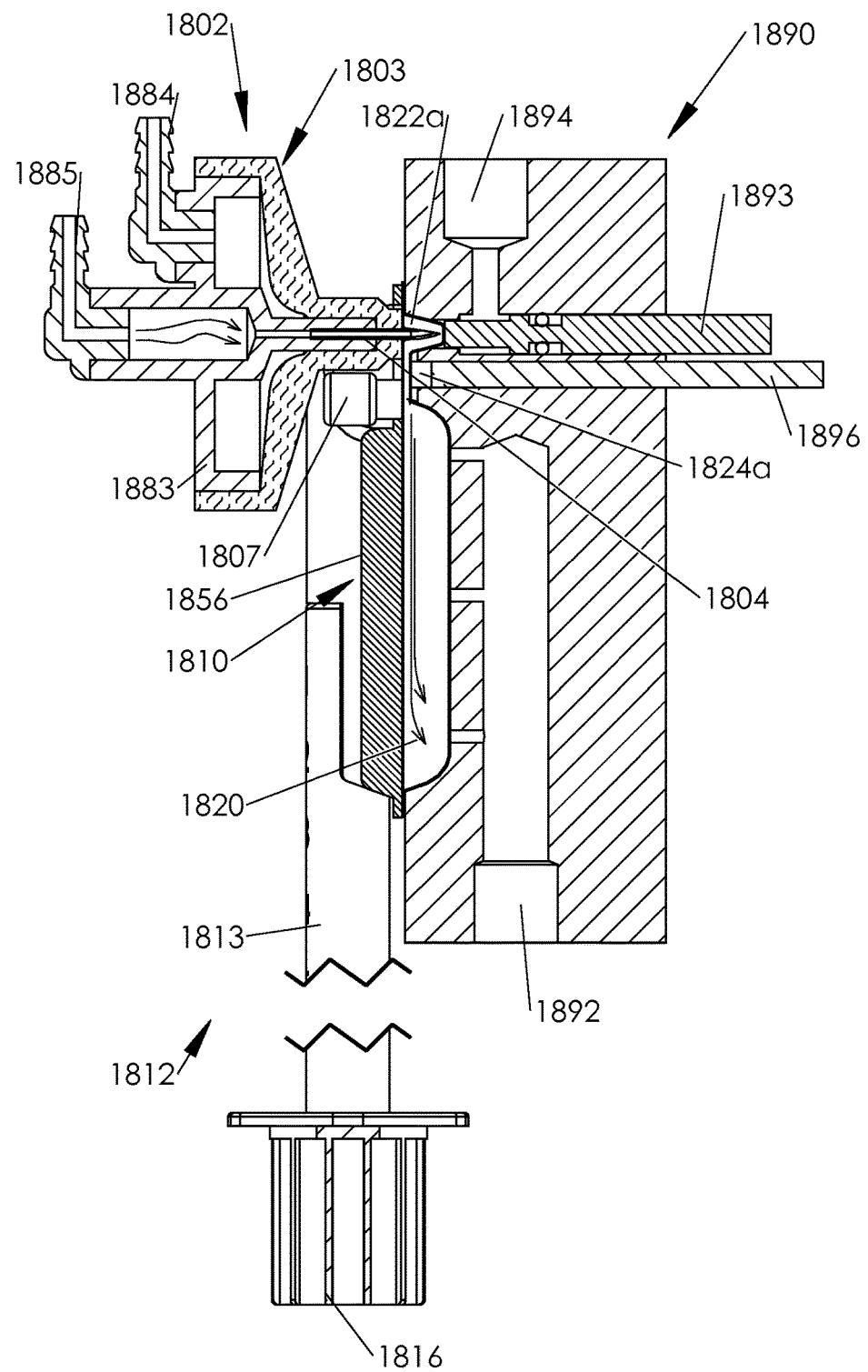

FIG. 30*b* shows the filling head 1802 contacting the package 1810 with the filling tube 1804 advanced through the access region 1834*a* and into the first filling chamber 1822*a*. A beneficial agent or a constituent thereof is delivered from the beneficial agent port 1885 through the filling tube 1804, the first filling chamber 1822*a*, the first filling channel 1824*a*, and into the compartment 1820. The beneficial agent continues to be delivered until the compartment 1820 is completely filled. As described above, the filling head 1802 may include another filling tube and features that provide access to the second filling chamber 1822*b* concurrently with accessing the first filling chamber 1822*a*. The access via second filling chamber 1822*b* may be used to remove gases from the compartment 1820 while delivering the beneficial agent via the first filling chamber 1822*a*.

Figure 30C:
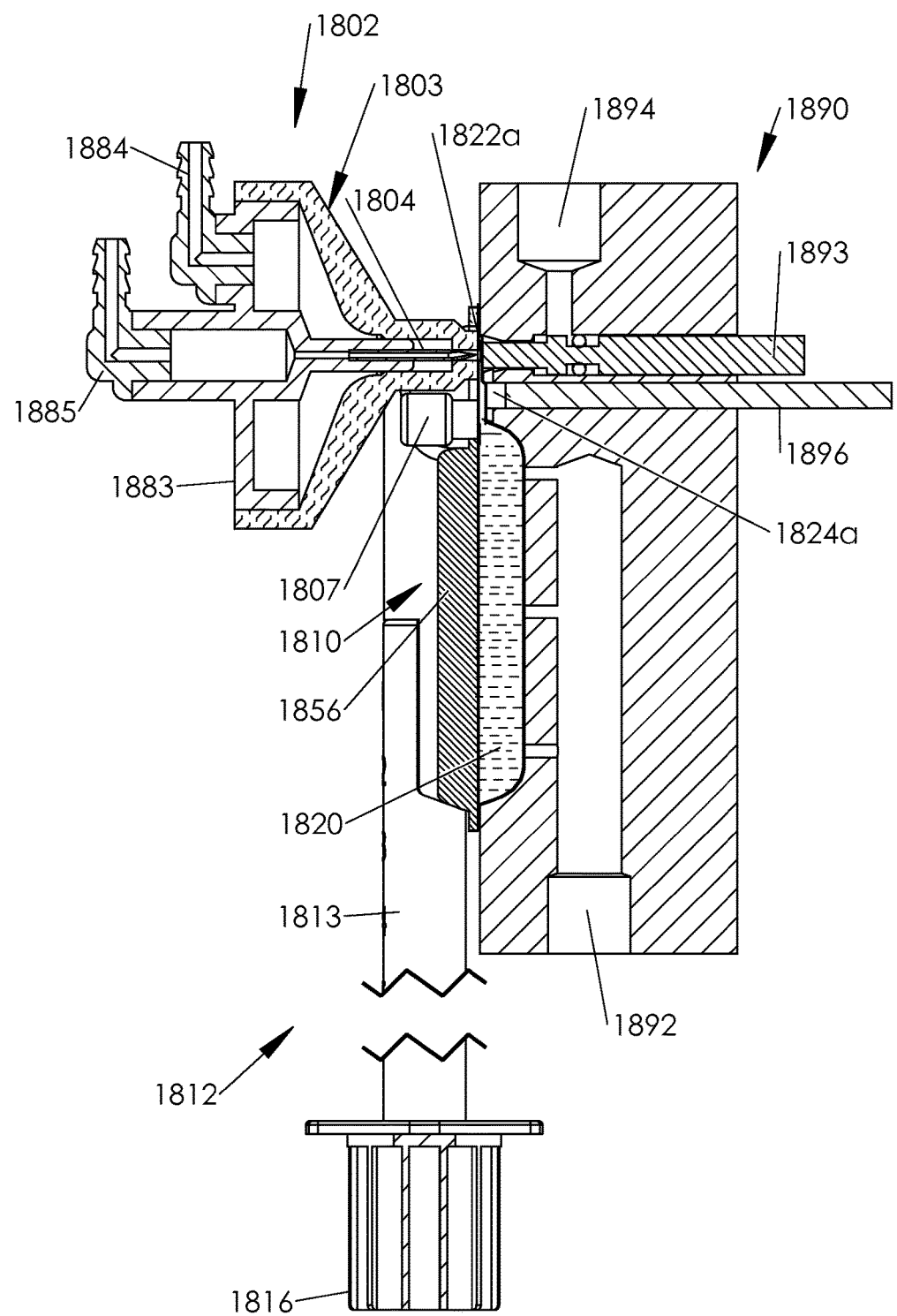

After the compartment 1820 is completely filled as confirmed by the filling sensor 1807, the filling tube 1804 may be retracted as shown in FIG. 30*c* and the chamber collapsing member 1893 is advanced to collapse the first filling chamber 1822*a*. The content within the first filling chamber 1822*a* may be moved through the first filling channel 1824*a* into the compartment 1820. In other arrangements, the contents held within filling chamber 1822*a* may be moved to a different location such as, for example, the filling tube 1804.

Figure 30D:
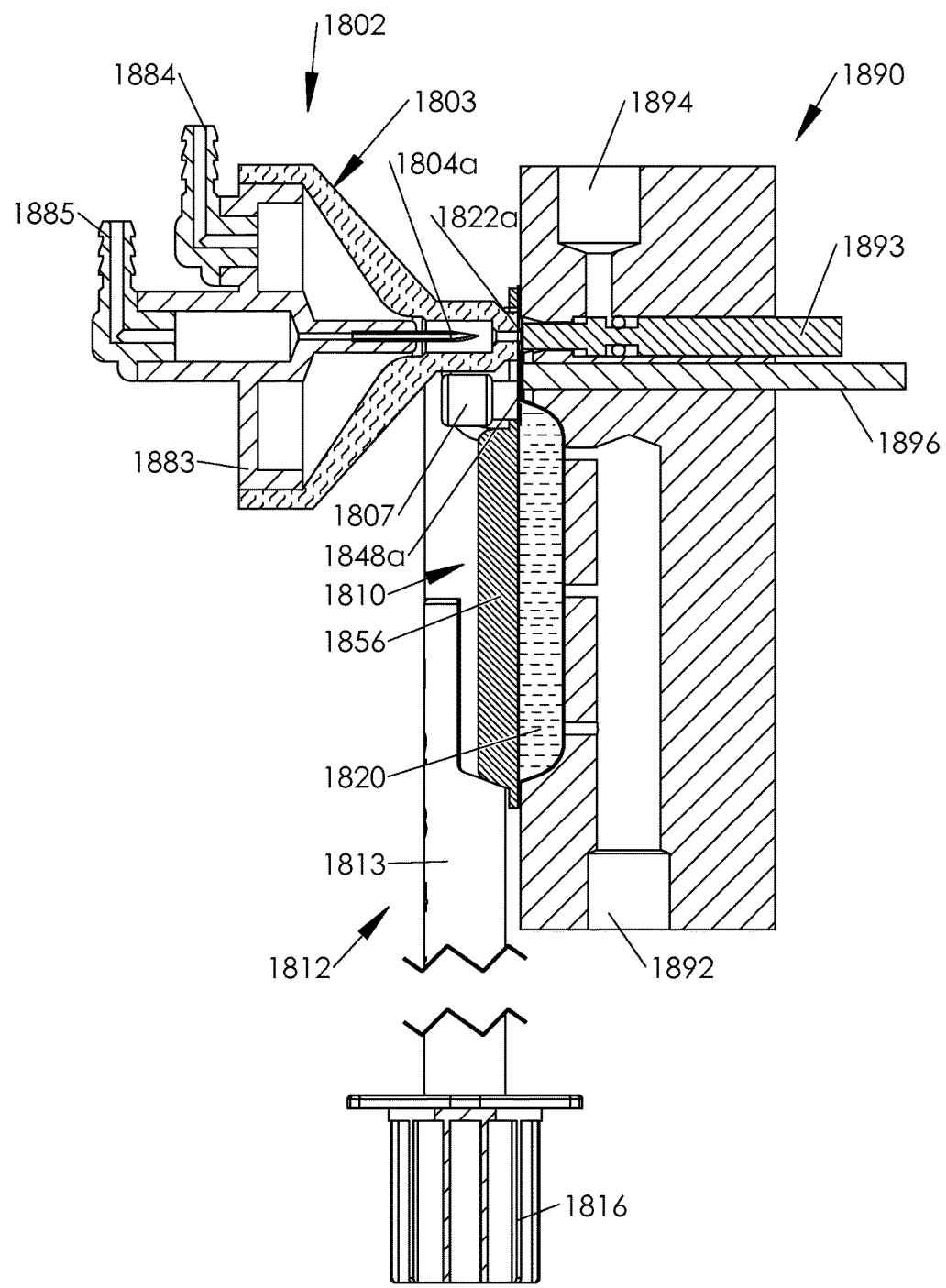

FIG. 30*d* shows the filling tube 1804 further retracted into the original or rest position shown in FIG. 30*a*. The filling head 1802 may be removed from contact with the package 1810 and prepared for filling a different package. Preparation for filling a different package may include, for example, delivering a volume of decontamination fluid as shown in FIG. 30*a*.

FIG. 30*d* also shows the heating member 1896 advanced into contact with the first filling channel 1824*a*. The heating member 1896 may seal closed the first filling channel 1824*a* to seal the compartment 1820. In one example, the heating member 1896 is pre-heated before contacting the package 1810. In other examples, the heating member 1896 contacts the package 1810 (e.g., the first filling channel 1824*a*) and is then heated.

Figure 30E:
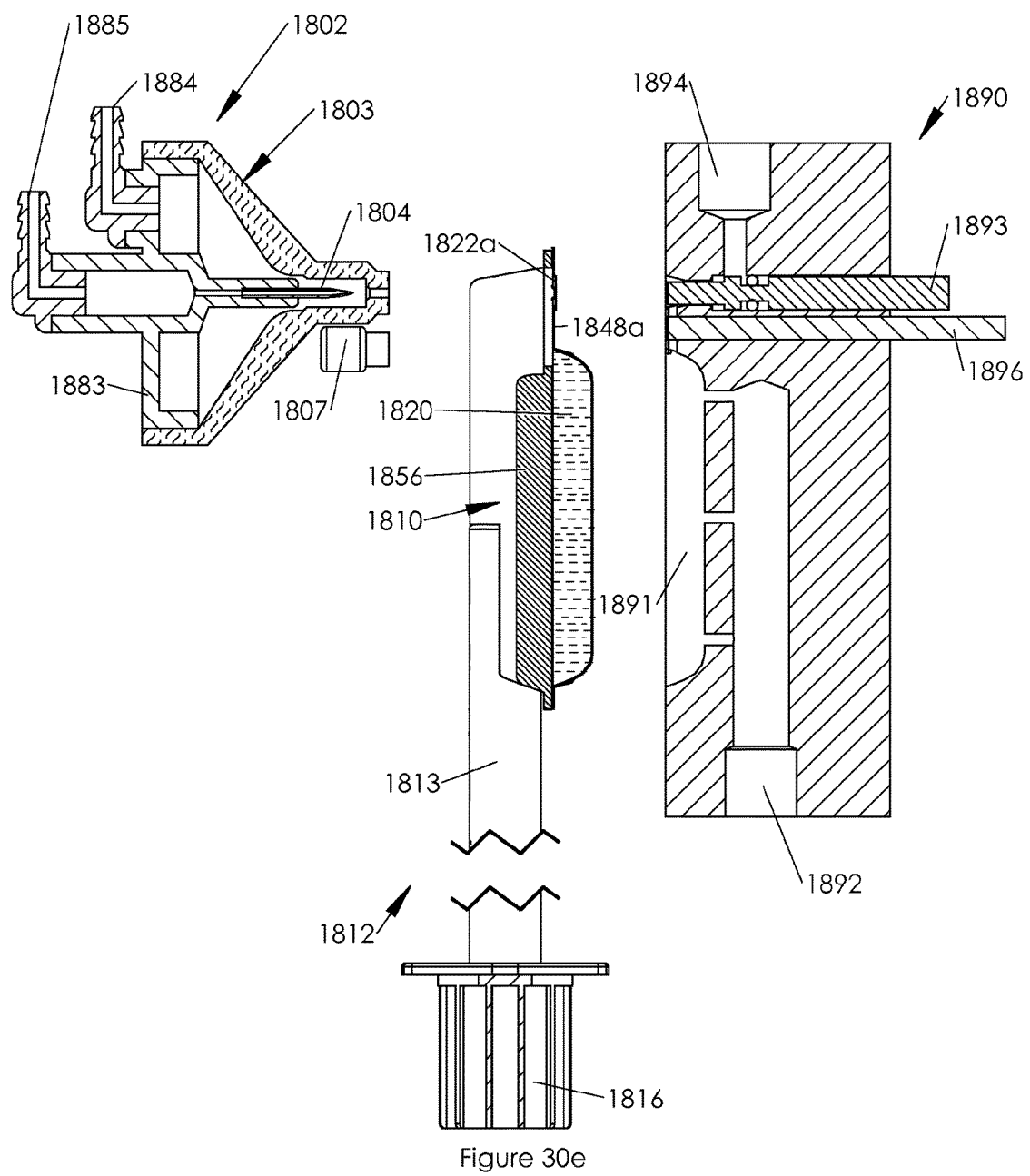

FIG. 30*e* shows the package 1810 detached from the filling head 1802 and the filling station 1890. The content of compartment 1820 may be moved into the delivery device 1812. In one example, the content is drawn into the delivery device by retracting the plunger relative to the barrel 1813. The cap 1860 may be removed to permit operation of the plunger.

The frangible seal 1830 (see FIGS. 25*a*-25*e*) may be ruptured or otherwise broken in order to provide fluid communication between the package 1810 and the delivery device 1812. The delivery device 1812 as shown in FIG. 30*e* may be prepared for use with a patient by moving the content of compartment 1820 into the delivery device 1812 and detaching the package 1810 from the delivery device 1812 to expose an administration member such as, for example, a needle that is attached to the delivery device 1812 at an end opposite the plunger.

Prior to loading the delivery device 1812 with the content of compartment 1820 (as shown in FIG. 30*e*) and after sealing the first filling channel 1824*a* (as shown in FIG. 30*d*), the package 1810 may be trimmed to remove at least a portion thereof. The trimming step may include, for example, removing the first and second filling chambers 1822*a*, 1822*b* and at least portions of the first and second filling channels 1824*a*, 1824*b*, or associated sealed channels 1848*a*, 1848*b* as shown in FIG. 25*d*. The trimming may include punching the punched holes 1861*a*, 1861*b* as shown in FIG. 25*e*. The trimming of package 1810 may be performed at a different location during manufacturing from a location where the filling system and associated filling, collapsing and sealing steps of FIGS. 30*a*-30*d* are performed.

FIGS. 31*a* and 31*b* show an example package 1910 in the form of an infusion bag. The package 1910 includes first and second layers 1926, 1928 that define at least in part a compartment 1920, a plurality of filling chambers 1922*a*-1922*d*, and a plurality of filling channels 1924*a*-1924*d* between the first and second layers 1926, 1928. The package 1910 includes a pair of outlet ports 1919*a*, 1919*b* that are connected in flow communication with the compartment 1920. The filling chambers 1922*a*-1922*d* and filling channels 1924*a*-1924*d* may be used to fill the compartment 1920 with content (e.g., a beneficial agent or a constituent thereof), and the outlet ports 1919*a*, 1919*b* may be used to remove the content. In at least some examples, the package 1910 is resealable after filling the compartment 1920 via the filling chambers 1922a-1922d and filling channels 1924a-1924d and before removing the content via at least one of the outlet ports 1919a, 1919b.

The infusion bag 1910 may provide a variable volume compartment 1920. The compartment 1920 may be provided in a sealed state and completely empty (e.g., in a vacuum state). The compartment 1920 may hold variable amounts of content (e.g., liquid beneficial agent) without needing to concurrently remove gases. Alternatively, the compartment 1920 may include a volume of gas that is removed as the beneficial agent is filled into the compartment 1920.

The filling chambers 1922a-1922d may be accessed through access regions 1934a-1934d on the second wall 1928 (see FIG. 31b). Alternatively, the filling chambers 1922a-1922d may be accessed along the first wall 1928. The filling chambers 1922a-1922d may be deformed (e.g., collapsed) prior to or after filling of the compartment 1920. For example, the filling chambers 1922a-1922d may be collapsed as shown in FIG. 31c for purposes of rolling or stacking the package 1910 when storing or shipping the package 1910 prior to filling. The filling chambers 1922a-1922d may be restored to their original or filling shape (see FIGS. 31a and 31b) by applying, for example, a vacuum force to the filling chambers 1922a-1922d when positioning in a filling station (e.g., filling station 1890 described above).

Figure 32A:
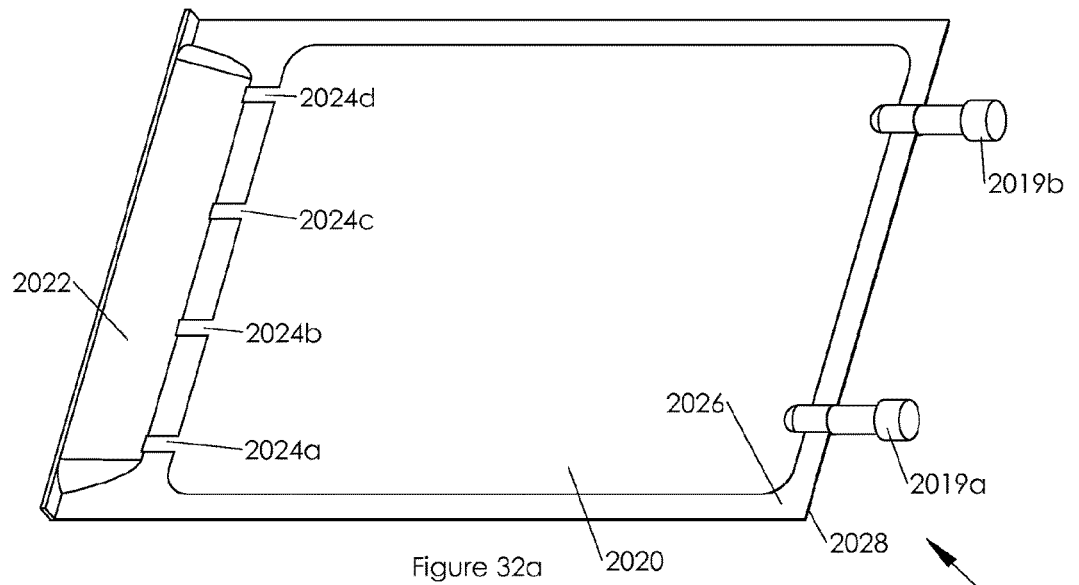
FIGS. 32a and 32b are perspective views of another example package in the form of an infusion bag having an access insert in accordance with the present disclosure.
Figure 32B:
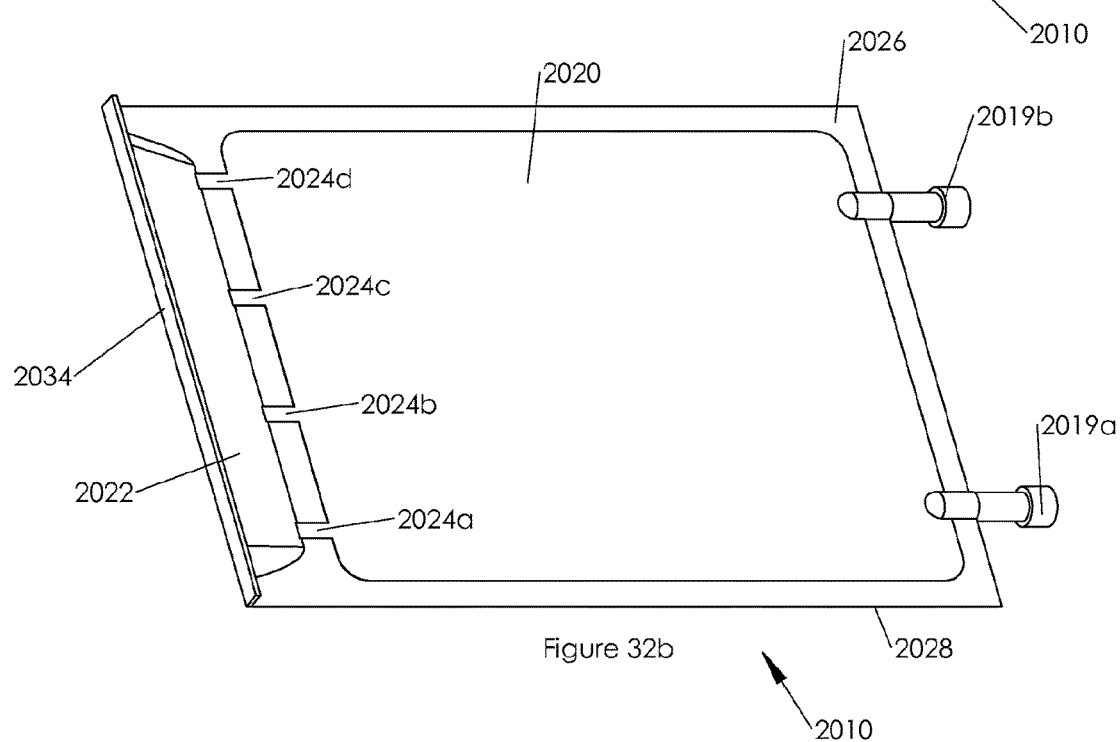

FIGS. 32a and 32b show another example package 2010 in the form of an infusion bag. The package 2010 includes a compartment 2020, a filling chamber 2022, a plurality of filling channels 2024a-2024d, first and second walls 2026, 2028, and first and second outlet ports 2019a, 2019b. The filling chamber 2022 may be constructed as an insert that is positioned between the first and second walls 2026, 2028. The filling chamber 2022 may include an access region 2034 that is exposed outside of the first and second walls 2026, 2028. The access region 2034 may include a barrier that provides a fluid-tight seal with a filling device such as a filling tube that pierces the barrier. Other arrangements may include a plurality of filling chambers 2022 as separate inserts that are provided in flow communication with at least one of the filling channels 2024a-2024d.

Figure 33A:
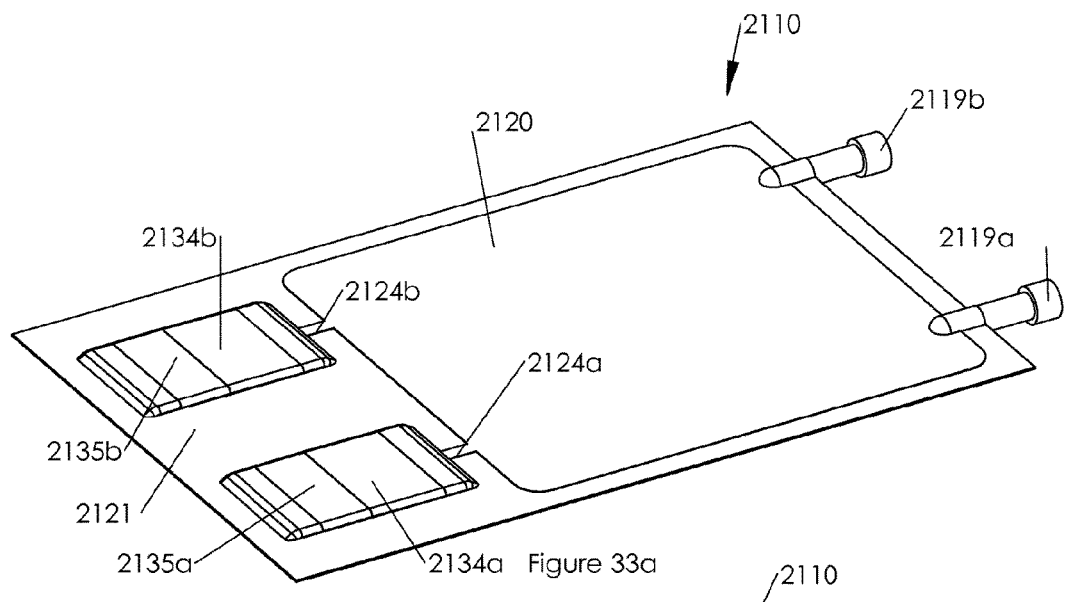
FIGS. 33a and 33b are perspective view of another example package in the form of an infusion bag having an actuatable access member in accordance with the present disclosure.
Figure 33B:
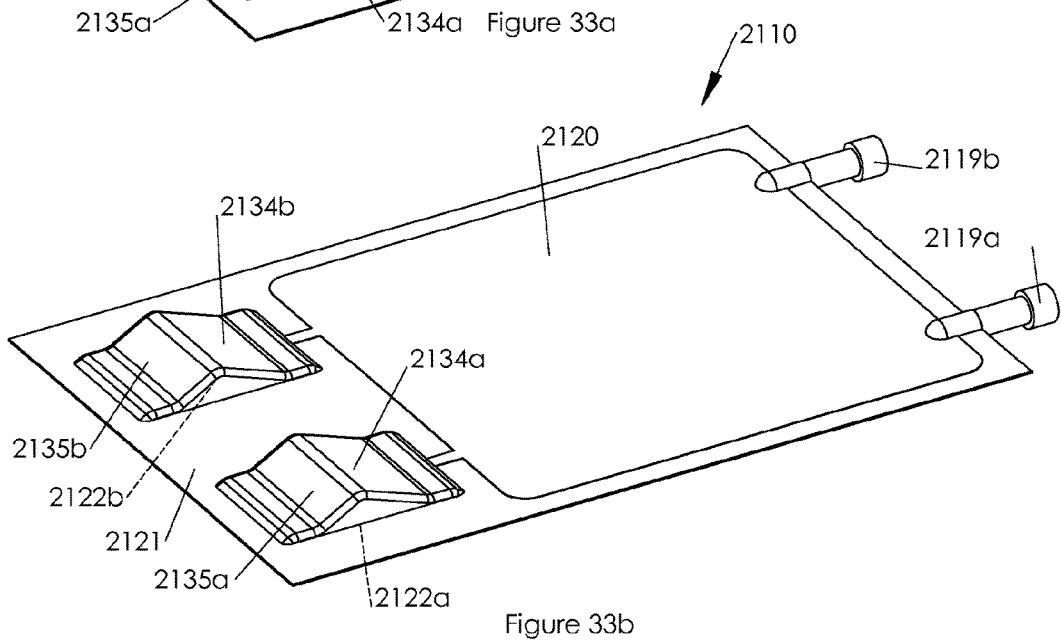

FIGS. 33a and 33b show another example package 2110 in the form of an infusion bag. The package 2110 includes a compartment 2120, first and second access inserts 2134a, 2134b that define first and second filling chambers 2122a, 2122b, first and second filling channels 2124a, 2124b, first and second walls 2126, 2128, and first and second outlet ports 2119a, 2119b. The first and second access inserts 2134a, 2134b may be operable between collapsed (see FIG. 33a) and opened (see FIG. 33b) positions. Access portions 2135a, 2135b of the first and second access inserts 2134a, 2134b provide access to the first and second filling chambers 2122a, 2122b via an filling device (e.g., a filling tube) when the first and second access inserts 2134a, 2134b are in the opened position of FIG. 33b.

The package 2110 may include a margin portion 2121 surrounding at least a portion of the first and second access inserts 2134a, 2134b. The margin portion 2121 is shown extended or stretched in FIG. 33a. The package 2110 may include flexible or elastic materials in the margin portion 2121 to facilitate opening and closing the first and second access inserts 2134a, 2134b.

FIGS. 34a-34c show another example access insert 2234. The access insert 2234 includes an access portion 2235 through which a filling member accesses a filling chamber 2222 defined when the access insert 2234 moves from a closed position (see FIGS. 34a and 34b) to an opened position (see FIGS. 34c and 34d). The filling chamber 2222 may be arranged in flow communication with a compartment of a package via at least one filling channel.

The access inserts 2134a, 2134b and 2234 may provide for a reduced profile package during shipping and storage of the package when the access inserts are in a closed position. The access inserts may be moved into the opened position when filling the package. The filling system used to fill the package carrying the access insert may move the access insert into the open position before attempting to insert a filling device (e.g., filling tube) through the access region of the access insert and into the filling chamber.

A compression panel may be associated with the packages disclosed herein to facilitate depression of at least one compartment of the cartridge either to urge the rupture of a rupturable barrier, or to urge expression of the dispensable product from the package.

The arrangements and methods described herein may be applicable for other injectors or dispenser types such as a cartridge or package that includes a retractable needle mechanism, retractable needle connector mechanism, or other needle safety mechanism, or that includes a reusable disabling mechanism or prevention device that is incorporated into the package. The package may be combined with several forms of delivery devices or applicators to facilitate a desired form or use. A compression panel or roller may be incorporated to facilitate an efficient expression of the package content. The delivery device or applicators may include, for example, any one of a medical syringe, staked-needle syringe, safety syringe, retractable needle syringe, auto-disabling syringe, autoinjector, jet injector, intradermal syringe, subcutaneous syringe, intramuscular syringe, infuser, infusion pump, sustained release delivery system, and patch pump. Other applications for the package may be applicable to syringe and jet injector applications, which are provided here by way of example, and the teachings described herein may be applied to other applications such as aseptic filling of micropump reservoirs, intramuscular autoinjectors, and intradermal autoinjectors.

The applications of the present invention are not limited to the syringe and jet injector applications which are provided here by way of example, and the teachings described herein can be applied to other applications such as aseptic filling of micropump reservoir, intramuscular auto injectors, intradermal auto injectors, etc.

What is claimed is:

1. A package for use with a beneficial agent delivery device, said package comprising:
   at least one filling chamber having a sealed penetrable access region;
   at least one compartment configured to hold a content, wherein the content includes at least one of a beneficial agent or a constituent of a beneficial agent; and
   at least one channel connecting the at least one filling chamber in fluid communication with the at least one compartment;
   wherein at least a portion of the package is resealable to contain the content.

2. The package of claim 1, further comprising a delivery member operable to remove at least some of the content from the at least one compartment.

3. The package of claim 2, wherein the delivery member is operable between a retracted position and a delivery position.

4. The package of claim 1, wherein the at least one filling chamber comprises a plurality of filling chambers.

5. The package of claim 1, wherein at least one of the filling chambers is configured for filling the at least one compartment.

6. The package of claim 1, wherein at least one of the filling chambers is configured for removing content from the at least one compartment.

7. The package of claim 1, wherein the at least one compartment comprises a plurality of compartments.

8. The package of claim 7, wherein the plurality of compartments are separated by at least one frangible seal.

9. The package of claim 1, wherein the at least one channel comprises a plurality of channels.

10. The package of claim 1, wherein at least one of the at least one channels is configured for filling the at least one compartment.

11. The package of claim 1, wherein at least one of the at least one channels is configured for removing content from the at least one compartment.

12. The package of claim 5, further comprising a preformed port associated with each of the plurality of filling chambers.

13. The package of claim 1, further comprising a fitment configured to deliver the content from the at least one compartment.

14. The package of claim 13, wherein the fitment comprises one of a needle, a canula, a catheter, a tube, a connector, a Luer connector, a nozzle, a spray nozzle, a jet nozzle, a dispenser, an oral dispenser, a auricular dispenser, an ocular dispenser, a topical dispenser, or a coupler.

15. The package of claim 1, further comprising at least first and second walls, the first wall at least partially defining the at least one filling chamber, the at least one channel, and the at least one compartment formed therein.

16. The package of claim 15, wherein at least a portion of one of the first and second walls comprises a flexible material.

17. The package of claim 15, wherein at least a portion of one of the first and second walls comprises one of a film and a foil material.

18. The package of claim 1, further comprising a weakened portion to facilitate detaching the at least one filling chamber from the package.

19. The package of claim 1, further comprising an insert positioned in one of the at least one filling chamber and the at least one channel.

20. The package of claim 19, wherein the insert is configured to direct flow of the content into a predetermined area of the at least one compartment.

* * * * *